(12) United States Patent
Cooray et al.

(10) Patent No.: US 11,768,781 B2
(45) Date of Patent: Sep. 26, 2023

(54) APPARATUS AND METHOD FOR MEMORY MANAGEMENT IN A GRAPHICS PROCESSING ENVIRONMENT

(71) Applicants: Niranjan L. Cooray, Folsom, CA (US); Abhishek R. Appu, El Dorado Hills, CA (US); Altug Koker, El Dorado Hills, CA (US); Joydeep Ray, Folsom, CA (US); Balaji Vembu, Folsom, CA (US); Pattabhiraman K, Bangalore (IN); David Puffer, Tempe, AZ (US); David J. Cowperthwaite, Portland, OR (US); Rajesh M. Sankaran, Portland, OR (US); Satyeshwar Singh, Mather, CA (US); Sameer Kp, Bangalore (IN); Ankur N. Shah, Folsom, CA (US); Kun Tian, Atlanta, GA (US)

(72) Inventors: Niranjan L. Cooray, Folsom, CA (US); Abhishek R. Appu, El Dorado Hills, CA (US); Altug Koker, El Dorado Hills, CA (US); Joydeep Ray, Folsom, CA (US); Balaji Vembu, Folsom, CA (US); Pattabhiraman K, Bangalore (IN); David Puffer, Tempe, AZ (US); David J. Cowperthwaite, Portland, OR (US); Rajesh M. Sankaran, Portland, OR (US); Satyeshwar Singh, Mather, CA (US); Sameer Kp, Bangalore (IN); Ankur N. Shah, Folsom, CA (US); Kun Tian, Atlanta, GA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 17/827,556

(22) Filed: May 27, 2022

(65) Prior Publication Data

US 2022/0334982 A1    Oct. 20, 2022

Related U.S. Application Data

(63) Continuation of application No. 17/008,991, filed on Sep. 1, 2020, now Pat. No. 11,360,914, which is a
(Continued)

(51) Int. Cl.
*G06F 9/455* (2018.01)
*G06F 9/50* (2006.01)
(Continued)

(52) U.S. Cl.
CPC .......... *G06F 13/16* (2013.01); *G06F 12/0802* (2013.01); *G06F 12/1009* (2013.01);
(Continued)

(58) Field of Classification Search
None
See application file for complete search history.

(56) References Cited

U.S. PATENT DOCUMENTS

| 4,473,878 A | 9/1984 | Zolnowsky et al. |
| 8,537,169 B1 * | 9/2013 | Bolz .................. G06T 1/60 345/568 |

(Continued)

FOREIGN PATENT DOCUMENTS

KR    10-1435772 B1    8/2014

OTHER PUBLICATIONS

Communication under Rule 71(3) EPC for European Application No. 18165264.5, dated May 13, 2019, 5 pages.
(Continued)

*Primary Examiner* — Hyun Nam
(74) *Attorney, Agent, or Firm* — Nicholson De Vos Webster & Elliott LLP

(57) ABSTRACT

An apparatus and method are described for implementing memory management in a graphics processing system. For example, one embodiment of an apparatus comprises: a first plurality of graphics processing resources to execute graphics commands and process graphics data; a first memory management unit (MMU) to communicatively couple the
(Continued)

first plurality of graphics processing resources to a system-level MMU to access a system memory; a second plurality of graphics processing resources to execute graphics commands and process graphics data; a second MMU to communicatively couple the second plurality of graphics processing resources to the first MMU; wherein the first MMU is configured as a master MMU having a direct connection to the system-level MMU and the second MMU comprises a slave MMU configured to send memory transactions to the first MMU, the first MMU either servicing a memory transaction or sending the memory transaction to the system-level MMU on behalf of the second MMU.

16 Claims, 30 Drawing Sheets

Related U.S. Application Data continuation of application No. 16/453,995, filed on Jun. 26, 2019, now Pat. No. 10,769,078, which is a continuation of application No. 15/482,690, filed on Apr. 7, 2017, now Pat. No. 10,380,039.

(51) Int. Cl.
   *G06F 13/16* (2006.01)
   *G06F 12/1009* (2016.01)
   *G06F 12/1027* (2016.01)
   *G06F 12/1036* (2016.01)
   *G06F 12/0802* (2016.01)
   *G06F 13/40* (2006.01)

(52) U.S. Cl.
   CPC ...... *G06F 12/1027* (2013.01); *G06F 12/1036* (2013.01); *G06F 13/4068* (2013.01); *G06F 2212/1024* (2013.01); *G06F 2212/302* (2013.01); *G06F 2212/60* (2013.01); *G06F 2212/68* (2013.01)

(56) References Cited

U.S. PATENT DOCUMENTS

| | | | | |
|---|---|---|---|---|
| 9,086,813 B2 * | 7/2015 | Zeng | ................. | G06F 3/0604 |
| 9,514,559 B2 * | 12/2016 | Rao | ................. | G06T 1/20 |
| 2007/0174530 A1 | 7/2007 | Genova et al. | | |
| 2010/0228945 A1 | 9/2010 | Deshpande et al. | | |
| 2011/0022818 A1 | 1/2011 | Kegel et al. | | |
| 2011/0063318 A1 * | 3/2011 | Bolz | ................. | G06T 15/80 |
| | | | | 345/552 |
| 2011/0271075 A1 | 11/2011 | Ahn | | |
| 2013/0276096 A1 * | 10/2013 | Symes | ................. | G06F 21/74 |
| | | | | 726/16 |
| 2014/0049548 A1 * | 2/2014 | Rao | ................. | G06T 1/20 |
| | | | | 345/565 |
| 2014/0282580 A1 * | 9/2014 | Zeng | ................. | G06F 3/0631 |
| | | | | 718/104 |
| 2015/0213275 A1 * | 7/2015 | Reese | ................. | G06F 21/84 |
| | | | | 726/26 |
| 2017/0039381 A1 * | 2/2017 | Sharp | ................. | G06T 1/60 |
| 2017/0161204 A1 * | 6/2017 | Roberts | ................. | G06F 13/16 |
| 2018/0293183 A1 * | 10/2018 | Cooray | ................. | G06F 12/1036 |
| 2019/0056955 A1 * | 2/2019 | Pennala | ................. | G06F 9/5083 |
| 2019/0213707 A1 * | 7/2019 | Cooray | ................. | G06F 12/1009 |
| 2020/0294179 A1 * | 9/2020 | Ray | ................. | G06F 12/084 |
| 2020/0379927 A1 * | 12/2020 | Chan | ................. | G06F 12/0875 |
| 2022/0083367 A1 * | 3/2022 | Yao | ................. | G06F 12/109 |

OTHER PUBLICATIONS

Decision to Grant a European Patent for Application No. 18165264. 5, dated Sep. 19, 2019, 2 pages.
Decision to grant a European patent, EP App. No. 19202984.1, dated Sep. 8, 2022, 2 pages.
European Search Report and Search Opinion, EP App. No 19202984. 1, dated Jan. 16, 2020, 6 pages.
European Search Report and Search Opinion, EP App. No 22189858. 8, dated Nov. 3, 2022, 7 pages.
Extended European Search Report for Application No. 18165264.5, dated Aug. 14, 2018, 8 pages.
Intention to Grant for European Application No. 18165264.5, dated May 13, 2019, 5 pages.
Intention to grant, EP App. No. 19202984.1, dated Apr. 25, 2022, 6 pages.
Non-Final Office Action from U.S. Appl. No. 15/482,690, dated Oct. 5, 2018, 6 pages.
Non-Final Office Action, U.S. Appl. No. 16/453,995, dated Dec. 30, 2019, 9 pages.
Non-Final Office Action, U.S. Appl. No. 17/008,991, dated Aug. 19, 2021, 7 pages.
Notice of Allowance from U.S. Appl. No. 15/482,690, dated Mar. 27, 2019, 9 pages.
Notice of Allowance, U.S. Appl. No. 16/453,995, dated May 13, 2020, 7 pages.
Notice of Allowance, U.S. Appl. No. 17/008,991, dated Feb. 24, 2022, 9 pages.
Office Action, EP App. No. 19202984.1, dated Nov. 9, 2021, 6 pages.

* cited by examiner

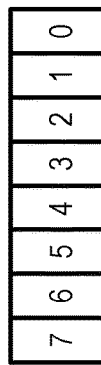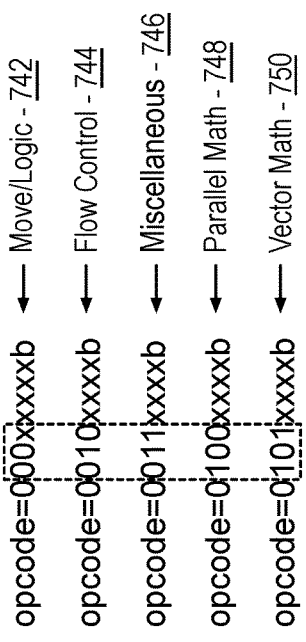
FIG. 7

APPARATUS AND METHOD FOR MEMORY MANAGEMENT IN A GRAPHICS PROCESSING ENVIRONMENT

CROSS-REFERENCE TO RELATED APPLICATIONS

This application is a continuation of co-pending application Ser. No. 17/008,991, filed Sep. 1, 2020, which is a continuation of application Ser. No. 16/453,995, filed Jun. 26, 2019, now U.S. Issued U.S. Pat. No. 10,769,078, issued on Sep. 8, 2020, which is a continuation of application Ser. No. 15/482,690, filed Apr. 7, 2017, now U.S. Issued U.S. Pat. No. 10,380,039 issued Aug. 13, 2019, which are hereby incorporated by reference.

TECHNICAL FIELD

This invention relates generally to the field of computer processors. More particularly, the invention relates to an apparatus and method for memory management in a graphics processing environment.

BACKGROUND ART

Rapid advances have recently taken place in graphics processor unit (GPU) virtualization. Virtualized graphics processing environments are used, for example, in the media cloud, remote workstations/desktops, Interchangeable Virtual Instrumentation (IVI), rich client virtualization, to name a few. Certain architectures perform full GPU virtualization through trap-and-emulation to emulate a full-featured virtual GPU (vGPU) while still providing near-to-native performance by passing through performance-critical graphics memory resources.

With the increasing importance of GPUs in servers to support 3D, media and GPGPU workloads, GPU virtualization is becoming more widespread. How to virtualize GPU memory access from a virtual machine (VM) is one of the key design factors. The GPU has its own graphics memory: either dedicated video memory or shared system memory. When system memory is used for graphics, guest physical addresses (GPAs) need to be translated to host physical addresses (HPAs) before being accessed by hardware.

There are various approaches for performing translation for GPUs. Some implementations perform translation with hardware support, but the GPU can be passed-through to one VM only. Another solution is a software approach which constructs shadow structures for the translation. For instance, shadow page tables are implemented in some architectures such as the full GPU virtualization solution mentioned above, which can support multiple VMs to share a physical GPU.

In some implementations, the guest/VM memory pages are backed by host memory pages. A virtual machine monitor (VMM) (sometimes called a "Hypervisor") uses extended page tables (EPT), for example, to map from a guest physical address (PA) to a host PA. Many memory sharing technologies may be used, such as Kernel Same page Merging (KSM).

KSM combines pages from multiple VMs with the same content, to a single page with write protection. That is to say, if a memory page in VM1 (mapping from guest PA1 to host PA1), has the same contents as another memory page in VM2 (mapping from guest PA2 to host PA2), may use only one host page (say HPA_SH) to back the guest memory. That is, both guest PA1 of VM1 and PA2 of VM2 are mapped to HPA_SH with write protection. This saves the memory used for the system, and is particularly useful for read-only memory pages of the guest such as code pages, and zero pages. With KSM, copy-on-write (COW) technology is used to remove the sharing once a VM modifies the page content.

Mediate pass through is used in virtualization systems for device performance and sharing, where a single physical GPU is presented as multiple virtual GPU to multiple guests with direct DMA, while the privileges resource accesses from guests are still trap-and-emulated. In some implementations, each guest can run the native GPU driver, and device DMA goes directly to memory without hypervisor intervention.

BRIEF DESCRIPTION OF THE DRAWINGS

A better understanding of the present invention can be obtained from the following detailed description in conjunction with the following drawings, in which:

FIG. 7 illustrates a graphics processor execution unit instruction format according to an embodiment;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
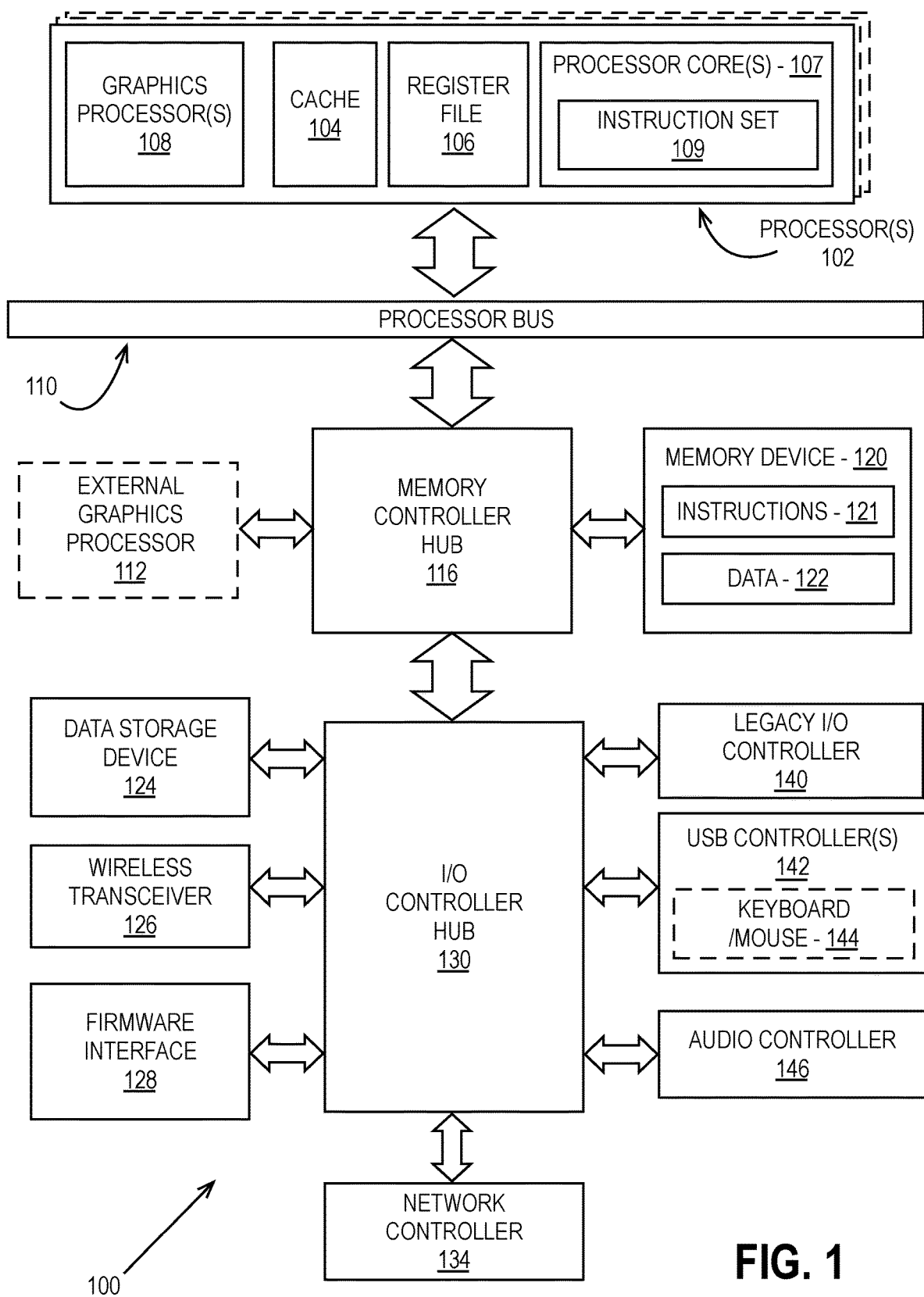
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
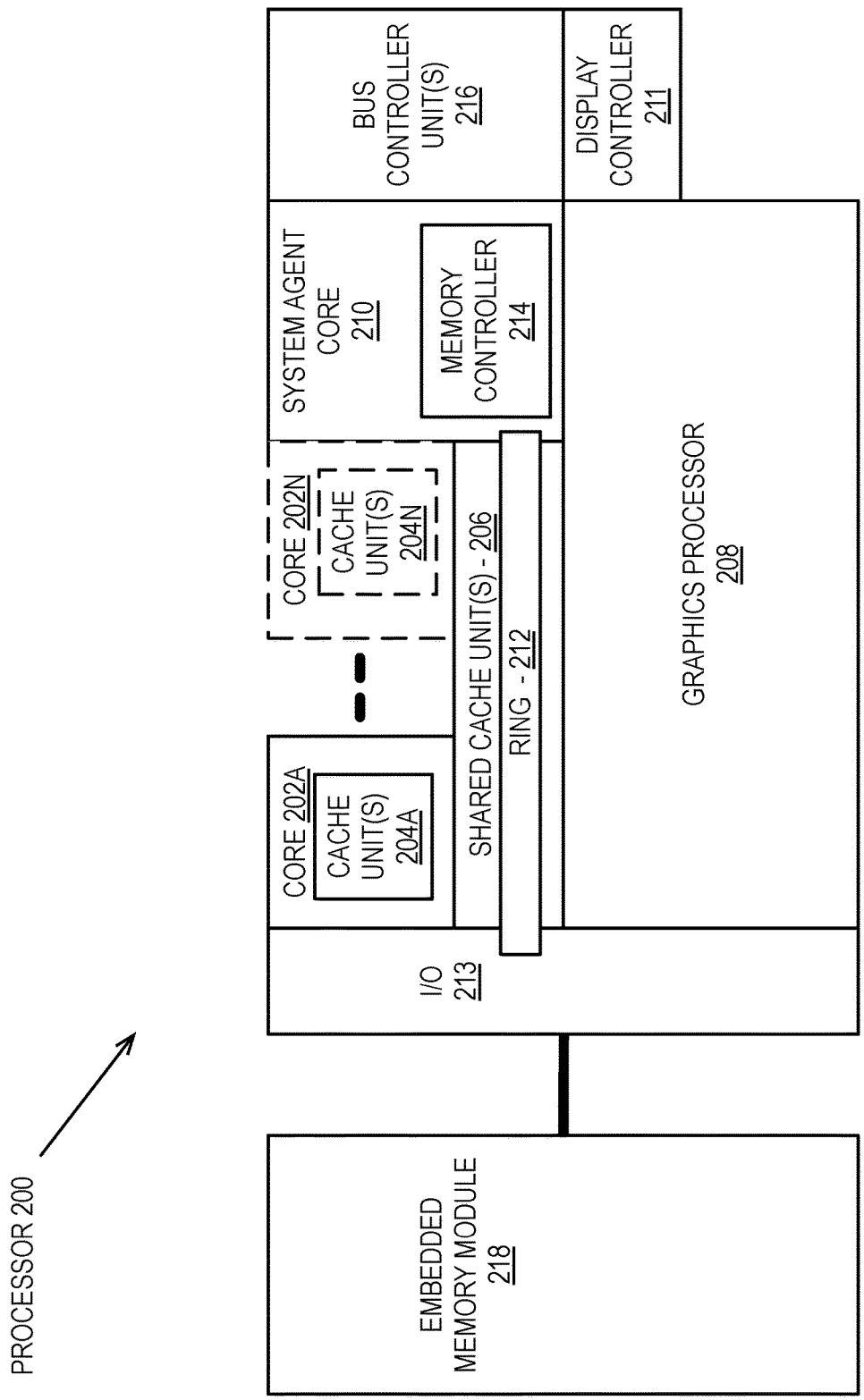
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
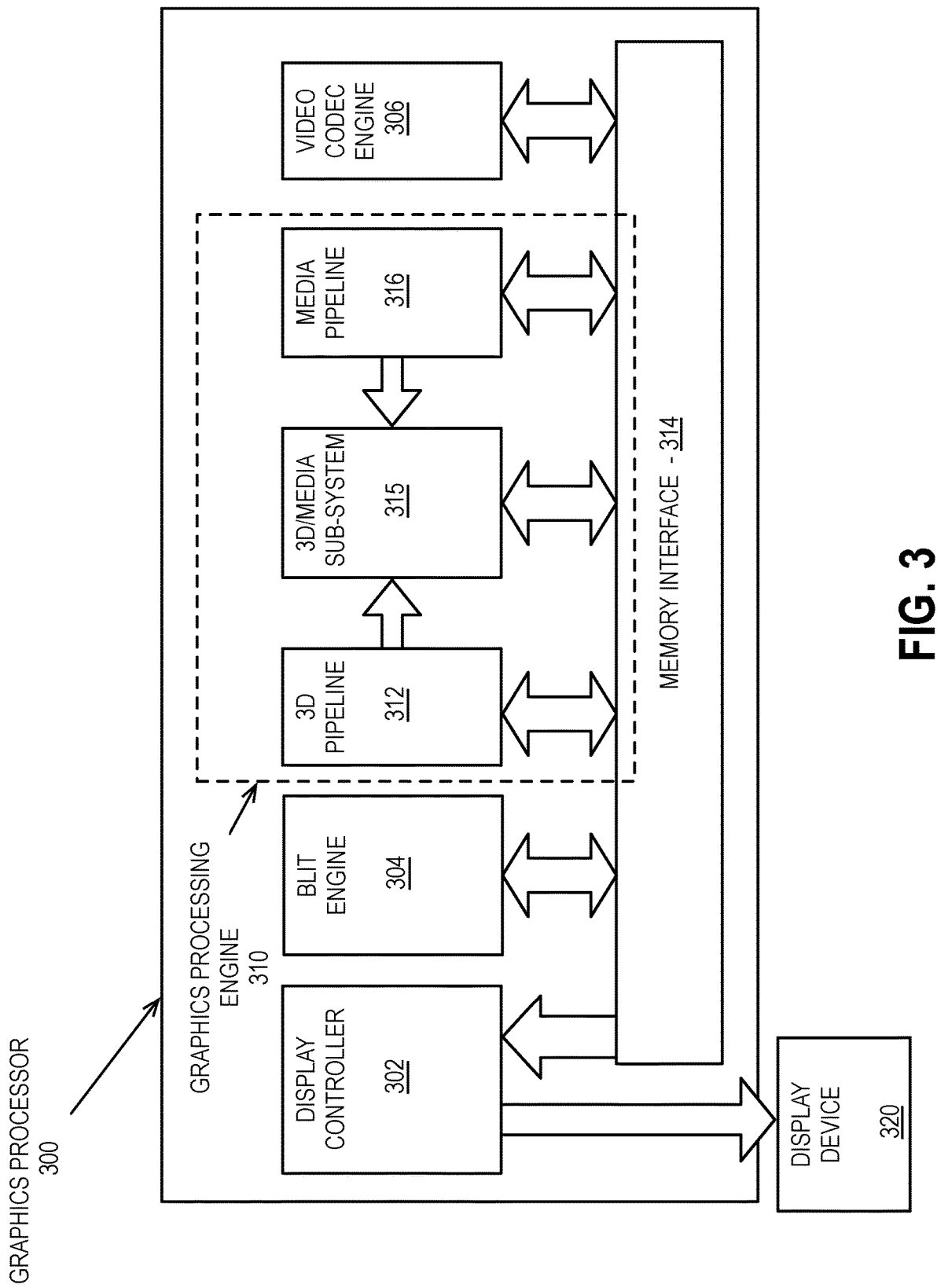
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
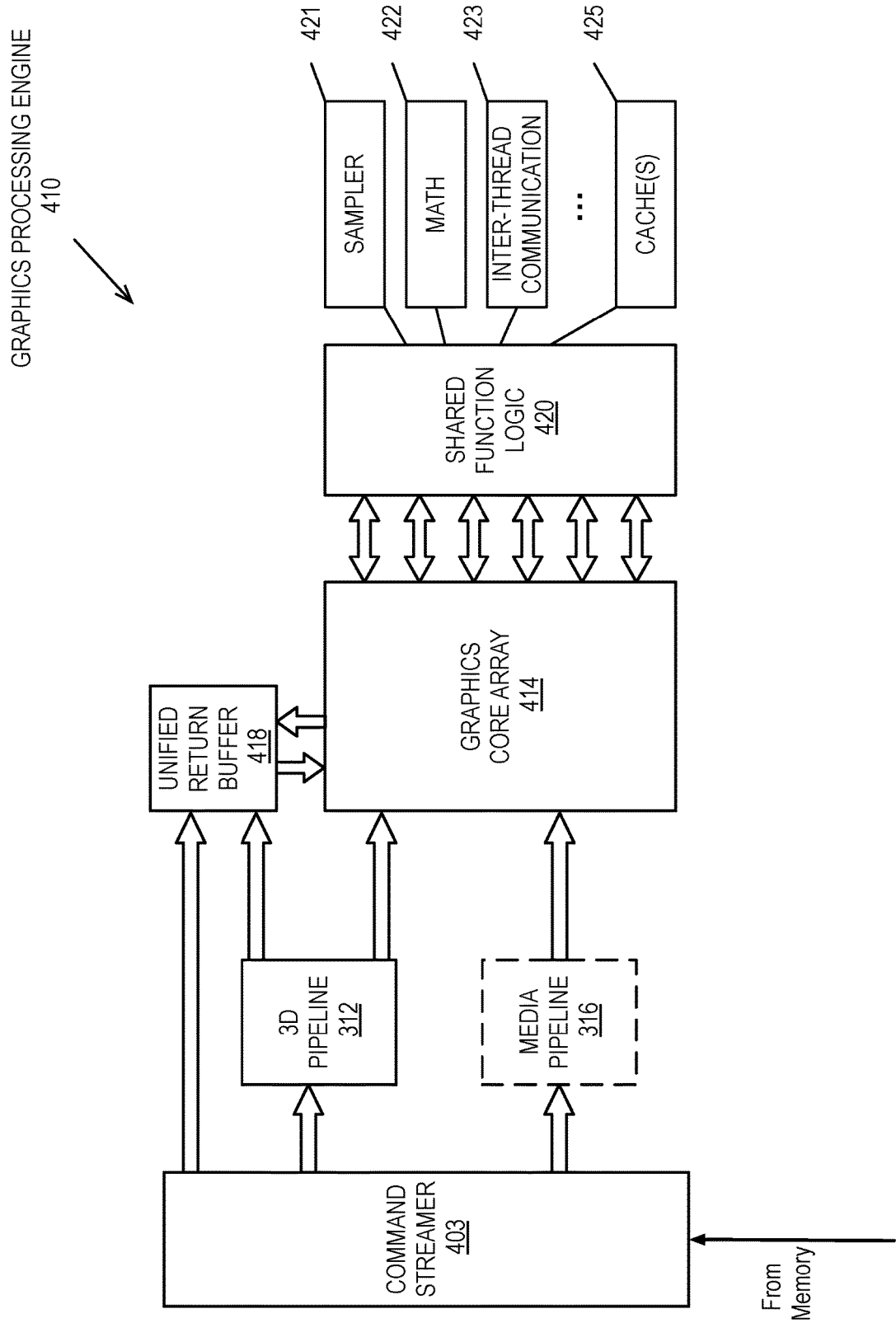
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316.

The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
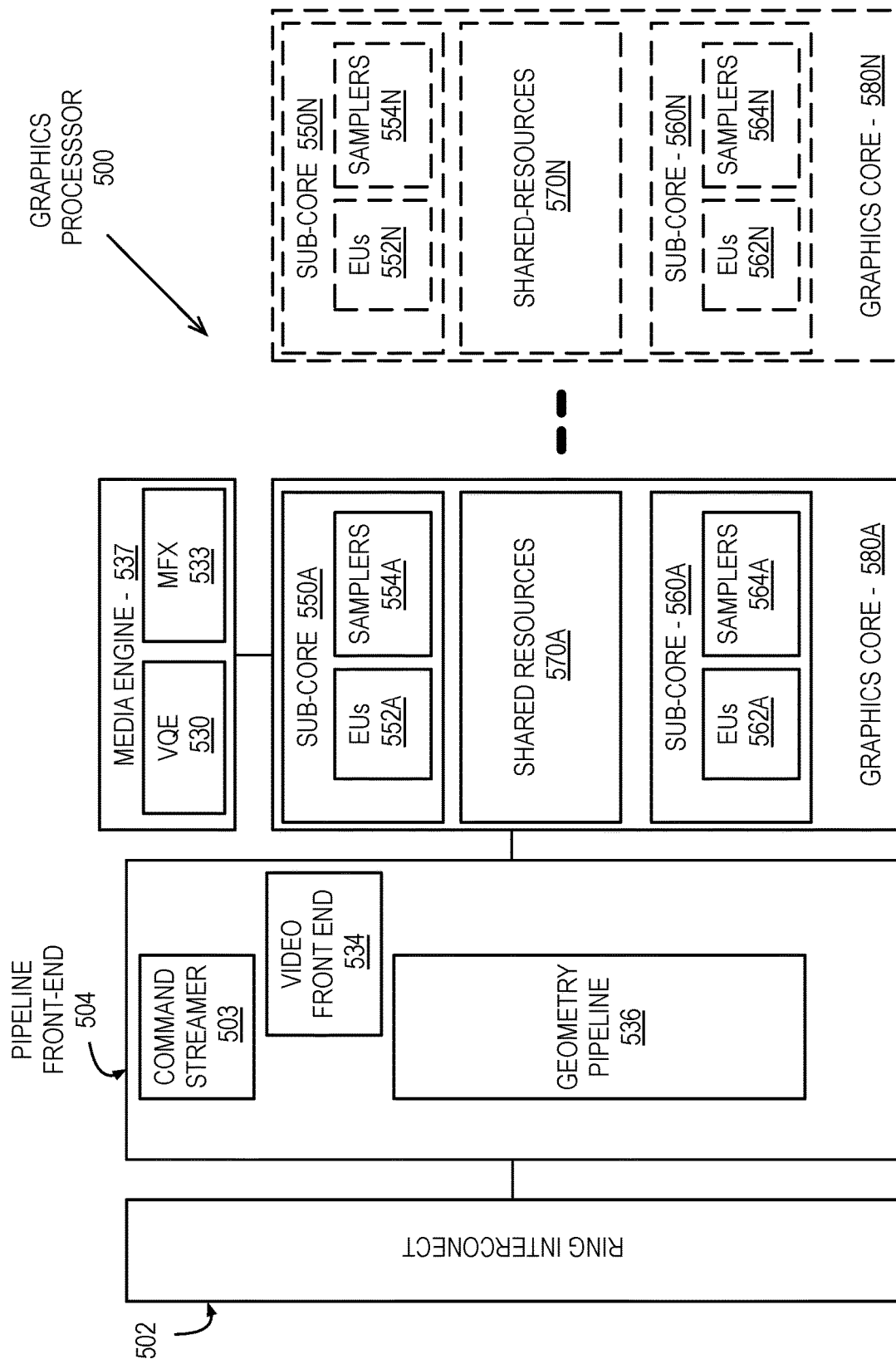
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
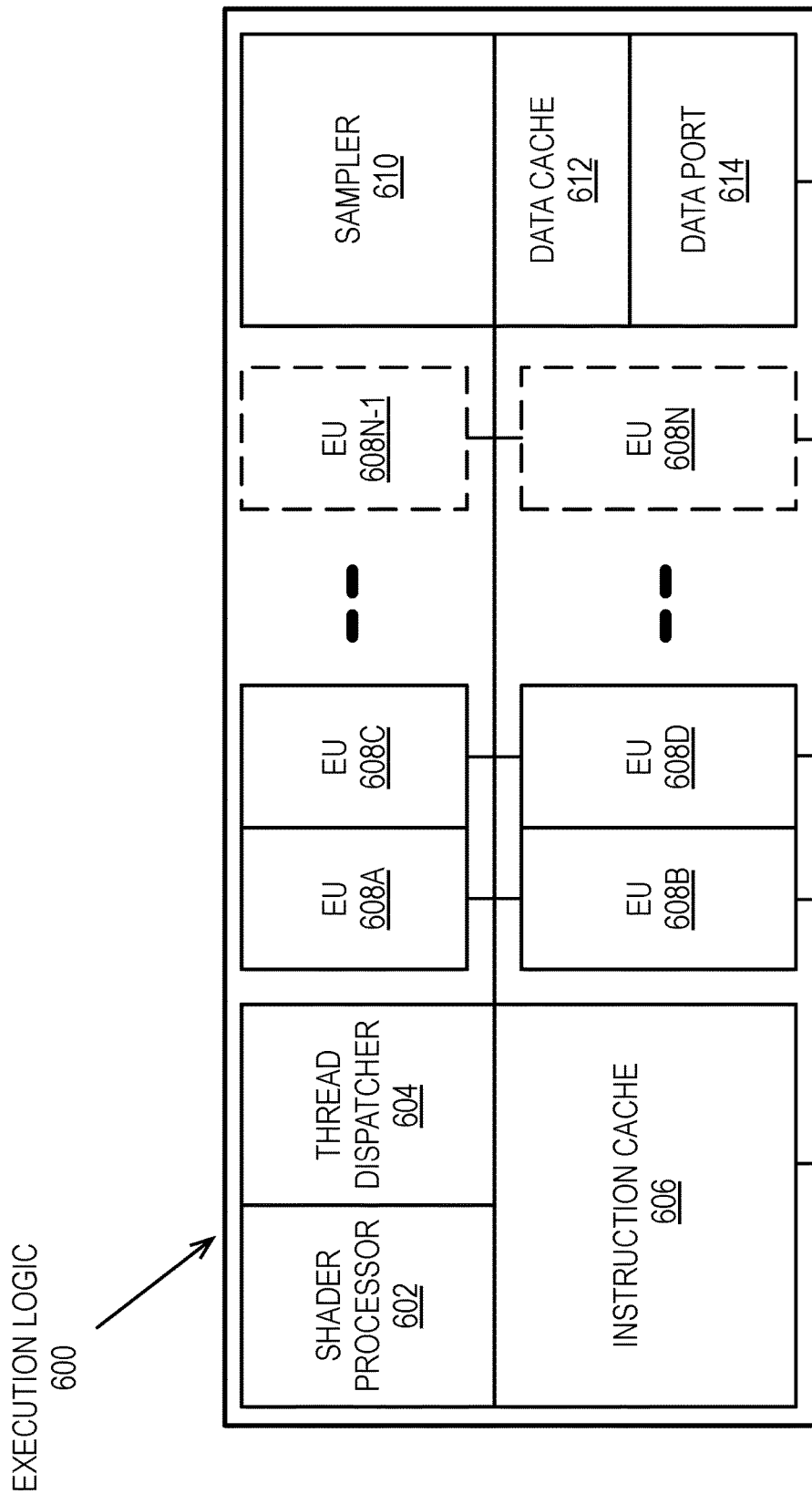
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 5) can dispatch vertex, tessellation, or geometry shaders to the thread execution logic 600 (FIG. 6) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit instruction format 730. The native instructions available in the 64-bit instruction format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
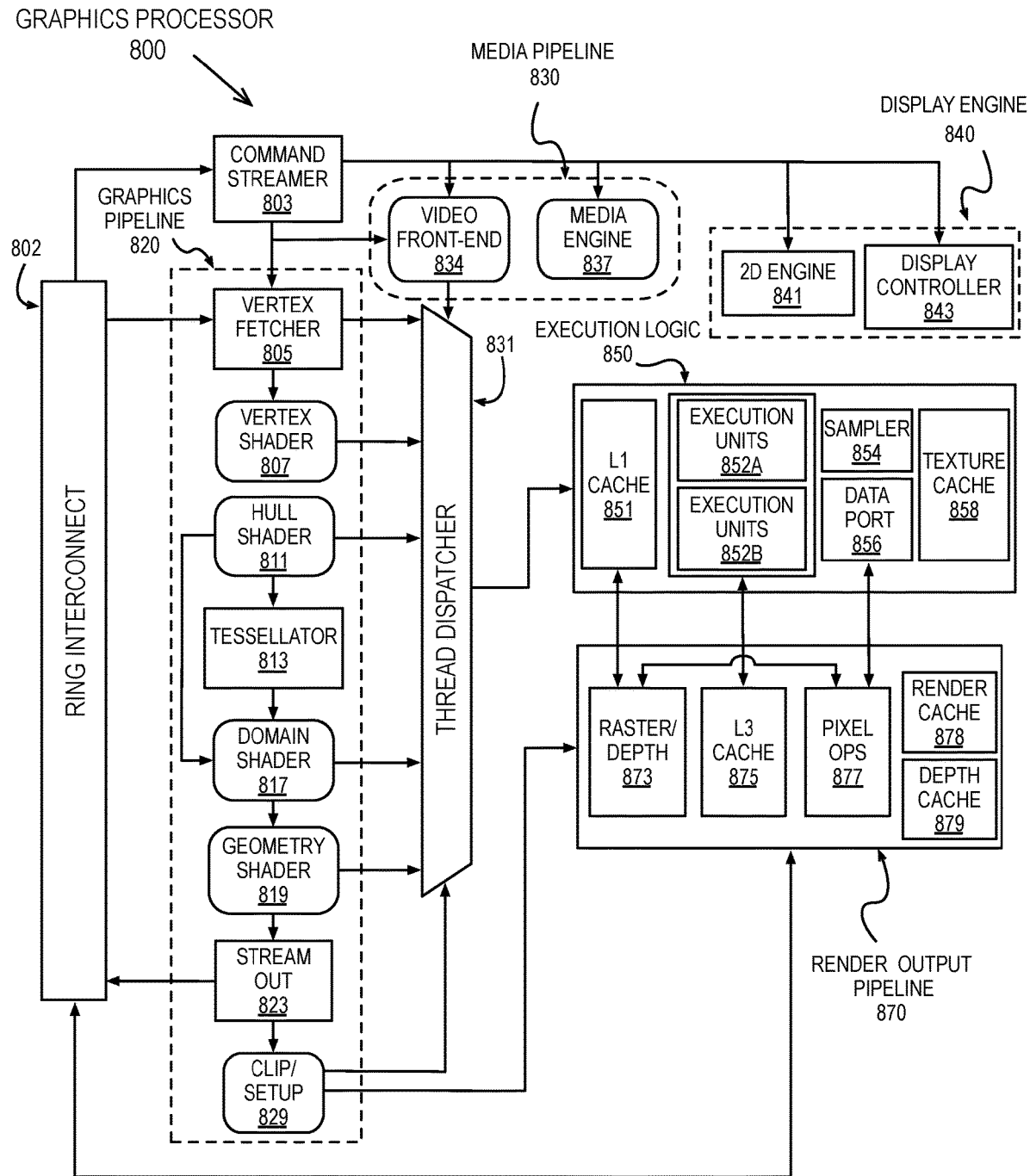
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800.

Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A-852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834.

In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
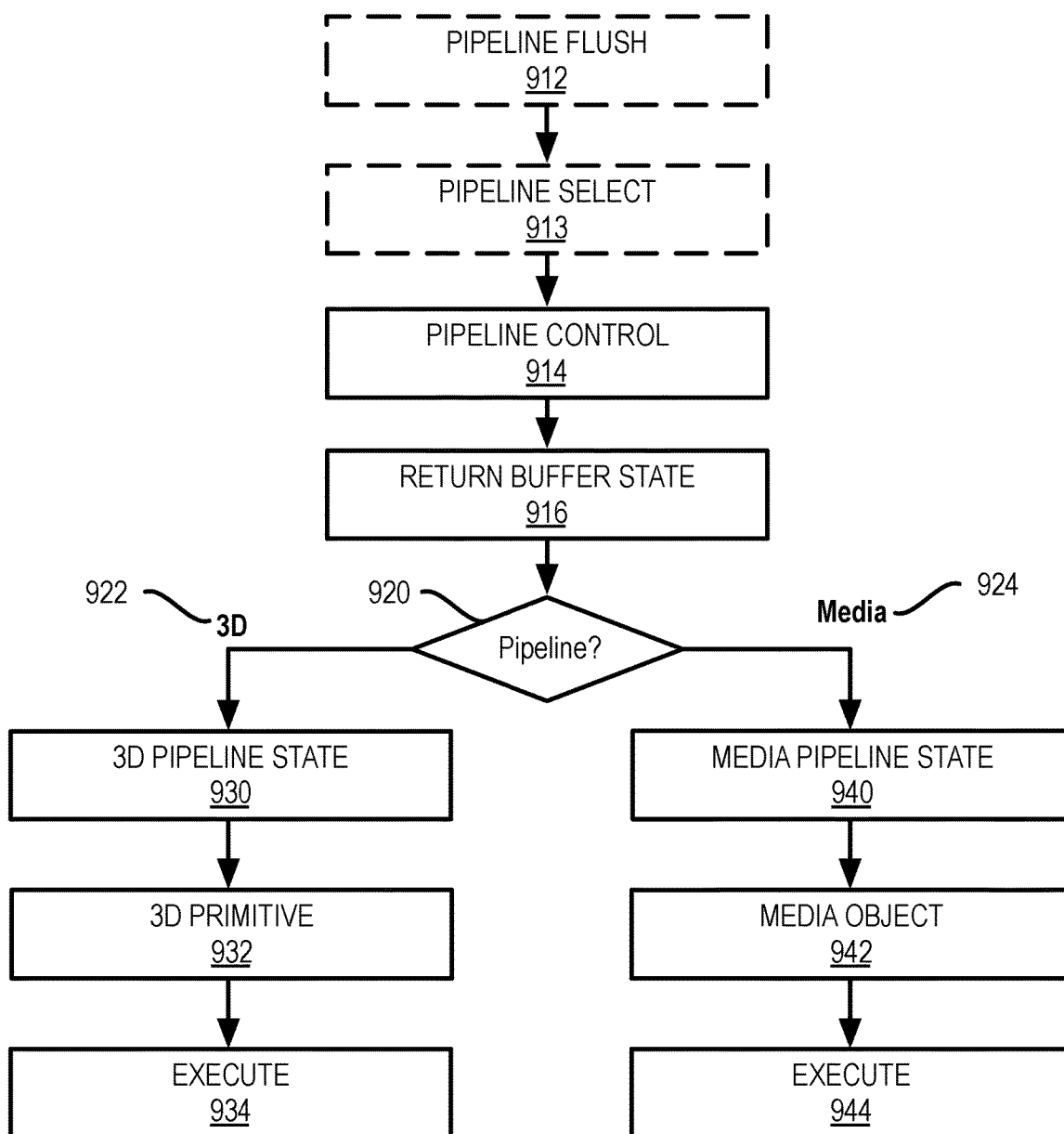
FIG. 9A is a block diagram illustrating a graphics processor command format according to an embodiment.
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands Once the command is received by the client unit, the client unit reads the opcode 904 and, if present, sub-opcode 905 to determine the operation to perform. The client unit performs the command using information in data field 906. For some commands an explicit command size 908 is expected to specify the size of the command In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, configuring the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
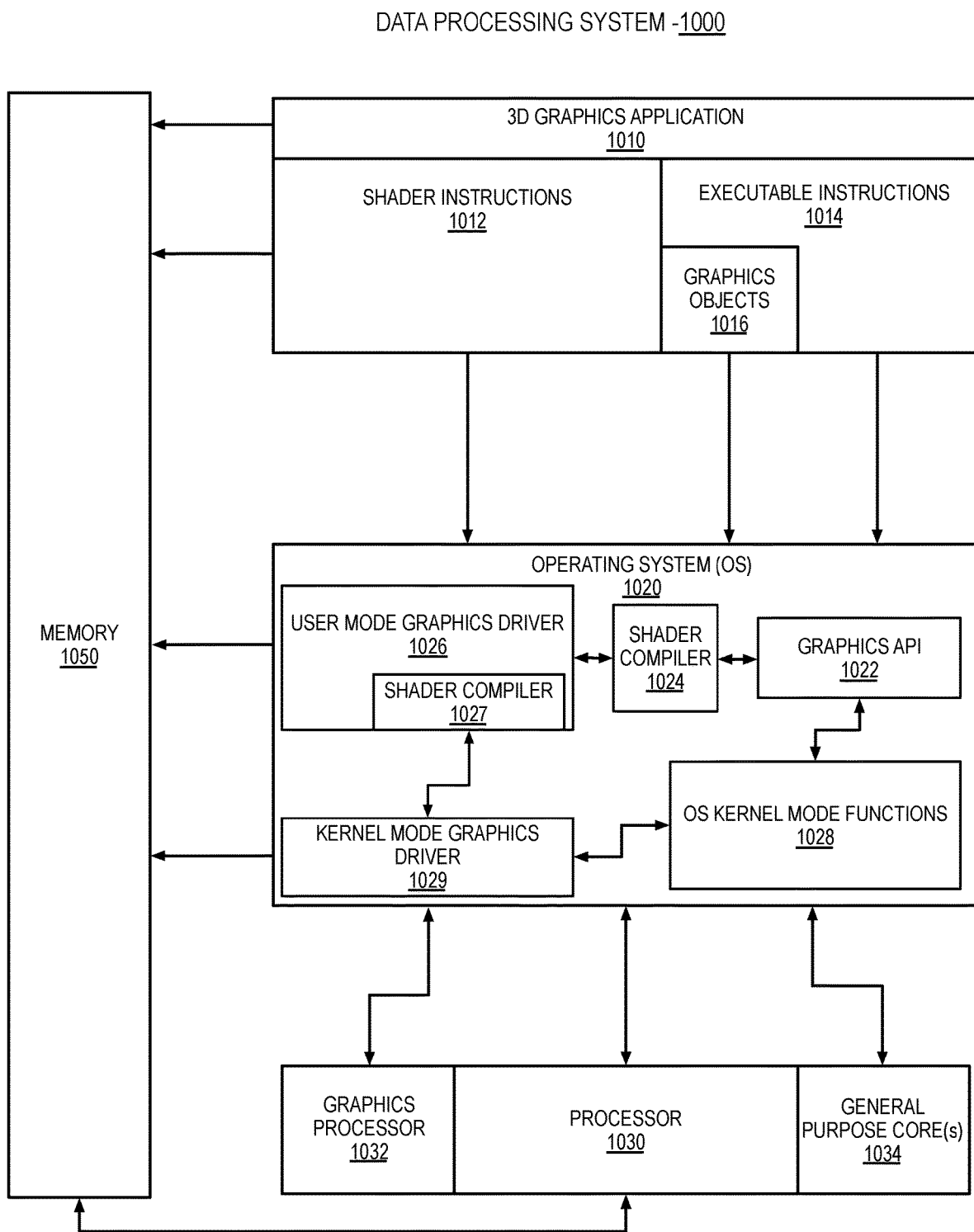
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
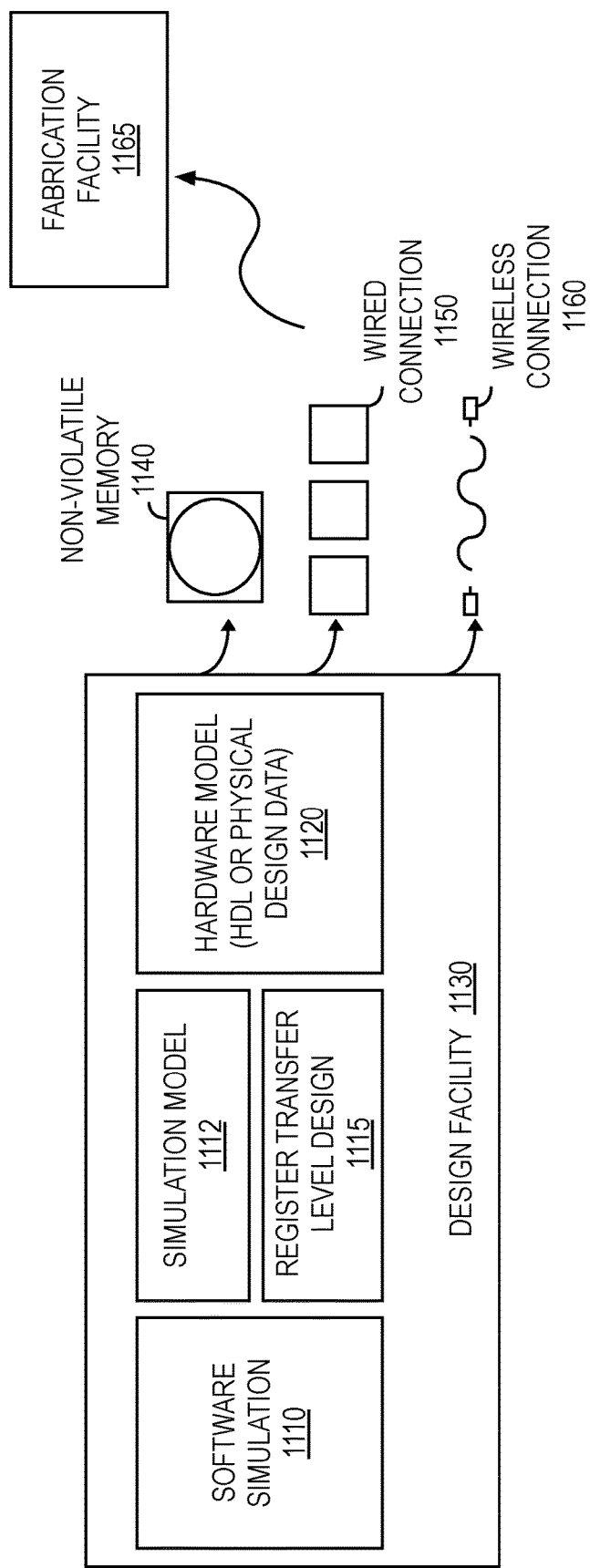
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
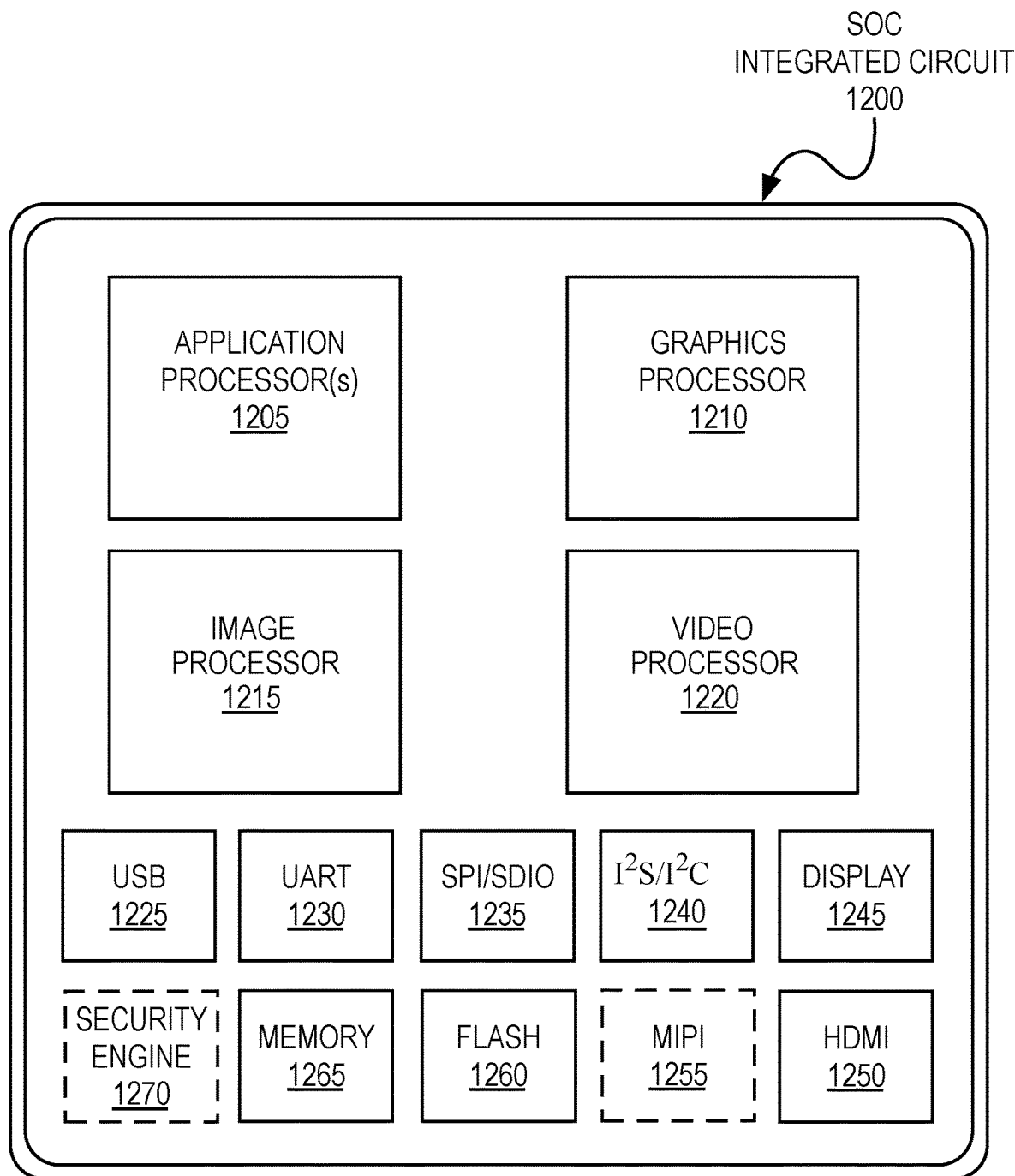
FIG. 12 illustrates an exemplary system on a chip integrated circuit that may be fabricated using one or more IP cores, according to an embodiment.
Figure 13:
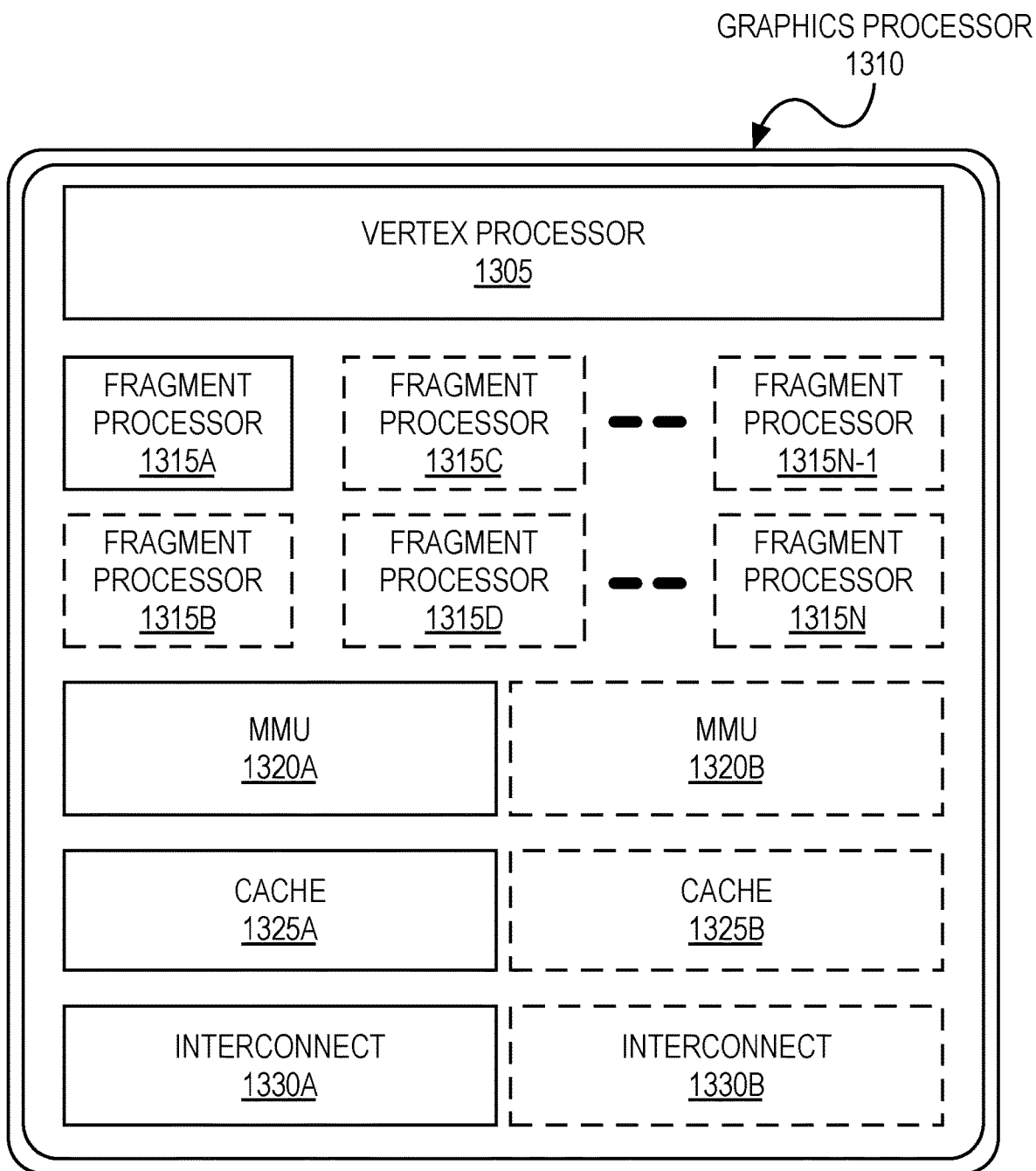
FIG. 13 illustrates an exemplary graphics processor of a system on a chip integrated circuit that may be fabricated using one or more IP cores.
Figure 14:
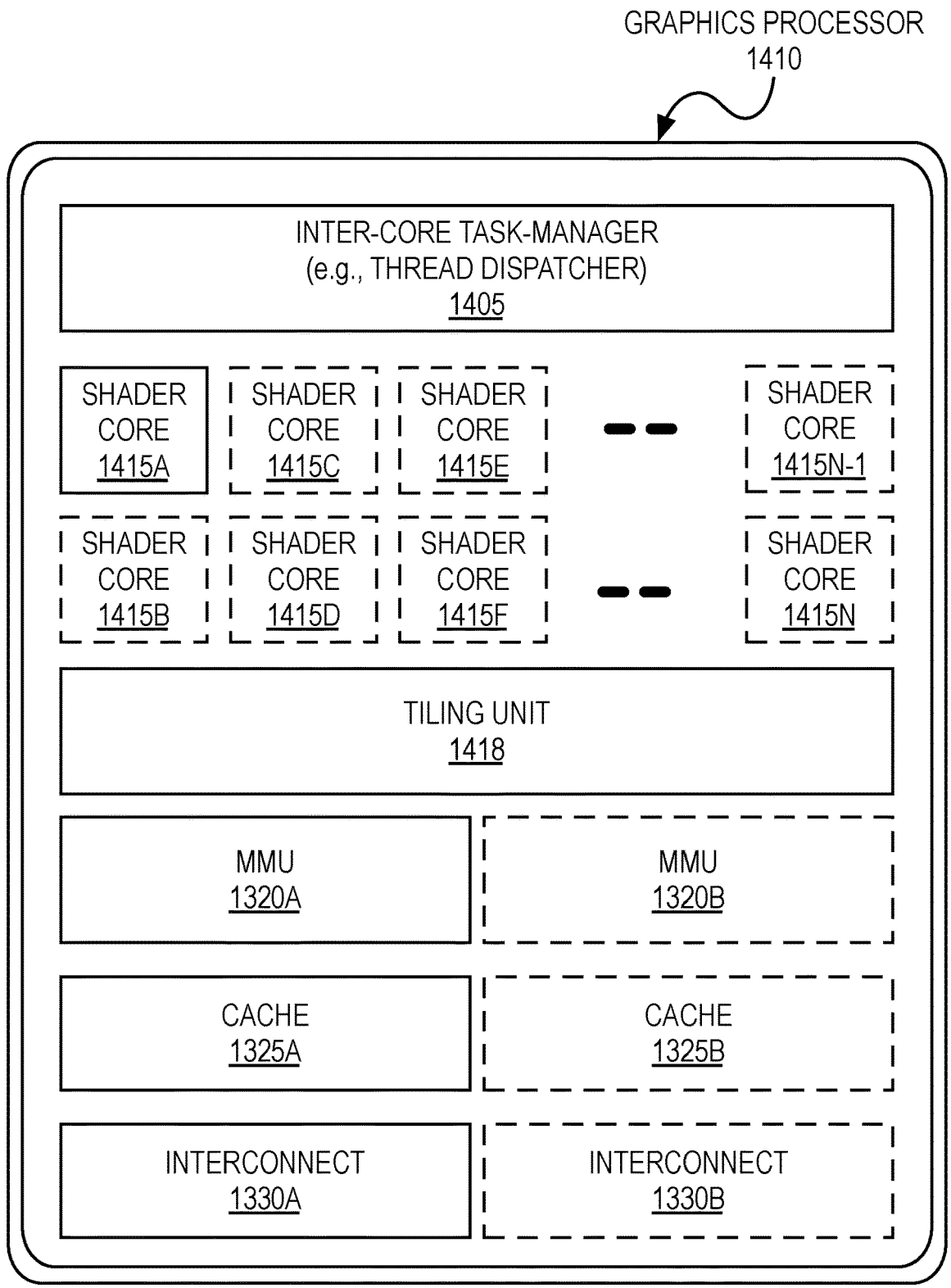
FIG. 14 illustrates an additional exemplary graphics processor of a system on a chip integrated circuit that may be fabricated using one or more IP cores

FIGS. 12-14 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A 1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, cache(s) 1325A-1325B, and circuit interconnect(s) 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N and a tiling unit 1418 to accelerate tiling operations for tile-based rendering, in which rendering operations for a scene are subdivided in image space, for example to exploit local spatial coherence within a scene or to optimize use of internal caches.

Exemplary Graphics Virtualization Architectures

Some embodiments of the invention are implemented on a platform utilizing full graphics processor unit (GPU) virtualization. As such, an overview of the GPU virtualization techniques employed in one embodiment of the invention is provided below, followed by a detailed description of an apparatus and method for pattern-driven page table shadowing.

One embodiment of the invention employs a full GPU virtualization environment running a native graphics driver in the guest, and mediated pass-through that achieves both good performance, scalability, and secure isolation among guests. This embodiment presents a virtual full-fledged GPU to each virtual machine (VM) which can directly access performance-critical resources without intervention from the hypervisor in most cases, while privileged operations from the guest are trap-and-emulated at minimal cost. In one embodiment, a virtual GPU (vGPU), with full GPU features, is presented to each VM. VMs can directly access performance-critical resources, without intervention from the hypervisor in most cases, while privileged operations from the guest are trap-and-emulated to provide secure isolation among VMs. The vGPU context is switched per quantum, to share the physical GPU among multiple VMs.

Figure 15:
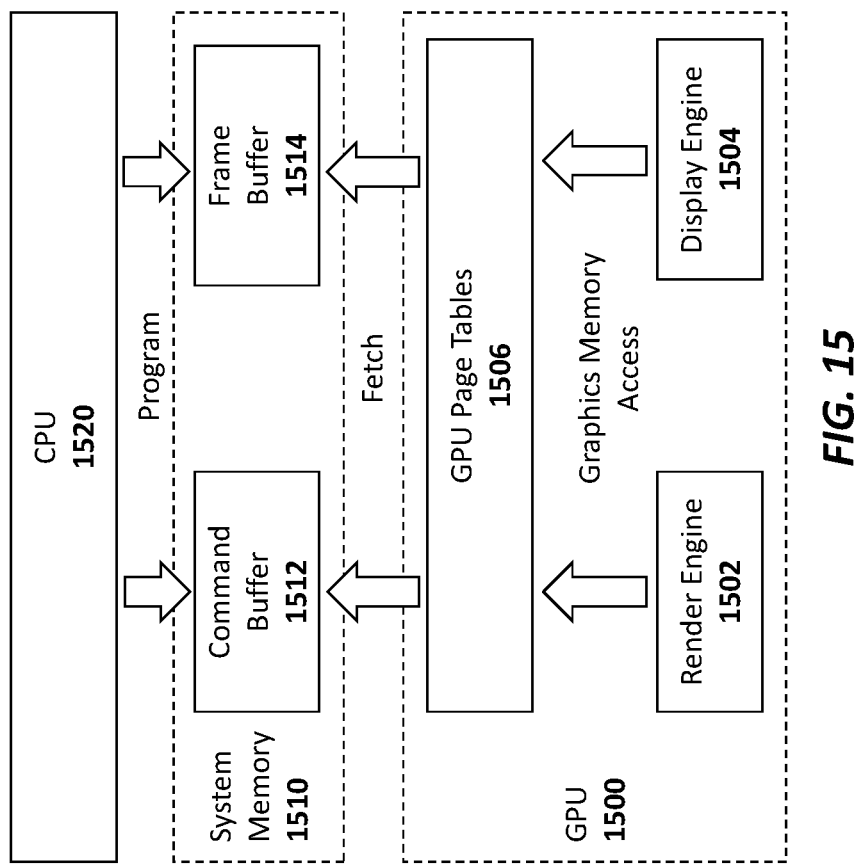
FIG. 15 illustrates an exemplary graphics processing system.

FIG. 15 illustrates a high level system architecture on which embodiments of the invention may be implemented which includes a graphics processing unit (GPU) 1500, a central processing unit (CPU) 1520, and a system memory 1510 shared between the GPU 1500 and the CPU 1520. A render engine 1502 fetches GPU commands from a command buffer 1512 in system memory 1510, to accelerate graphics rendering using various different features. The display engine 1504 fetches pixel data from the frame buffer 1514 and then sends the pixel data to external monitors for display.

Certain architectures use system memory 1510 as graphics memory, while other GPUs may use on-die memory. System memory 1510 may be mapped into multiple virtual address spaces by GPU page tables 1506. A 2 GB global virtual address space, called global graphics memory, accessible from both the GPU 1500 and CPU 1520, is mapped through global page tables. Local graphics memory spaces are supported in the form of multiple 2 GB local virtual address spaces, but are only limited to access from the render engine 1502, through local page tables. Global graphics memory is mostly the frame buffer 1514, but also serves as the command buffer 1512. Large data accesses are made to local graphics memory when hardware acceleration is in progress. Similar page table mechanisms are employed by GPUs with on-die memory.

In one embodiment, the CPU 1520 programs the GPU 1500 through GPU-specific commands, shown in FIG. 15, in a producer-consumer model. The graphics driver programs GPU commands into the command buffer 1512, including a primary buffer and a batch buffer, according to high level programming APIs like OpenGL and DirectX. The GPU 1500 then fetches and executes the commands. The primary buffer, a ring buffer, may chain other batch buffers together. The terms "primary buffer" and "ring buffer" are used interchangeably hereafter. The batch buffer is used to convey the majority of the commands (up to ~98%) per programming model. A register tuple (head, tail) is used to control the ring buffer. In one embodiment, the CPU 1520 submits the commands to the GPU 1500 by updating the tail, while the GPU 1500 fetches commands from head, and then notifies the CPU 1520 by updating the head, after the commands have finished execution.

As mentioned, one embodiment of the invention is implemented in a full GPU virtualization platform with mediated pass-through. As such, every VM is presented with a full-fledged GPU to run a native graphics driver inside a VM. The challenge, however, is significant in three ways: (1) complexity in virtualizing an entire sophisticated modern GPU, (2) performance due to multiple VMs sharing the GPU, and (3) secure isolation among the VMs without any compromise.

Figure 16:
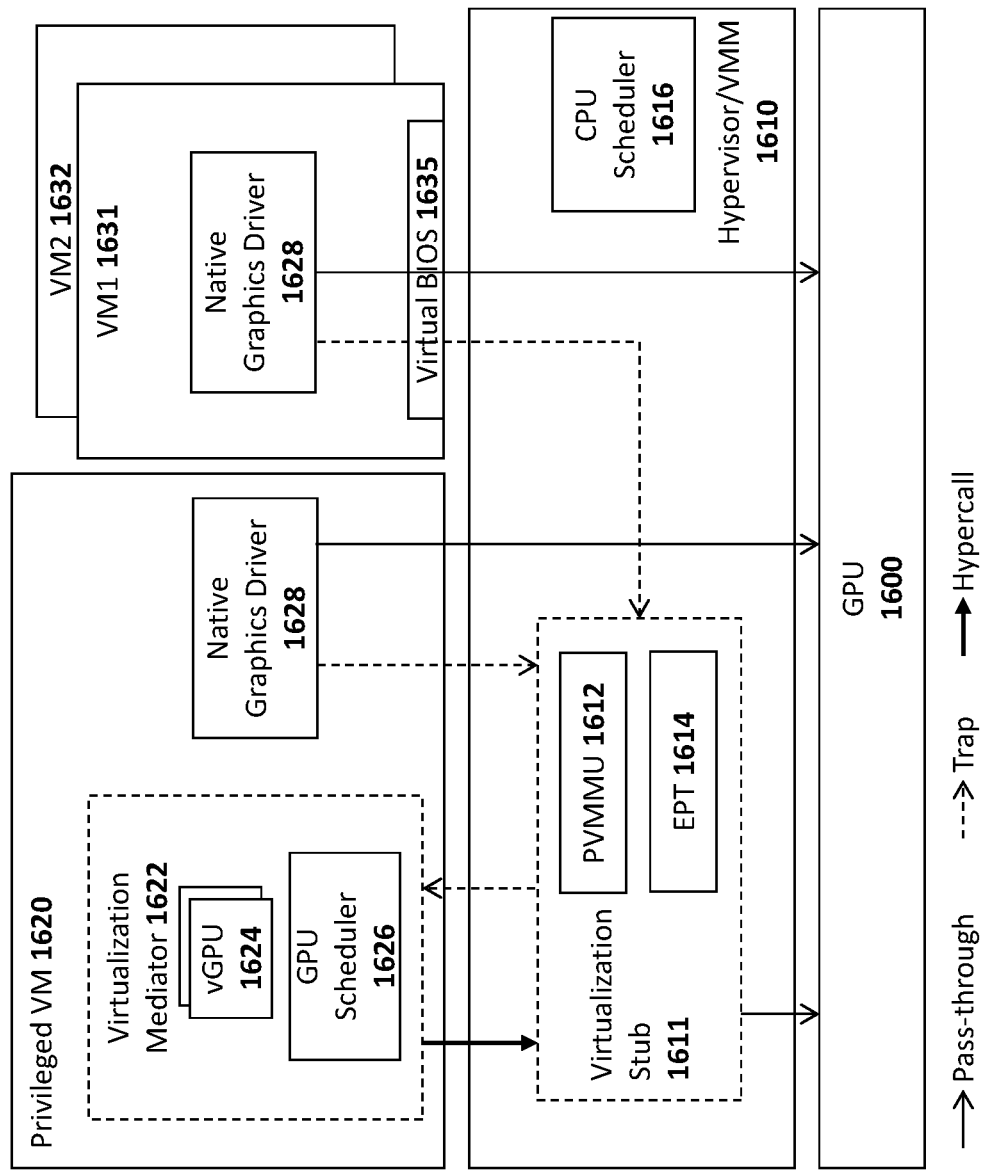
FIG. 16 illustrates an exemplary architecture for full graphics virtualization.

FIG. 16 illustrates a GPU virtualization architecture in accordance with one embodiment of the invention which includes a hypervisor 1610 running on a GPU 1600, a privileged virtual machine (VM) 1620 and one or more user VMs 1631-1632. A virtualization stub module 1611 running in the hypervisor 1610 extends memory management to include extended page tables (EPT) 1614 for the user VMs 1631-1632 and a privileged virtual memory management unit (PVMMU) 1612 for the privileged VM 1620, to implement the policies of trap and pass-through. In one embodiment, each VM 1620, 1631-1632 runs the native graphics driver 1628 which can directly access the performance-critical resources of the frame buffer and the command buffer, with resource partitioning as described below. To protect privileged resources, that is, the I/O registers and PTEs, corresponding accesses from the graphics drivers 1628 in user VMs 1631-1632 and the privileged VM 1620, are trapped and forwarded to the virtualization mediator 1622 in the privileged VM 1620 for emulation. In one embodiment, the virtualization mediator 1622 uses hypercalls to access the physical GPU 1600 as illustrated.

In addition, in one embodiment, the virtualization mediator 1622 implements a GPU scheduler 1626, which runs concurrently with the CPU scheduler 1616 in the hypervisor 1610, to share the physical GPU 1600 among the VMs 1631-1632. One embodiment uses the physical GPU 1600 to directly execute all the commands submitted from a VM, so it avoids the complexity of emulating the render engine, which is the most complex part within the GPU. In the meantime, the resource pass-through of both the frame buffer and command buffer minimizes the hypervisor's 1610 intervention on CPU accesses, while the GPU scheduler 1626 guarantees every VM a quantum for direct GPU execution. Consequently, the illustrated embodiment achieves good performance when sharing the GPU among multiple VMs.

In one embodiment, the virtualization stub 1611 selectively traps or passes-through guest access of certain GPU resources. The virtualization stub 1611 manipulates the EPT 1614 entries to selectively present or hide a specific address range to user VMs 1631-1632, while uses a reserved bit of PTEs in the PVMMU 1612 for the privileged VM 1620, to selectively trap or pass-through guest accesses to a specific address range. In both cases, the peripheral input/output (PIO) accesses are trapped. All the trapped accesses are forwarded to the virtualization mediator 1622 for emulation while the virtualization mediator 1611 uses hypercalls to access the physical GPU 1600.

As mentioned, in one embodiment, the virtualization mediator 1622 emulates virtual GPUs (vGPUs) 1624 for privileged resource accesses, and conducts context switches amongst the vGPUs 1624. In the meantime, the privileged VM 1620 graphics driver 1628 is used to initialize the physical device and to manage power. One embodiment takes a flexible release model, by implementing the virtualization mediator 1622 as a kernel module in the privileged VM 1620, to ease the binding between the virtualization mediator 1622 and the hypervisor 1610.

A split CPU/GPU scheduling mechanism is implemented via the CPU scheduler 1616 and GPU scheduler 1626. This is done because of the cost of a GPU context switch may be over 1000 times the cost of a CPU context switch (e.g., ~700 us vs. ~300 ns). In addition, the number of the CPU cores likely differs from the number of the GPU cores in a computer system. Consequently, in one embodiment, a GPU scheduler 1626 is implemented separately from the existing CPU scheduler 1616. The split scheduling mechanism leads to the requirement of concurrent accesses to the resources from both the CPU and the GPU. For example, while the CPU is accessing the graphics memory of VM1 1631, the GPU may be accessing the graphics memory of VM2 1632, concurrently.

As discussed above, in one embodiment, a native graphics driver 1628 is executed inside each VM 1620, 1631-1632, which directly accesses a portion of the performance-critical resources, with privileged operations emulated by the virtualization mediator 1622. The split scheduling mechanism leads to the resource partitioning design described below. To support resource partitioning better, one embodiment reserves a Memory-Mapped I/O (MMIO) register window to convey the resource partitioning information to the VM.

In one embodiment, the location and definition of virt_info has been pushed to the hardware specification as a virtualization extension so the graphics driver 1628 handles the extension natively, and future GPU generations follow the specification for backward compatibility.

While illustrated as a separate component in FIG. 16, in one embodiment, the privileged VM 1620 including the virtualization mediator 1622 (and its vGPU instances 1624 and GPU scheduler 1626) is implemented as a module within the hypervisor 1610.

In one embodiment, the virtualization mediator 1622 manages vGPUs 1624 of all VMs, by trap-and-emulating the privileged operations. The virtualization mediator 1622 handles the physical GPU interrupts, and may generate virtual interrupts to the designated VMs 1631-1632. For example, a physical completion interrupt of command execution may trigger a virtual completion interrupt, delivered to the rendering owner. The idea of emulating a vGPU instance per semantics is simple; however, the implementation involves a large engineering effort and a deep understanding of the GPU 1600. For example, approximately 700 I/O registers may be accessed by certain graphics drivers.

In one embodiment, the GPU scheduler 1626 implements a coarse-grain quality of service (QoS) policy. A particular time quantum may be selected as a time slice for each VM 1631-1632 to share the GPU 1600 resources. For example, in one embodiment, a time quantum of 16 ms is selected as the scheduling time slice, because this value results in a low human perceptibility to image changes. Such a relatively large quantum is also selected because the cost of the GPU context switch is over 1000× that of the CPU context switch, so it can't be as small as the time slice in the CPU scheduler 1616. The commands from a VM 1631-1632 are submitted to the GPU 1600 continuously, until the guest/VM runs out of its time-slice. In one embodiment, the GPU scheduler 1626 waits for the guest ring buffer to become idle before switching, because most GPUs today are non-preemptive, which may impact fairness. To minimize the wait overhead, a coarse-grain flow control mechanism may be implemented, by tracking the command submission to guarantee the piled commands, at any time, are within a certain limit. Therefore, the time drift between the allocated time slice and the execution time is relatively small, compared to the large quantum, so a coarse-grain QoS policy is achieved.

In one embodiment, on a render context switch, the internal pipeline state and I/O register states are saved and restored, and a cache/TLB flush is performed, when switching the render engine among vGPUs 1624. The internal pipeline state is invisible to the CPU, but can be saved and restored through GPU commands Saving/restoring I/O register states can be achieved through reads/writes to a list of the registers in the render context. Internal caches and Translation Lookaside Buffers (TLB) included in modern GPUs to accelerate data accesses and address translations, must be flushed using commands at the render context switch, to guarantee isolation and correctness. The steps used to switch a context in one embodiment are: 1) save current I/O states, 2) flush the current context, 3) use the additional commands to save the current context, 4) use the additional commands to restore the new context, and 5) restore I/O state of the new context.

As mentioned, one embodiment uses a dedicated ring buffer to carry the additional GPU commands. The (audited) guest ring buffer may be reused for performance, but it is not safe to directly insert the commands into the guest ring buffer, because the CPU may continue to queue more commands, leading to overwritten content. To avoid a race condition, one embodiment switches from the guest ring buffer to its own dedicated ring buffer. At the end of the context switch, this embodiment switches from the dedicated ring buffer to the guest ring buffer of the new VM.

One embodiment reuses the privileged VM 1620 graphics driver to initialize the display engine, and then manages the display engine to show different VM frame buffers.

When two vGPUs 1624 have the same resolution, only the frame buffer locations are switched. For different resolutions, the privileged VM may use a hardware scalar, a common feature in modern GPUs, to scale the resolution up and down automatically. Both techniques take mere milliseconds. In many cases, display management may not be needed such as when the VM is not shown on the physical display (e.g., when it is hosted on the remote servers).

As illustrated in FIG. 16, one embodiment passes through the accesses to the frame buffer and command buffer to accelerate performance-critical operations from a VM 1631-1632. For the global graphics memory space, 2 GB in size, graphics memory resource partitioning and address space ballooning techniques may be employed. For the local graphics memory spaces, each also with a size of 2 GB, a per-VM local graphics memory may be implemented through the render context switch, due to local graphics memory being accessible only by the GPU 1600.

As mentioned, one embodiment partitions the global graphics memory among VMs 1631-1632. As explained above, a split CPU/GPU scheduling mechanism requires that the global graphics memory of different VMs can be accessed simultaneously by the CPU and the GPU, so each VM must be presented at any time with its own resources, leading to the resource partitioning approach for global graphics memory.

Figure 17:
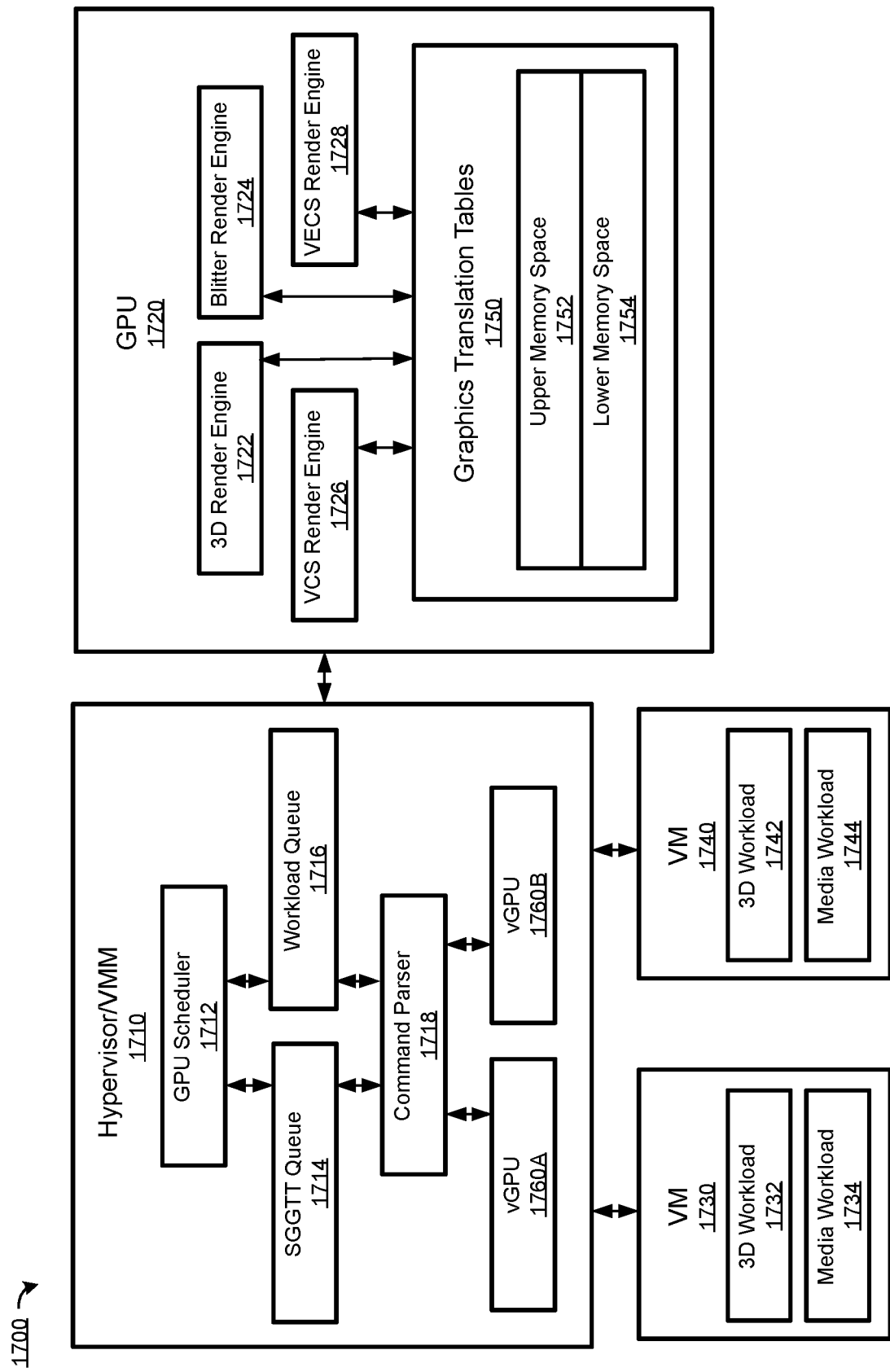
FIG. 17 illustrates an exemplary virtualized graphics processing architecture including virtual graphics processing units (vGPUs)

FIG. 17 illustrates additional details for one embodiment of a graphics virtualization architecture 1700 which includes multiple VMs, e.g., VM 1730 and VM 1740, managed by hypervisor 1710, including access to a full array of GPU features in a GPU 1720. In various embodiments, hypervisor 1710 may enable VM 1730 or VM 1740 to utilize graphics memory and other GPU resources for GPU virtualization. One or more virtual GPUs (vGPUs), e.g., vGPUs 1760A and 1760B, may access the full functionality provided by GPU 1720 hardware based on the GPU virtualization technology. In various embodiments, hypervisor 1710 may track, manage resources and lifecycles of the vGPUs 1760A and 1760B as described herein.

In some embodiments, vGPUs 1760A-B may include virtual GPU devices presented to VMs 1730, 1740 and may be used to interactive with native GPU drivers (e.g., as described above with respect to FIG. 16). VM 1730 or VM 1740 may then access the full array of GPU features and use virtual GPU devices in vGPUs 1760A-B to access virtual graphics processors. For instance, once VM 1730 is trapped into hypervisor 1710, hypervisor 1710 may manipulate a vGPU instance, e.g., vGPU 1760A, and determine whether VM 1730 may access virtual GPU devices in vGPU 1760A. The vGPU context may be switched per quantum or event. In some embodiments, the context switch may happen per GPU render engine such as 3D render engine 1722 or blitter render engine 1724. The periodic switching allows multiple VMs to share a physical GPU in a manner that is transparent to the workloads of the VMs.

GPU virtualization may take various forms. In some embodiments, VM 1730 may be enabled with device pass-through, where the entire GPU 1720 is presented to VM 1730 as if they are directly connected. Much like a single central processing unit (CPU) core may be assigned for exclusive use by VM 1730, GPU 1720 may also be assigned for exclusive use by VM 1730, e.g., even for a limited time. Another virtualization model is timesharing, where GPU 1720 or portions of it may be shared by multiple VMs, e.g., VM 1730 and VM 1740, in a fashion of multiplexing. Other GPU virtualization models may also be used by apparatus 1700 in other embodiments. In various embodiments, graphics memory associated with GPU 1720 may be partitioned, and allotted to various vGPUs 1760A-B in hypervisor 1710.

In various embodiments, graphics translation tables (GTTs) may be used by VMs or GPU 1720 to map graphics processor memory to system memory or to translate GPU virtual addresses to physical addresses. In some embodiments, hypervisor 1710 may manage graphics memory mapping via shadow GTTs, and the shadow GTTs may be held in a vGPU instance, e.g., vGPU 1760A. In various embodiments, each VM may have a corresponding shadow GTT to hold the mapping between graphics memory addresses and physical memory addresses, e.g., machine memory addresses under virtualization environment. In some embodiments, the shadow GTT may be shared and maintain the mappings for multiple VMs. In some embodiments, each VM 1730 or VM 1740, may include both per-process and global GTTs.

In some embodiments, apparatus 1700 may use system memory as graphics memory. System memory may be mapped into multiple virtual address spaces by GPU page tables. Apparatus 1700 may support global graphics memory space and per-process graphics memory address space. The global graphics memory space may be a virtual address space, e.g., 2 GB, mapped through a global graphics translation table (GGTT). The lower portion of this address space is sometimes called the aperture, accessible from both the GPU 1720 and CPU (not shown). The upper portion of this address space is called high graphics memory space or hidden graphics memory space, which may be used by GPU 1720 only. In various embodiments, shadow global graphics translation tables (SGGTTs) may be used by VM 1730, VM 1740, hypervisor 1710, or GPU 1720 for translating graphics memory addresses to respective system memory addresses based on a global memory address space.

In full GPU virtualization, a static global graphics memory space partitioning scheme may face a scalability problem. For example, for a global graphics memory space of 2 GB, the first 512 megabyte (MB) virtual address space may be reserved for aperture, and the rest of them, 1536 MB, may become the high (hidden) graphics memory space. With the static global graphics memory space partitioning scheme, each VM with full GPU virtualization enabled may be allotted with 128 MB aperture and 384 MB high graphics memory space. Therefore, the 2 GB global graphics memory space may only accommodate a maximum of four VMs.

Besides the scalability problem, VMs with limited graphics memory space may also suffer performance degradation. Sometimes, severe performance downgrade may be observed in some media-heavy workloads of a media application when it uses GPU media hardware acceleration extensively. As an example, to decode one channel 1080p H.264/Advanced Video Coding (AVC) bit stream, at least 40 MB of graphics memory may be needed. Thus, for 10 channels of 1080p H264/AVC bit stream decoding, at least 400 MB of graphics memory space may be needed. Meanwhile, some graphic memory space may have to be set aside for surface composition/color conversion, switching display frame buffer during the decoding process, etc. In this case, 512 MB of graphics memory space per VM may be insufficient for a VM to run multiple video encoding or decoding.

In various embodiments, apparatus 100 may achieve GPU graphics memory overcommitment with on-demand SGGTTs. In some embodiments, hypervisor 1710 may construct SGGTTs on demand, which may include all the to-be-used translations for graphics memory virtual addresses from different GPU components' owner VMs.

In various embodiments, at least one VM managed by hypervisor 1710 may be allotted with more than static partitioned global graphics memory address space as well as memory. In some embodiments, at least one VM managed by hypervisor 1710 may be allotted with or able to access the entire high graphics memory address space. In some embodiments, at least one VM managed by hypervisor 1710 may be allotted with or able to access the entire graphics memory address space.

Hypervisor/VMM 1710 may use command parser 1718 to detect the potential memory working set of a GPU rendering engine for the commands submitted by VM 1730 or VM 1740. In various embodiments, VM 1730 may have respective command buffers (not shown) to hold commands from 3D workload 1732 or media workload 1734. Similarly, VM 1740 may have respective command buffers (not shown) to hold commands from 3D workload 1742 or media workload 1744. In other embodiments, VM 1730 or VM 1740 may have other types of graphics workloads.

In various embodiments, command parser 1718 may scan a command from a VM and determine if the command contains memory operands. If yes, the command parser may read the related graphics memory space mappings, e.g., from a GTT for the VM, and then write it into a workload specific portion of the SGGTT. After the whole command buffer of a workload gets scanned, the SGGTT that holds memory address space mappings associated with this workload may be generated or updated. Additionally, by scanning the to-be-executed commands from VM 1730 or VM 1740, command parser 1718 may also improve the security of GPU operations, such as by mitigating malicious operations.

In some embodiments, one SGGTT may be generated to hold translations for all workloads from all VMs. In some embodiments, one SGGTT may be generated to hold translations for all workloads, e.g., from one VM only. The workload specific SGGTT portion may be constructed on demand by command parser 1718 to hold the translations for a specific workload, e.g., 3D workload 1732 from VM 1730 or media workload 1744 from VM 1740. In some embodiments, command parser 1718 may insert the SGGTT into SGGTT queue 1714 and insert the corresponding workload into workload queue 1716.

In some embodiments, GPU scheduler 1712 may construct such on-demand SGGTT at the time of execution. A specific hardware engine may only use a small portion of the graphics memory address space allocated to VM 1730 at the time of execution, and the GPU context switch happens infrequently. To take advantage of such GPU features, hypervisor 1710 may use the SGGTT for VM 1730 to only hold the in-execution and to-be-executed translations for various GPU components rather than the entire portion of the global graphics memory address space allotted to VM 1730.

GPU scheduler 1712 for GPU 1720 may be separated from the scheduler for CPU in apparatus 1700. To take the advantage of the hardware parallelism in some embodiments, GPU scheduler 1712 may schedule the workloads separately for different GPU engines, e.g., 3D render engine 1722, blitter render engine 1724, video command streamer (VCS) render engine 1726, and video enhanced command streamer (VECS) render engine 1728. For example, VM 1730 may be 3D intensive, and 3D workload 1732 may need to be scheduled to 3D render engine 1722 at a moment. Meanwhile, VM 1740 may be media intensive, and media workload 1744 may need to be scheduled to VCS render engine 1726 and/or VECS render engine 1728. In this case, GPU scheduler 1712 may schedule 3D workload 1732 from VM 1730 and media workload 1744 from VM 1740 separately.

In various embodiments, GPU scheduler 1712 may track in-executing SGGTTs used by respective render engines in GPU 1720. In this case, hypervisor 1710 may retain a per-render engine SGGTT for tracking all in-executing graphic memory working sets in respective render engines. In some embodiments, hypervisor 1710 may retain a single SGGTT for tracking all in-executing graphic memory working sets for all render engines. In some embodiments, such tracking may be based on a separate in-executing SGGTT queue (not shown). In some embodiments, such tracking may be based on markings on SGGTT queue 1714, e.g., using a registry. In some embodiments, such tracking may be based on markings on workload queue 1716, e.g., using a registry.

During the scheduling process, GPU scheduler 1712 may examine the SGGTT from SGGTT queue 1714 for a to-be-scheduled workload from workload queue 1716. In some embodiments, to schedule the next VM for a particular render engine, GPU scheduler 1712 may check whether the graphic memory working sets of the particular workload used by the VM for that render engine conflict with the in-executing or to-be-executed graphic memory working sets by that render engine. In other embodiments, such conflict checks may extend to check with the in-executing or to-be-executed graphic memory working sets by all other render engines. In various embodiments, such conflict checks may be based on the corresponding SGGTTs in SGGTT queue 1714 or based on SGGTTs retained by hypervisor 1710 for tracking all in-executing graphic memory working sets in respective render engines as discussed hereinbefore.

If there is no conflict, GPU scheduler 1712 may integrate the in-executing and to-be-executed graphic memory working sets together. In some embodiments, a resulting SGGTT for the in-executing and to-be-executed graphic memory working sets for the particular render engine may also be generated and stored, e.g., in SGGTT queue 1714 or in other data storage means. In some embodiments, a resulting SGGTT for the in-executing and to-be-executed graphic memory working sets for all render engines associated with one VM may also be generated and stored if the graphics memory addresses of all these workloads do not conflict with each other.

Before submitting a selected VM workload to GPU 1720, hypervisor 1710 may write corresponding SGGTT pages into GPU 1720, e.g., to graphics translation tables 1750. Thus, hypervisor 1710 may enable this workload to be executed with correct mappings in the global graphics memory space. In various embodiments, all such translation entries may be written into graphics translation tables 1750, either to lower memory space 1754 or upper memory space 1752. Graphics translation tables 1750 may contain separate tables per VM to hold for these translation entries in some embodiments. Graphics translation tables 1750 may also contain separate tables per render engine to hold for these translation entries in other embodiments. In various embodiments, graphics translation tables 1750 may contain, at least, to-be-executed graphics memory addresses.

However, if there is a conflict determined by GPU scheduler 1712, GPU scheduler 1712 may then defer the schedule-in of that VM, and try to schedule-in another workload of the same or a different VM instead. In some embodiments, such conflict may be detected if two or more VMs may attempt to use a same graphics memory address, e.g., for a same render engine or two different render engines. In some embodiments, GPU scheduler 1712 may change the scheduler policy to avoid selecting one or more of the rendering engines, which have the potential to conflict with each other. In some embodiments, GPU scheduler 1712 may suspend the execution hardware engine to mitigate the conflict.

In some embodiments, memory overcommitment scheme in GPU virtualization as discussed herein may co-exist with static global graphics memory space partitioning schemes. As an example, the aperture in lower memory space 1754 may still be used for static partition among all VMs. The high graphics memory space in upper memory space 1752 may be used for the memory overcommitment scheme. Compared to the static global graphics memory space partitioning scheme, memory overcommit scheme in GPU virtualization may enable each VM to use the entire high graphics memory space in upper memory space 1752, which may allow some applications inside each VM to use greater graphic memory space for improved performance.

With static global graphics memory space partitioning schemes, a VM initially claiming a large portion of memory may only use a small portion at runtime, while other VMs may be in the status of shortage of memory. With memory overcommitment, a hypervisor may allocate memory for VMs on demand, and the saved memory may be used to support more VMs. With SGGTT based memory overcommitment, only graphic memory space used by the to-be-executed workloads may be allocated at runtime, which saves graphics memory space and supports more VMs to access GPU 1720.

Current architectures enable the hosting of GPU workloads in cloud and data center environments. Full GPU virtualization is one of the fundamental enabling technologies used in the GPU Cloud. In full GPU virtualization, the virtual machine monitor (VMM), particularly the virtual GPU (vGPU) driver, traps and emulates the guest accesses to privileged GPU resources for security and multiplexing, while passing through CPU accesses to performance critical resources, such as CPU access to graphics memory. GPU commands, once submitted, are directly executed by the GPU without VMM intervention. As a result, close to native performance is achieved.

Current systems use the system memory for GPU engines to access a Global Graphics Translation Table (GGTT) and/or a Per-Process Graphics Translation Table (PPGTT) to translate from GPU graphics memory addresses to system memory addresses. A shadowing mechanism may be used for the guest GPU page table's GGTT/PPGTT.

The VMM may use a shadow PPGTT which is synchronized to the guest PPGTT. The guest PPGTT is write-protected so that the shadow PPGTT can be continually synchronized to the guest PPGTT by trapping and emulating the guest modifications of its PPGTT. Currently, the GGTT for each vGPU is shadowed and partitioned among each VM and the PPGTT is shadowed and per VM (e.g., on a per process basis). Shadowing for the GGTT page table is straightforward since the GGTT PDE table stays in the PCI bar0 MMIO range. However, the shadow for the PPGTT relies on write-protection of the Guest PPGTT page table and the traditional shadow page table is very complicated (and therefore buggy) and inefficient. For example, the CPU shadow page table has ~30% performance overhead in current architectures. Thus, in some of these systems an enlightened shadow page table is used, which modifies the guest graphics driver to cooperate in identifying a page used for the page table page, and/or when it is released.

The embodiments of the invention include a memory management unit (MMU) such as an I/O memory management unit (IOMMU) to remap from a guest PPGTT-mapped GPN (guest page numbers) to HPN (host page number), without relying on the low efficiency/complicated shadow PPGTT. At the same time, one embodiment retains the global shadow GGTT page table for address ballooning. These techniques are referred to generally as hybrid layer of address mapping (HLAM).

An IOMMU by default cannot be used in certain mediated pass-through architectures since only a single second level translation is available with multiple VMs. One embodiment of the invention resolves this problem, utilizing the following techniques:

1. Using the IOMMU to conduct two layers of translation without the shadow PPGTT. In particular, in one embodiment, the GPU translates from graphics memory address (GM_ADDR) to GPN, and the IOMMU translates from the GPN to HPN, rather than the shadow PPGTT which translates from the GM_ADDR to HPN with write-protection applied to the guest PPGTT.

2. In one embodiment, the IOMMU page table is managed per VM, and is switched (or maybe partially switched) when the vGPU is switched. That is, the corresponding VM's IOMMU page table is loaded when the VM/vGPU is scheduled in.

3. However, the GGTT-mapped addresses are shared in one embodiment, and this global shadow GGTT must remain valid because the vCPU may access the GGTT-mapped address (e.g., such as the aperture), even when the vGPU of this VM is not scheduled in. As such, one embodiment of the invention uses a hybrid layer of address translation which retains the global shadow GGTT, but directly uses the guest PPGTT.

4. In one embodiment, the GPN address space is partitioned to shift the GGTT-mapped GPN address (which becomes input to the IOMMU, like the GPN) to a dedicated address range. This can be achieved by trapping and emulating the GGTT page table. In one embodiment, the GPN is modified from the GGTT with a large offset to avoid overlap with the PPGTT in the IOMMU mapping.

Figure 18:
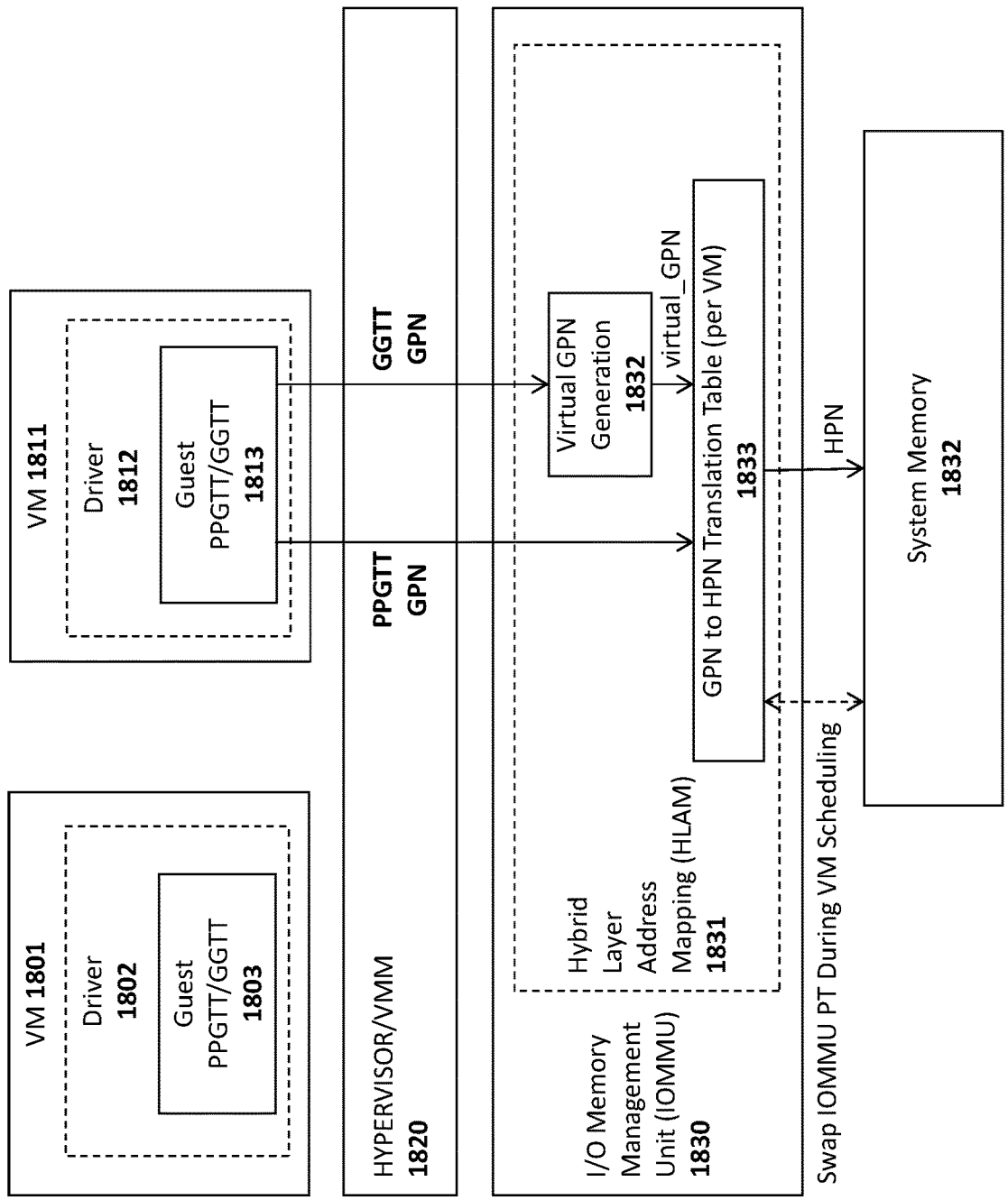
FIG. 18 illustrates one embodiment of a virtualization architecture with an IOMMU.

FIG. 18 illustrates an architecture employed in one embodiment in which an IOMMU 1830 is enabled for device virtualization. The illustrated architecture includes two VMs 1801, 1811 executed on hypervisor/VMM 1820 (although the underlying principles of the invention may be implemented with any number of VMs). Each VM 1801, 1811 includes a driver 1802, 1812 (e.g., a native graphics driver) which manages a guest PPGTT and GGTT 1803, 1813, respectively. The illustrated IOMMU 1830 includes a HLAM module 1831 for implementing the hybrid layer of address mapping techniques described herein. Notably, in this embodiment, shadow PPGTTs are not present.

In one embodiment, the entire Guest VM's (guest VM 1811 in the example) GPN to HPN translation page table 1833 is prepared in the IOMMU mapping, and each vGPU switch triggers an IOMMU page table swap. That is, as each VM 1801, 1811 is scheduled in, its corresponding GPN to HPN translation table 1833 is swapped in. In one embodiment, the HLAM 1831 differentiates between GGTT GPNs and PPGTT GPNs and modifies the GGTT GPNs so that they do not overlap with the PPGTT GPNs when performing a lookup in the translation table 1833. In particular, in one embodiment, virtual GPN generation logic 1832 converts the GGTT GPN into a virtual GPN which is then used to perform a lookup in the translation table 1833 to identify the corresponding HPN.

In one embodiment, the virtual GPN is generated by shifting the GGTT by a specified (potentially large) offset to ensure that the mapped addresses do not overlap/conflict with the PPGTT GPN. In addition, in one embodiment, since the CPU may access the GGTT mapped address (e.g., the aperture) anytime, the global shadow GGTT will always be valid and remain in the per VM's IOMMU mapping 1833.

In one embodiment, the hybrid layer address mapping 1831 solution partitions the IOMMU address range into two parts: a lower part reserved for PPGTT GPN-to-HPN translation, and an upper part reserved for GGTT virtual GPN-to-HPN translation. Since the GPN is provided by the VM/Guest 1811, the GPN should be in the range of the guest memory size. In one embodiment, the guest PPGTT page tables are left unaltered and all GPNs from the PPGTT are directly send to the graphics translation hardware/IOMMU by the workload execution. However, in one embodiment, the MMIO read/write from guest VMs is trapped and GGTT page table changes are captured and altered as described herein (e.g., adding a large offset to the GPN in order to ensure no overlap with the PPGTT mapping in the IOMMU).

Remote Virtualized Graphics Processing

Figure 19:
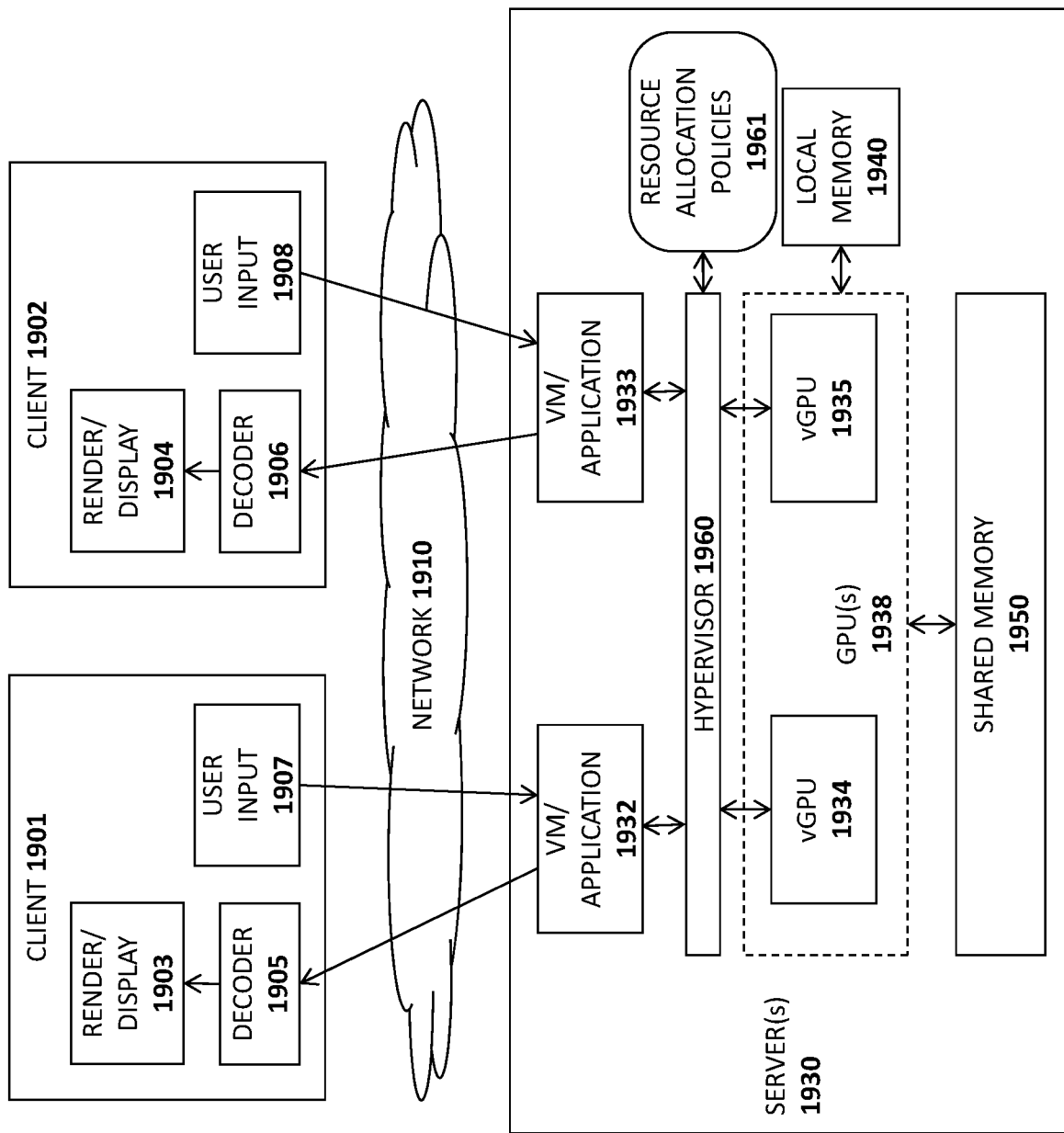
FIG. 19 illustrates one embodiment in which graphics processing is performed on a server.

In some embodiments of the invention, a server performs graphics virtualization, virtualizing physical GPUs and running graphics applications on behalf of clients. FIG. 19 illustrates one such embodiment in which two clients 1901-1902 are connected to servers 1930 over a network 1910 such as the Internet and/or a private network. The servers 1930 implement a virtualized graphics environment in which a hypervisor 1960 allocates resources from one or more physical GPUs 1938, presenting the resources as virtual GPUs 1934-1935 to VMs/applications 1932-1933. The graphics processing resources may allocated in accordance with resource allocation policies 1961 which may cause the hypervisor 1960 to allocate resources based on the requirements of the applications 1932-1933 (e.g., higher performance graphics applications requiring more resources), the user account associated with the applications 1932-1933 (e.g., with certain users paying a premium for higher performance), and/or the current load on the system. The GPU resources being allocated may include, for example, sets of graphics processing engines such as 3D engines, blit engines, execution units, and media engines, to name a few.

In one embodiment, a user of each client 1901-1902 has an account on the service hosting the server(s) 1930. For example, the service may offer a subscription service to provide users remote access to online applications 1932-1933 such as video games, productivity applications, and multi-player virtual reality applications. In one embodiment, the applications are executed remotely on a virtual machine in response to user input 1907-1908 from the clients 1901-1902. Although not illustrated in FIG. 19, one or more CPUs may also be virtualized and used to execute the applications 1932-1933, with graphics processing operations offloaded to the vGPUs 1934-1935.

In one embodiment, a sequence of image frames are generated by the vGPUs 1934-1935 in response to the execution of the graphics operations. For example, in a first person shooter game, a user may specify input 1907 to move a character around a fantasy world. In one embodiment, the resulting images are compressed (e.g., by compression circuitry/logic, not shown) and streamed over the network 1910 to the clients 1901-1902. In one implementation, a video compression algorithm such as H.261 may be used; however, various different compression techniques may be used. Decoders 1905-1906 decode the incoming video streams, which are then rendered on respective displays 1903-1904 of the clients 1901-1902.

Using the system illustrated in FIG. 19, high performance graphics processing resources such as GPUs 1938 may be allocated to different clients who subscribe to the service. In an online gaming implementation, for example, the servers 1930 may host new video games as they are released. The video game program code is then executed in the virtualized environment and the resulting video frames compressed and streamed to each client 1901-1902. The clients 1901-1902 in this architecture do not require significant graphics processing resources. For example, even a relatively low power smartphone or tablet with a decoder 1905-1906 will be capable of decompressing a video stream. Thus, the latest graphics-intensive video games may be played on any type of client capable of compressing video. While video games are described as one possible implementation, the underlying principles of the invention may be used for any form of application which requires graphics processing resources (e.g., graphic design applications, interactive and non-interactive ray tracing applications, productivity software, video editing software, etc).

Guaranteed Forward Progress

The memory fabric in a virtualized GPU implementation is shared by various graphics processing resources in a GPU (e.g., EUs, samplers, shaders, data ports, etc). Dynamic memory fabric provisioning logic allocates a portion of the memory fabric bandwidth to each of these resources using an arbitration policy which may factor in the particular VM or application for which the resource is performing its function (e.g., in accordance with a priority associated with the VM/application).

One embodiment of the invention implements an intelligent queueing mechanism in which queues at each level of the memory fabric are assigned to particular VMs. If a downstream queue is filled for a particular VM, an arbitrator will block data in the upstream queue for that VM, thereby preventing the traffic of one VM from blocking the traffic of another VM.

Figure 20:
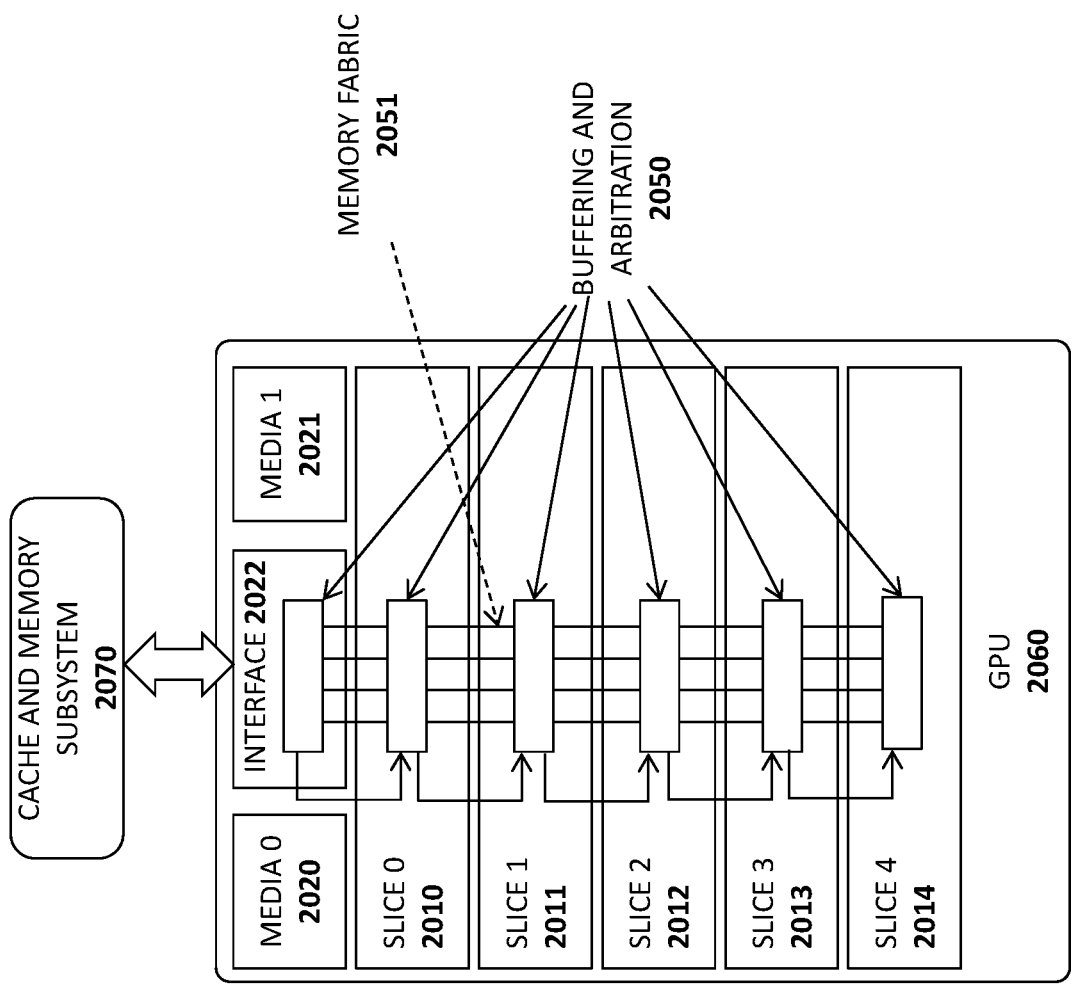
FIG. 20 illustrates one embodiment in which multiple graphics slices include buffering and arbitration circuitry.

FIG. 20 illustrates one embodiment of a GPU 2060 with graphics processing resources subdivided into a plurality of slices 2010-2014. In one embodiment, the slices 2010-2014 and media engines 2020-2021 are shared by multiple VMs via interface 2022, which also couples the slices 2010-2014 to a cache and memory subsystem 2070. The resources of each slice 2010-2014 are coupled to the memory fabric 2051 at connection points accessible via buffering and arbitration logic 2050. In one embodiment, each slice may include a designated set of graphics processing engines such as 3D processing engines, blit engines, and execution units, to name a few. Depending on the implementation, each slice 2010-2014 may include the same number and type of graphics processing engines or each slice 2010-2014 may be allocated a different number and type of graphics processing engines.

Figure 21:
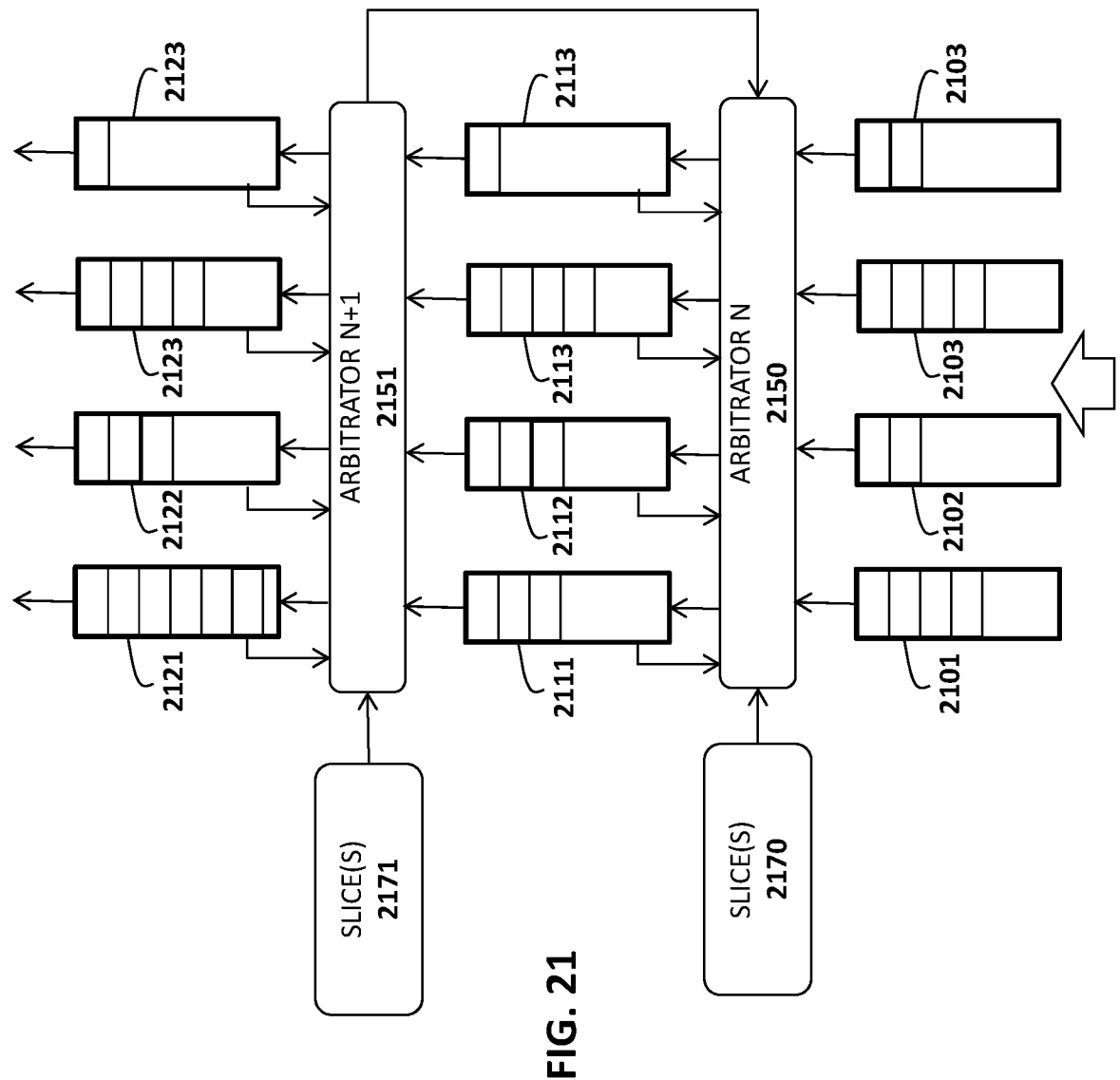
FIG. 21 illustrates multiple sets of buffers in accordance with one embodiment.

One embodiment of the invention uses multi-level queuing techniques to ensure that blocked traffic of one VM will not block traffic of another VM. In particular, as illustrated in FIG. 21, a multi-level queuing architecture is implemented in which arbitrators 2150-2151 connect slices 2170-2171 to the memory fabric via series of queues 2101-2103, 2111-2113, 2121-2123. Interface 2022 includes memory management circuitry and logic (e.g., a TLB, page walk logic, etc) to implement memory transactions on behalf of the slices 2010-2014 and media engines 2020-2021 within the cache and memory subsystem 2070 (e.g., performing virtual to physical memory translations, etc). In the illustrated embodiment, each arbitrator 2150-2151 is positioned between a set of upstream queues and a second of downstream queues. One particular queue at each level (e.g., queues 2101, 2111, 2121) may be allocated to a particular VM or application. In one implementation, an arbitrator 2150-2151 will not queue traffic in a VM's upstream queue (e.g., queue 2111) unless space is available in its downstream queue (e.g., queue 2121).

By way of example, and not limitation, if queues 2101, 2111, 2121 are storing traffic for VM0, arbitrator 2150 will not add new traffic to upstream queue 2111 if the downstream queue 2121 for VM0 is full (e.g., because of a page fault within interface 1322). Instead, arbitrator 450 will add traffic to queues 2112-2113 which may be assigned to other VMs. Once the downstream queue 2121 has space available, arbitrator 2150 will again store traffic in upstream queue 2111. In one implementation, arbitrator 2151 may send a signal to arbitrator 2150 to notify arbitrator 2150 when queue 2121 is full, thereby causing arbitrator 2150 to refrain from queuing more traffic in queue 2111 and instead focus on queuing traffic in the other queues 2112-2113. Similarly, when space becomes available in queue 2121, arbitrator 2151 will notify arbitrator 2150 that it may commence queueing of traffic in queue 2111.

One embodiment of the invention supports virtual channels in which each VM is assigned a different virtual channel for accessing the memory fabric. Each virtual channel, in turn, is associated with a sequence of queues, such as queues 2101, 2111, 2121 in the example above. Slice resources 2170-2171 are arranged between the queues and shared by the various VMs/applications executed in the system. The end result is that if traffic is blocked in one set of queues for one VM (e.g., as the result of a page fault within interface 1322), data traffic for other VMs may still be processed over the memory fabric 1351.

Figure 22:
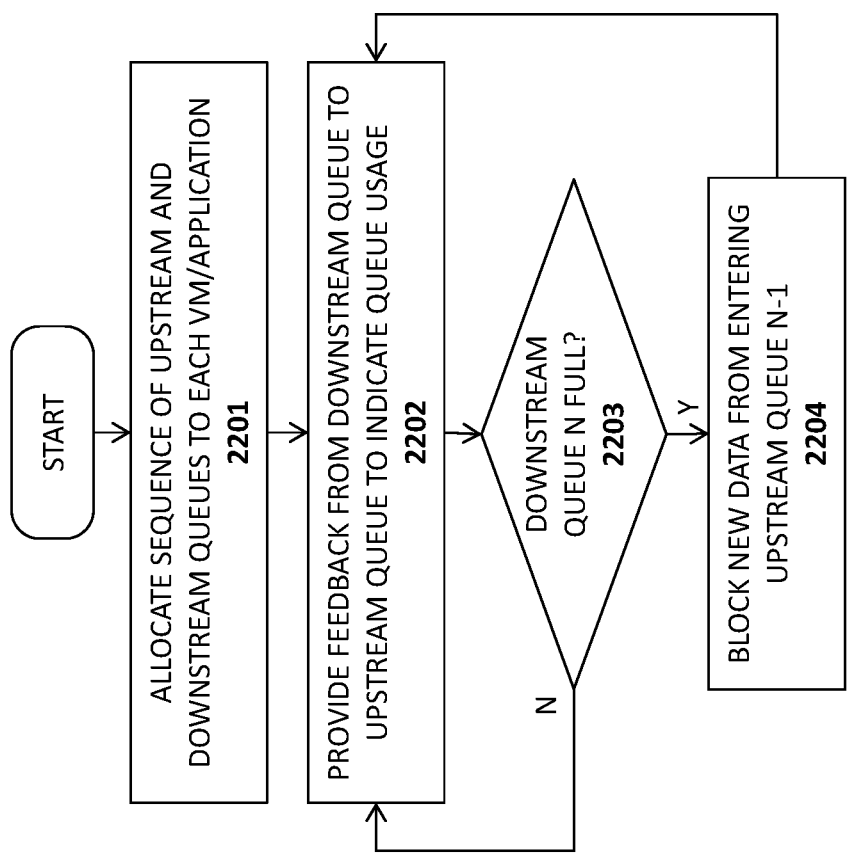
FIG. 22 illustrates a method in accordance with one embodiment of the invention.

A method in accordance with one embodiment of the invention is illustrated in FIG. 22. The method may be implemented within the context of the graphics processing architectures described herein, but is not limited to any particular architecture.

At 2201, a sequence of upstream and downstream queues are allocated to each VM/application. Note that the terms "upstream" and "downstream" are used in a relative sense— i.e., one queue may be upstream relative to a first queue and downstream relative to a second queue. In one embodiment, a single queue is allocated to the VM/application at each level in the stream. At 2202, feedback is provided from each downstream queue to each upstream queue (or to arbitration logic controlling the inputs to the queues) to indicate queue usage. For example, a signal may be sent to indicate that an upstream queue is full or close to being full.

If it is determined that a particular queue is full (e.g., queue N) at 2203, then any new data is blocked from entering the upstream queue (e.g., queue N–1) at 2204. The process then repeats from 2202 or, alternatively, 2201 if there is a new or different set of VMs/applications. Once queue N is no longer full, new traffic may be stored within queue N–1.

IOMMU Implementation with Multiple Slices

In implementations which include multiple stacks of graphics processing resources (e.g., multiple sets of slices), each stack has its own interface to the memory fabric and its own memory management unit (MMU). Each MMU may perform address translations on behalf of the slices in its stack and caches recently accessed translations in a local TLB. In some current implementations, each of the MMUs communicate with a central Input/Output Memory Management Unit (IOMMU) to perform the address translations and ensure coherency of the address translations.

One embodiment of the invention ensures coordination among the MMUs by establishing one MMU as a "master" and the remaining MMUs as "slaves." All communication with the IOMMU occurs through the master.

Figure 23:
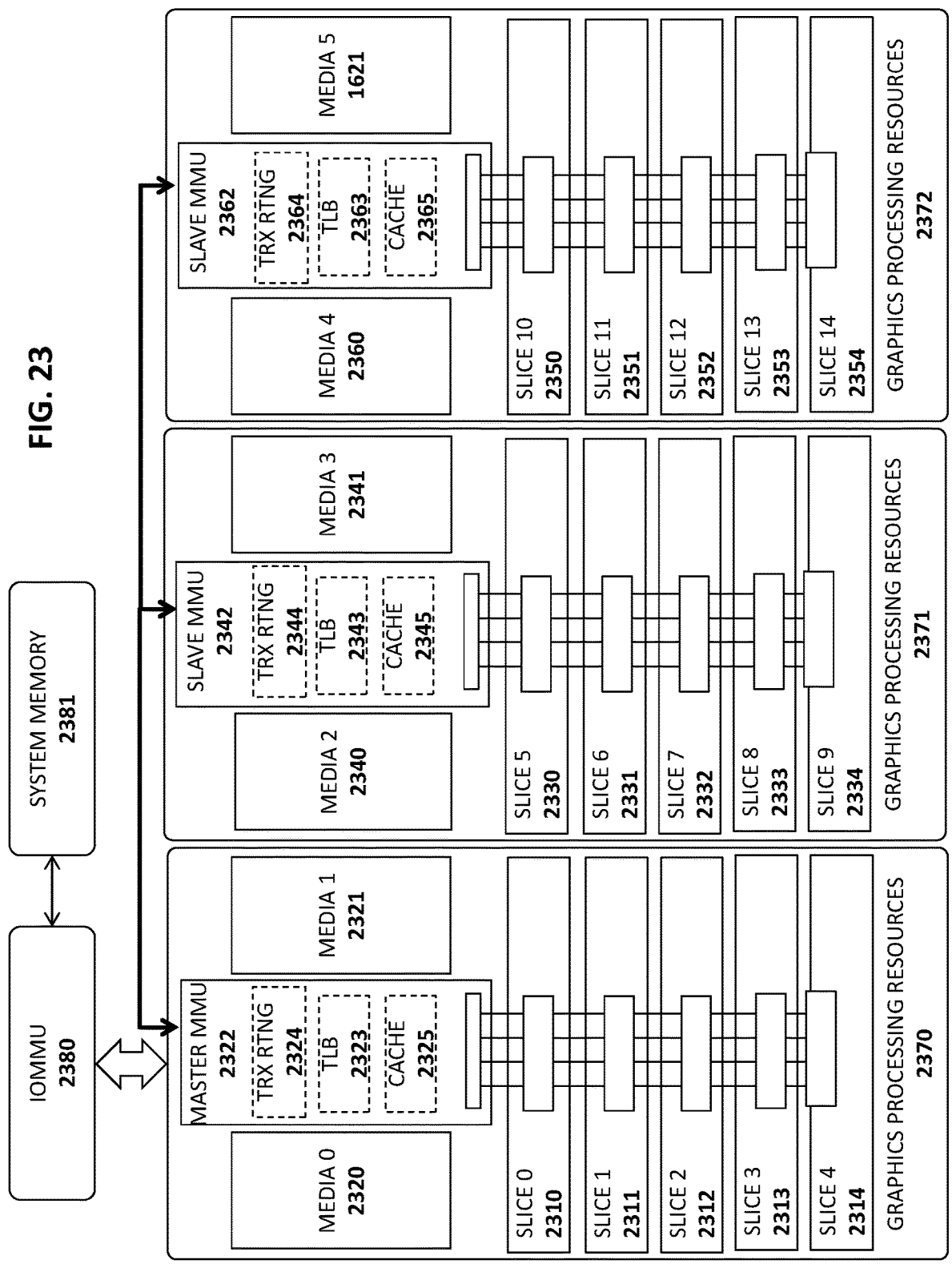
FIG. 23 illustrates master and slave memory management units servicing different sets of slices.

FIG. 23 illustrates one embodiment in which three sets of graphics processing resources 2370-2372 perform memory transactions via a single IOMMU 2380. Each set of graphics processing resources 2370-2372 includes a plurality of slices 2310-2314, 2330-2334, 2350-2354, each of which may include sets of execution units (EUs), samplers, 3D engines, rasterizers, pixel shaders, traversal units, or any other form of graphics processing resources. Each set of graphics processing resources also includes media processing units 2320-2321, 2340-2341, 2360-2361 and has a dedicated memory management unit (MMU) 2322, 2342, 2362 to perform memory access operations such as address translations, page fault operations, and page walk operations. Each MMU 2322, 2342, 2362 may include a local TLB 2323, 2343, 2363 for caching virtual to physical address translations and one or more caches 2325, 2345, 2365 for caching data and instructions.

In one implementation, one of the MMUs 2322 is designated the "master" which communicates directly with the IOMMU 2380 on behalf of the other MMUs 2342, 2362 which are designated as "slaves." Memory transactions from the slave MMUs 2342, 2362 are initially sent to the master MMU 2322, which forwards them to the IOMMU for processing. Thus, there is a single point of contact with the IOMMU, simplifying coordination and reducing traffic.

In one embodiment, certain memory management operations such as address translations may be handled without accessing the IOMMU 2380. For example, if MMU 2362 requires a translation which is stored in MMU 2342's TLB 2343 or MMU 2322's TLB 2323, then the translation may be provided to MMU without interaction with the IOMMU. Similarly, if a particular slice requires data stored in a local cache 2325, 2345, 2365, then the data may be retrieved without loading the IOMMU 2380. Thus, in one embodiment, memory management operations are initially attempted internally (i.e., within an MMU or through communication with other MMUs) before transmitting a request to the IOMMU 2380.

In one embodiment, an ID code is embedded in a private field of each transaction which uniquely identifies the MMU from which it originated. Transactions sent to the IOMMU 2380 and responses from the IOMMU 2380 will include the ID code. Transaction routing circuitry 2324, 2344, 2364 within the MMUs use the ID code to route the response from the IOMMU 2380 to the requesting MMU. In one embodiment, the transaction routing circuitry 2324, 2344, 2364 maintains a routing table or other data structure associating each of the MMUs 2322, 2342, 2362 with its ID code.

As mentioned, each of the MMUs 2322, 2342, 2362 includes its own TLB 2323, 2343, 2363, respectively, which caches recently utilized address translations. In a virtualized environment, each TLB entry may include a complete mapping from a virtual guest address (GVA) to a host physical address (HPA). Thus, if a translation is stored in a TLB, a standard two-level translation is not required (i.e., from GVA to guest physical address (GPA) and from the GPA to the HPA). The TLBs 2323, 2342, 2363 are kept coherent via communication between each of the MMUs 2322, 2342, 2362 and communication between the master MMU 2322 and the IOMMU 2380.

Figure 24:
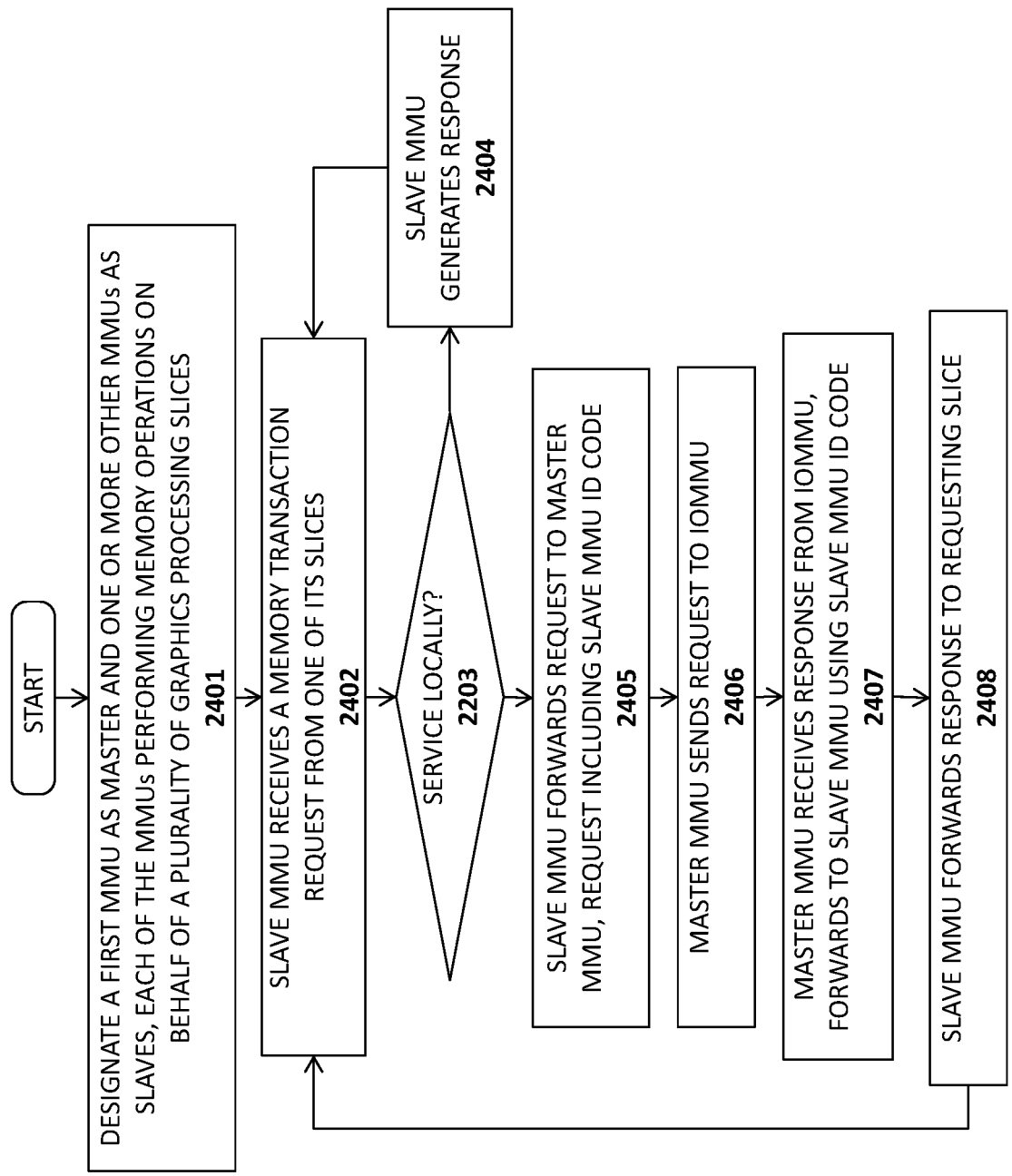
FIG. 24 illustrates a method in accordance with one embodiment of the invention.

A method in accordance with one embodiment of the invention is illustrated in FIG. 24. The method may be implemented within the context of the graphics processing architectures described herein, but is not limited to any particular architecture.

At 2401, a first MMU is designated as a master and one or more other MMUs are designated as slaves. As discussed above, each of the MMUs may be configured to service requests from a plurality of graphics processing slices. At 2402, a slave MMU receives a memory transaction request from one of its slices. If it can service the request locally, determined at 2203, then the slave MMU generates a response on its own at 2404. For example, the slave MMU may access the address translation from its local TLB or data from its local cache.

If the slave cannot service the request locally, then at 2405, it forwards the request to the master MMU, including the slave MMU ID code in the transaction packet. The master MMU may be able to service the request on its own or may send the request to the IOMMU. At 2406, the master MMU sends the request to the IOMMU which may access system memory on behalf of the slave MMU and generates a response (e.g., containing the requested data). In one embodiment, the request and the response include the slave MMU ID code. The master MMU receives the response from the IOMMU at 2407 and routes the response to the slave MMU using the ID code of the slave MMU. At 2408, the slave MMU forwards the response to the requesting slice.

The techniques described above reduce traffic between the MMU and IOMMU because many memory requests may be serviced locally. In addition, the embodiments of the invention reduce the physical communication lines required for the IOMMU to service a plurality of MMUs.

Managing Virtual Graphics Processing Units Using a Process Address Space ID

PCI Express devices are enumerated using Bus:Device: Function values where the function values are limited to 0-7. As a result, current implementations which distinguish virtual GPUs (vGPUs) using different function values are limited to 8 vGPUs. While it is possible to modify the Device value within the PCIe enumeration scheme, this would be complicated as the new device value for a graphics device may conflict with other devices (e.g., graphics devices are generally enumerated with a Device value of 2).

One embodiment of the invention provides support for additional vGPUs by using the process address space ID (PASID) to identify different vGPUs. Given that the PASID value of 20 bits, for example, a virtually unlimited number of vGPUs can be addressed.

Figure 25:
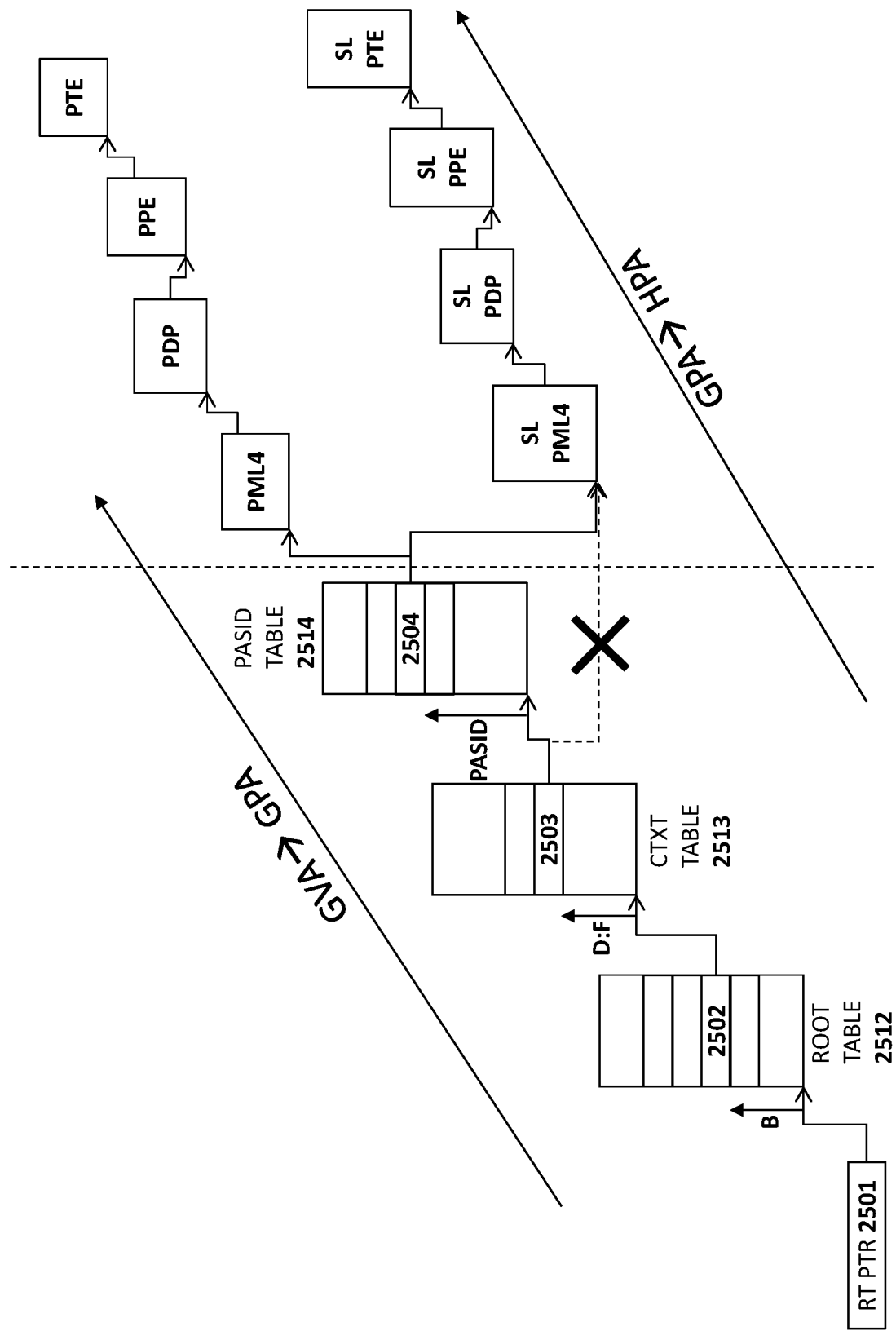
FIG. 25 illustrates one embodiment which uses process address space identifier (PASID) values to address a large number of graphics processing units (GPUs)

FIG. 25 illustrates multi-level page table lookups employed in one embodiment which utilize the PASID to distinguish between vGPUs. A root pointer 2501 points to base of a root table 2512. As illustrated, the B value (Bus) of the B:D:F enumeration is used as an offset to identify entry 2502 which points to the base of a context table 2513. The D (Device) and F (Function) values are then used as an offset to entry 2503 in the context table 2513.

In prior implementations, the entry in the context table 2513 would point to both the PASID table 2514 and the Second Level Page-Map Level-4 (SL PML-4) table (as indicated by the dotted line with an X). In one embodiment of the invention, the context table 2513 does not point to SL PML-4. Rather, the PASID value 2504 is used to identify both the first level PML-4 table when performing graphics virtual address (GVA) to graphics physical address (GPA) mapping and the second level PML-4 table when performing GPA to host physical address (HPA) mapping. Thus, in the illustrated embodiment, the entry 2503 in the context table 2513 identifies a PASID table 2514 and the PASID value is used as an offset to identify an entry 2504 which points to both PML-4 and SL PML-4. One benefit of this arrangement is that the PASID is a 20 bit value, providing $2^{20}$ addressing space for identifying a large number of different virtual GPUs (in contrast to prior systems which were subject to 8 vGPUs using B:D:F enumeration).

In this embodiment, a specified portion of the PASID (e.g., N contiguous bits or bits distributed within the PASID) may be used to identify the set of first level and second level tables for a particular vGPU. Of course, the vGPU identifier may be stored in the PASID in a variety of ways while still complying with the underlying principles of the invention.

Figure 26:
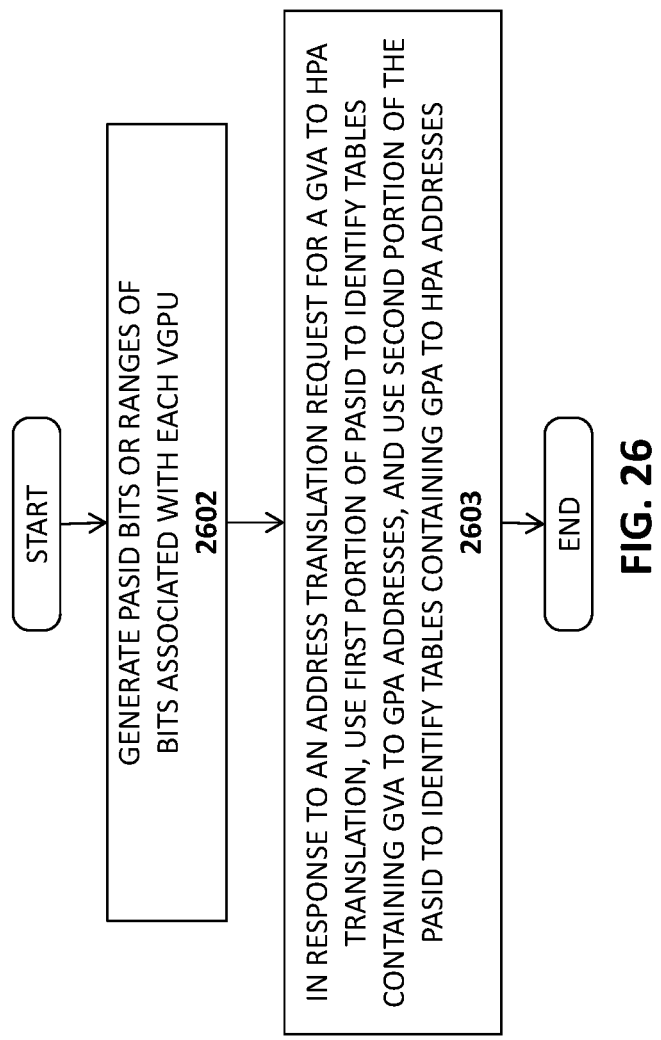
FIG. 26 illustrates a method in accordance with one embodiment of the invention.

A method in accordance with one embodiment of the invention is illustrated in FIG. 26. The method may be implemented within the context of the graphics processing architectures described herein, but is not limited to any particular architecture.

At 2601 each vGPU is associated with a particular set of bits or range of bits within the PASID. At 2603, in response to an address translation request for a graphics virtual address (GVA) to host physical address (HPA) translation, a first portion of the PASID is used to identify tables containing the GVA to graphics physical address (GPA) (i.e., "first level" tables). A second portion of the PASID is used to identify tables containing GPA to HPA translations (i.e., "second level" tables).

The embodiments of the invention dramatically simplify the configuration of virtualized graphics systems with more than 8 vGPUs (the current limit using PCIe enumeration). As described above, this may be accomplished by using the PASID to address different vGPUs, taking advantage of the extremely large address range supported by the 20-bit PASID.

Guest Virtual Base Address Register Implementations

One embodiment uses a virtual PCI Express Base Address Register (BAR) to expose private device memory to the operating system (OS) and Hypervisor/VMM, allocating that private memory among guest virtual machines (VMs), enforcing the allocations when the virtualized device accesses the private memory on behalf of a guest. The device may create a PCI Base Address Register ($BAR_H$) and the VMM/Hypervisor maps the BAR with the device (or function) into a VM (i.e., $BAR_{Host} \rightarrow BAR_{Guest}$) If hardware has reason to handle this BAR range separately (e.g., bypassing IOMMU, different control configurations, etc) then the guest page of the $BAR_G$ is determined. A real or emulated register may be used to allow software to self-report the guest value of $BAR_G$ to hardware. Hardware can then detect and translate guest physical addresses (GPAs) within this range as described below.

One embodiment of the invention is used for allocating high bandwidth memory (HBM). When a single graphics processing unit (GPU) utilizing HBM is shared with multiple VMs, the graphics hardware and software must distribute the HBM among the VMs. Techniques are implemented to ensure that the contents of these per-VM allocations are protected from accesses by other VMs, whether they are granted a share of a given GPU or not.

In one embodiment of the invention, because HBM represents real physical memory, and not just address space (i.e., the Global Graphics Translation Table (GGTT)), the allocation scheme handles less than the maximum number of active virtual functions (VFs) without wasting HBM. In particular, this embodiment includes hardware that supports a programmable HBM size allocation for each VF (rather than simply dividing the HBM evenly into TotalVF+1 partitions).

One embodiment allocates HMB to VFs in increments of 2M. This is compatible with current IOMMU designs with page tables that support 4K and 2M page sizes. However, the underlying principles of the invention are not limited to any particular increment size for allocating HBM.

Figure 27:
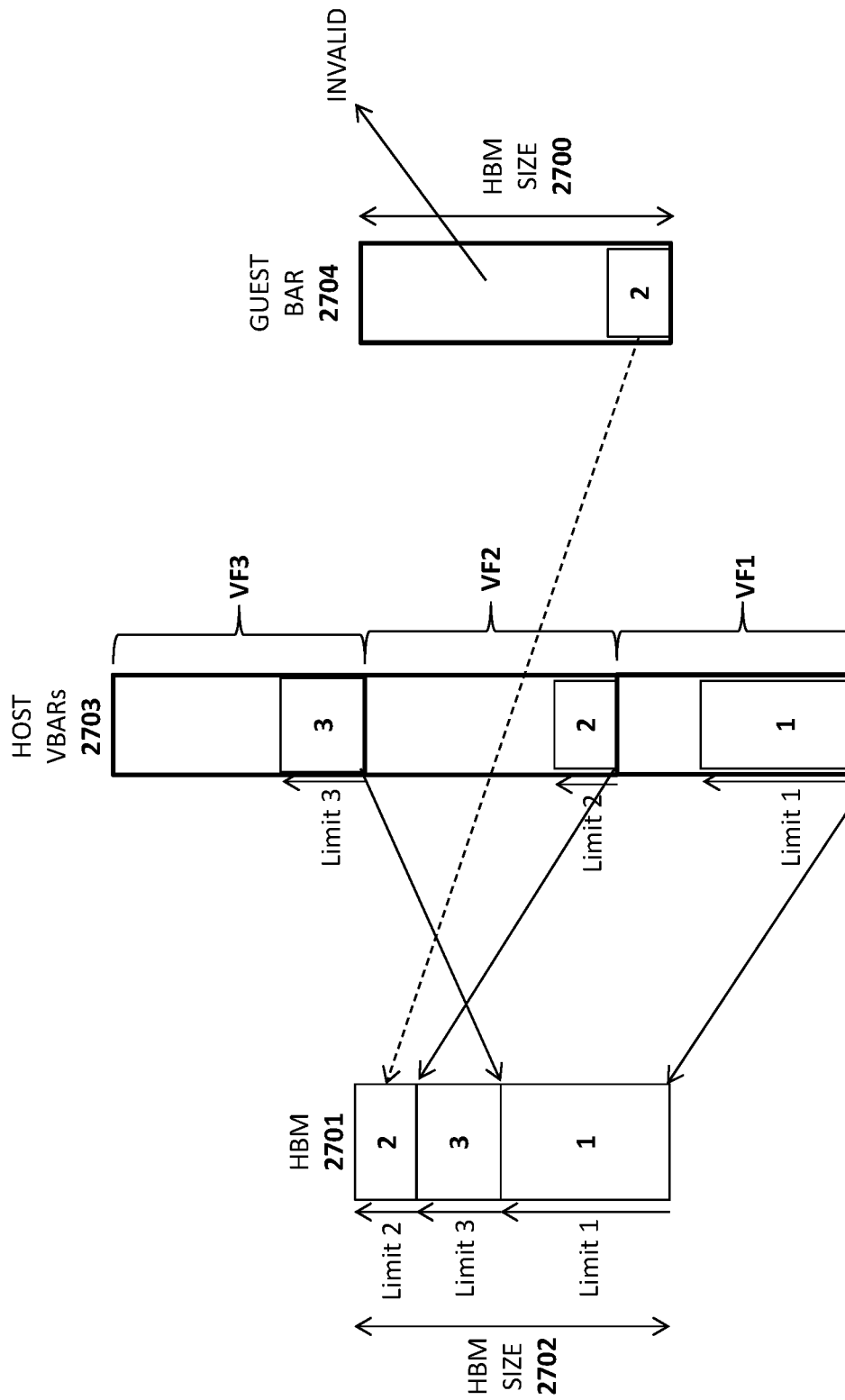
FIG. 27 illustrates an exemplary arrangement of guest base address registers (BARs) and host BARs.

FIG. 27 illustrates a flexible allocation of the HBM to VMs sharing a single graphics device through base and limit values on a VF-by-VF basis. In particular, in one embodiment, the programmable HBM size allocation 2700 is realized by sizing the virtual functions' VF HBMBAR 2704 to be equal to the size of the host HBMBAR 2702 (e.g., 2G). Each individual VF is then provisioned with a range, VFn_HBMSIZE (e.g., where n is between 1 and 7 for seven different virtual functions), within the private HBM 2701 that will be accessible from its own VFn_HBMBAR_H. Host VBARs 2703 are illustrated for VF1 (VF1_HBMBAR_H), VF2 (VF2_HBMBAR_H), and VF3 (VF3_HBMBAR_H). That range maps into each VFn_HBMBAR_H starting at the base (0) and extending from there for VFn_HBMSIZE MB, as indicated by the Limit 1, 2, and 3 indicators. This may or may not cover the entire VFn_HBMBAR_H. If not, then the region above VFn_HBMSIZE maps to an invalid access (i.e. a dummy page, unique per VF), as illustrated in FIG. 27, rather than to any other part of the private HBM memory or other parts of DRAM.

In one embodiment, the HBM detection and bypass mechanism described above for Passthrough is extended for each individual VF. To do so, one embodiment includes a separate VFn_HBMBASE_G, VFn_HBMBASE_H, and VFn_HBMSIZE per VF (G=guest and H=host). Only the VFn_HBMBASE_G may be writeable by the Guest VM. The other values are programmable only from the physical function (e.g., function 0 as indicated in the table below).

Using these techniques software may configure between 0 and HBMSIZE of HBM for each VF. Physical function (PF) software in the control domain governs the arrangement of the segments in the private HBM. This PF SW ensures that the VF related regions are non-overlapping. They may be adjacent although small gaps may later require compaction to reclaim into useful sizes.

In one embodiment, the VMM/PF driver may suspend a VM's operation on a VF, modify this memory mapping, and then resume the VM. This technique is used to re-balance/resize the HBM allocation to a VM for compacting and consolidating small free ranges of HBM resulting from VM shut down, etc. For example, in FIG. 27, if VM3 were destroyed then VM2s range could be shifted down adjacent to VM1s.

In one implementation, VMM/Hypervisor provisioning software communicates the HBM allocation for a particular VF interface through the PF driver prior to launching a VM with that VF assigned. PF software determines the value of VFn_HBMBASE_H and VFn_HBMSIZE for the VF. VFn_HBMSIZE may be made available to the VM during initialization such that the VM's VF kernel mode driver (KMD) can discover the amount of HBM memory available to manage within its HBMBAR. The VFs may all have the same size HBMBAR. Once the VMM/Hypervisor has mapped that BAR into the VM's address space, the VM software will report back the observed base of the HBMBAR (VFn_HBMBASE_G) as a graphics physical address (GPA). This may be supported through a VF→PF software channel and/or an emulated memory mapped I/O (MMIO) register according to the scalable input-output virtualization (IOV) framework implemented in current architectures (e.g., PCI Express implementations).

In one embodiment, these three registers (VFn_HBMBASE_H, VFn_HBMBAR_G, VFn_HBMSIZE) are implemented for each engine within the GPU (e.g., each render engine, media engine, etc) and the command streamer (CS) is responsible for programming them when it loads a new context onto an engine. The CS may load that information from a Context Descriptor in host memory (but this data must not be accessible by Guest KMDs or other VM software). Alternatively, if the total number of VFs is relatively small (e.g., 7), the graphics arbiter (GAM) can implement all 7 sets of VF registers and choose among them accordingly, without any additional dependency on the CS (although the CS still provides Engine VF to GAM, per existing SR-IOV requirements).

Figure 28:
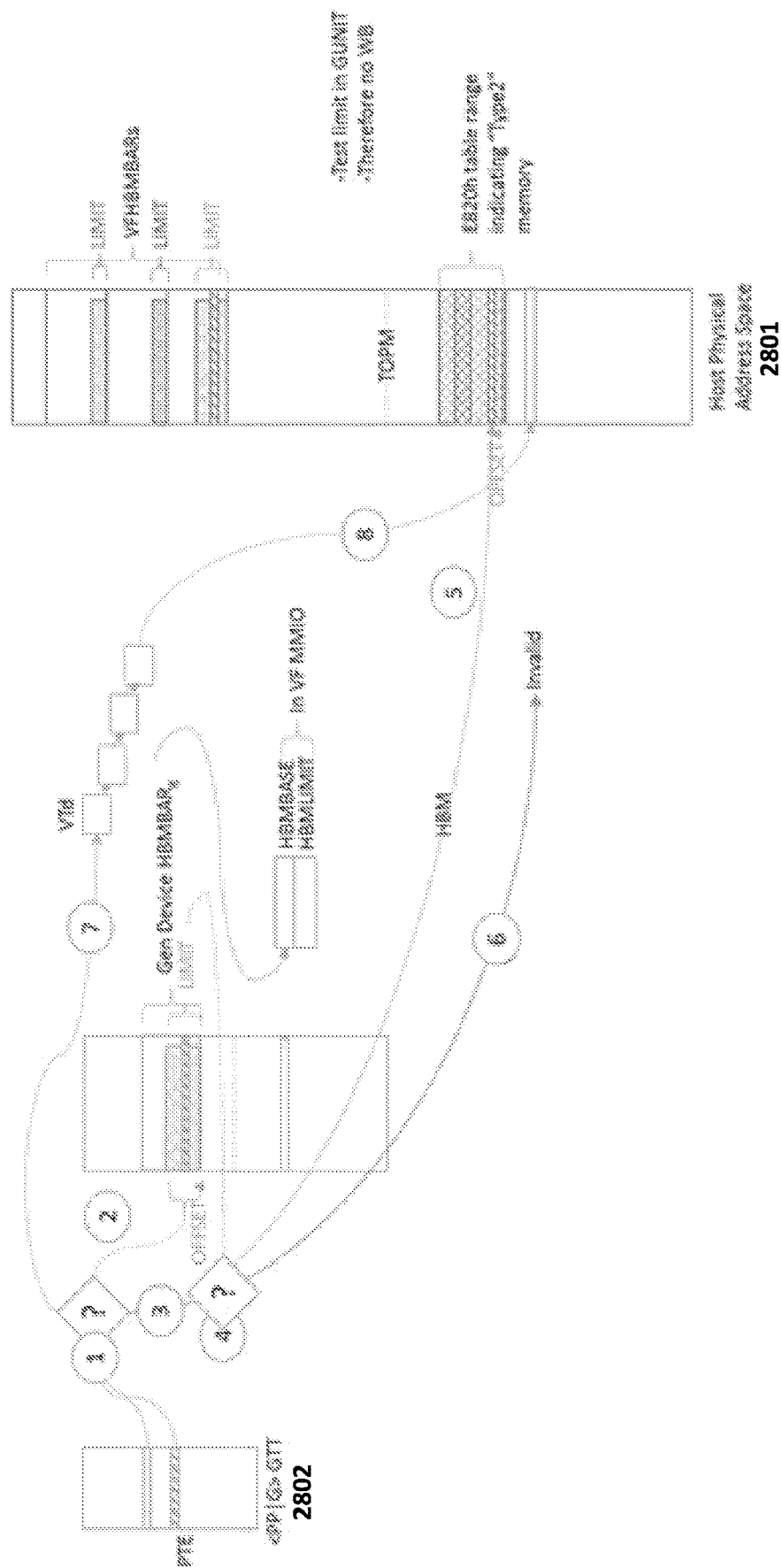
FIG. 28 illustrates exemplary mappings from a page table entry into a host physical address space.

FIG. 28 illustrates a specific example which performs a bypass of Virtualization Technology for Directed I/O (VT-d) or redirection to an invalid access path depending on the offset of the access with the VFs HBMBAR. In this embodiment, each VF driver continues to use $PTE_G$ in the global graphics translation table (GGTT) and per-process graphics translation table (PPGTT) tables 2802 (including the Aperture). At time of use, the hardware performs a range compare for VFn_HBMBAR_G and VFn_HBMSIZE for the VF executing on that Engine or Display as indicated at (1). On an access within that range, the hardware remaps to an offset for VFn_HBMBASE_H for that VF at (2). If the offset computed is greater than VFn_HBMSIZE (determined at (4), after bypassing VT-d at (3)) then the access is invalid (6) and handled in such a manner as to prevent any data leakage into, out of or across VMs through invalid accesses. If the offset is within the limit then the offset is added to the base at (5). If the GPA PTE is not in range of the HBMBAR_G, as determined at (1), then a page walk is performed at (7) and HPAs determined and stored at (8).

$PTE_H$ must/will land only as an invalid access (6) or within the allocated range of HBM for that VF (5) and nowhere else when the bypass is triggered (3). When the $PTE_G$ is outside the VFn_HBMBAR_G range within the VM then it is not bypassing the usual $2^{nd}$ Level IOMMU walk and so VT-d will govern the determination of $PTE_H$.

Virtualizing Graphics Translation Tables Across a Large Number of VMs

As resolutions and the number of VMs used for graphics processing increase, the graphics translation tables (GTTs) will become overloaded. Current GTTs have size limitations (e.g., 4 GB) which will be inadequate to support future implementations.

In one embodiment, instead of a 1-level GTT page table, a multi-level page table is used where each VM is assigned its own page table. A per-VM multi-level page walk may then be performed. A multi-level page walk is not done today because of performance issues (e.g., tearing). To address these limitations, embodiments of the invention perform intelligent caching and pre-translation to improve performance.

Figure 29:
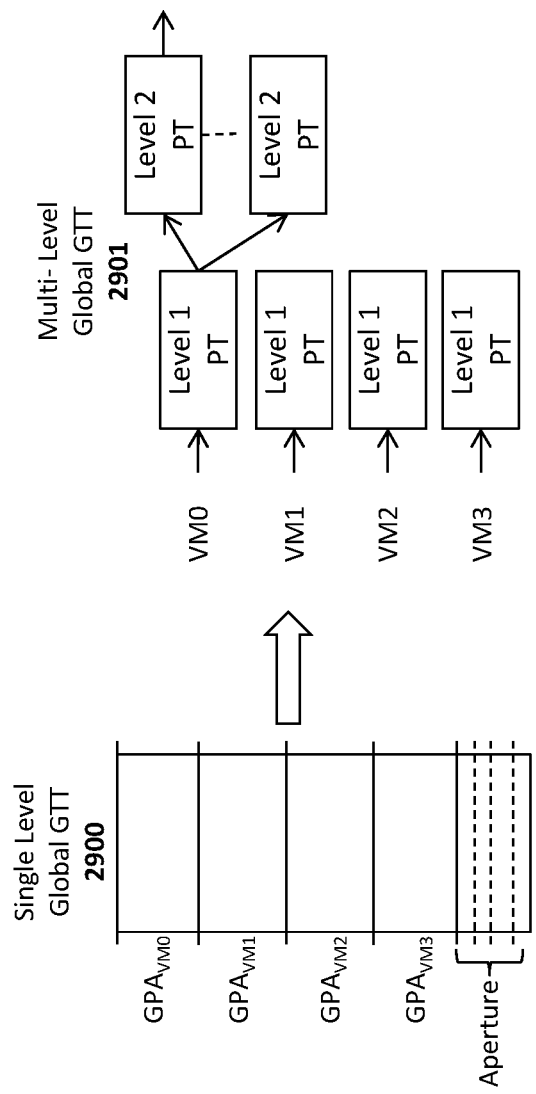
FIG. 29 compares single level graphics translation tables with multi-level translation tables.

FIG. 29 illustrates a comparison between a single-level global GTT 2900 and a multi-level global GTT 2901. In the single-level global GTT 2900, each VM is allocated a designated portion of the graphics physical address space within the table which maps each GPA to an HPA. In contrast, in the multi-level global GTT 2901, each VM is assigned its own Level 1 page table in which each entry points to a Level 2 page table as illustrated. In one embodiment, the TLBs may be populated intelligently to ensure that the pages are readily available.

In some embodiments, a graphics processing unit (GPU) is communicatively coupled to host/processor cores to accelerate graphics operations, machine-learning operations, pattern analysis operations, and various general purpose GPU (GPGPU) functions. The GPU may be communicatively coupled to the host processor/cores over a bus or another interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

System Overview

FIG. 1 is a block diagram illustrating a computing system 100 configured to implement one or more aspects of the embodiments described herein. The computing system 100 includes a processing subsystem 101 having one or more processor(s) 102 and a system memory 104 communicating via an interconnection path that may include a memory hub 105. The memory hub 105 may be a separate component within a chipset component or may be integrated within the one or more processor(s) 102. The memory hub 105 couples with an I/O subsystem 111 via a communication link 106. The I/O subsystem 111 includes an I/O hub 107 that can enable the computing system 100 to receive input from one or more input device(s) 108. Additionally, the I/O hub 107 can enable a display controller, which may be included in the one or more processor(s) 102, to provide outputs to one or more display device(s) 110A. In one embodiment the one or more display device(s) 110A coupled with the I/O hub 107 can include a local, internal, or embedded display device.

In one embodiment the processing subsystem 101 includes one or more parallel processor(s) 112 coupled to memory hub 105 via a bus or other communication link 113. The communication link 113 may be one of any number of standards based communication link technologies or protocols, such as, but not limited to PCI Express, or may be a vendor specific communications interface or communications fabric. In one embodiment the one or more parallel processor(s) 112 form a computationally focused parallel or vector processing system that an include a large number of processing cores and/or processing clusters, such as a many integrated core (MIC) processor. In one embodiment the one or more parallel processor(s) 112 form a graphics processing subsystem that can output pixels to one of the one or more display device(s) 110A coupled via the I/O Hub 107. The one or more parallel processor(s) 112 can also include a display controller and display interface (not shown) to enable a direct connection to one or more display device(s) 110B.

Within the I/O subsystem 111, a system storage unit 114 can connect to the I/O hub 107 to provide a storage mechanism for the computing system 100. An I/O switch 116 can be used to provide an interface mechanism to enable connections between the I/O hub 107 and other components, such as a network adapter 118 and/or wireless network adapter 119 that may be integrated into the platform, and various other devices that can be added via one or more add-in device(s) 120. The network adapter 118 can be an Ethernet adapter or another wired network adapter. The wireless network adapter 119 can include one or more of a Wi-Fi, Bluetooth, near field communication (NFC), or other network device that includes one or more wireless radios.

The computing system 100 can include other components not explicitly shown, including USB or other port connections, optical storage drives, video capture devices, and the like, may also be connected to the I/O hub 107. Communication paths interconnecting the various components in FIG. 1 may be implemented using any suitable protocols, such as PCI (Peripheral Component Interconnect) based protocols (e.g., PCI-Express), or any other bus or point-to-point communication interfaces and/or protocol(s), such as the NV-Link high-speed interconnect, or interconnect protocols known in the art.

In one embodiment, the one or more parallel processor(s) 112 incorporate circuitry optimized for graphics and video processing, including, for example, video output circuitry, and constitutes a graphics processing unit (GPU). In another embodiment, the one or more parallel processor(s) 112 incorporate circuitry optimized for general purpose processing, while preserving the underlying computational architecture, described in greater detail herein. In yet another embodiment, components of the computing system 100 may be integrated with one or more other system elements on a single integrated circuit. For example, the one or more parallel processor(s), 112 memory hub 105, processor(s) 102, and I/O hub 107 can be integrated into a system on chip (SoC) integrated circuit. Alternatively, the components of the computing system 100 can be integrated into a single package to form a system in package (SIP) configuration. In one embodiment at least a portion of the components of the computing system 100 can be integrated into a multi-chip module (MCM), which can be interconnected with other multi-chip modules into a modular computing system.

It will be appreciated that the computing system 100 shown herein is illustrative and that variations and modifications are possible. The connection topology, including the number and arrangement of bridges, the number of processor(s) 102, and the number of parallel processor(s) 112, may be modified as desired. For instance, in some embodiments, system memory 104 is connected to the processor(s) 102 directly rather than through a bridge, while other devices communicate with system memory 104 via the memory hub 105 and the processor(s) 102. In other alternative topologies, the parallel processor(s) 112 are connected to the I/O hub 107 or directly to one of the one or more processor(s) 102, rather than to the memory hub 105. In other embodiments, the I/O hub 107 and memory hub 105 may be integrated into a single chip. Some embodiments may include two or more sets of processor(s) 102 attached via multiple sockets, which can couple with two or more instances of the parallel processor(s) 112.

Some of the particular components shown herein are optional and may not be included in all implementations of the computing system 100. For example, any number of add-in cards or peripherals may be supported, or some components may be eliminated. Furthermore, some architectures may use different terminology for components similar to those illustrated in FIG. 1. For example, the memory hub 105 may be referred to as a Northbridge in some architectures, while the I/O hub 107 may be referred to as a Southbridge.

FIG. 2A illustrates a parallel processor 200, according to an embodiment. The various components of the parallel processor 200 may be implemented using one or more integrated circuit devices, such as programmable processors, application specific integrated circuits (ASICs), or field programmable gate arrays (FPGA). The illustrated parallel processor 200 is a variant of the one or more parallel processor(s) 112 shown in FIG. 1, according to an embodiment.

In one embodiment the parallel processor 200 includes a parallel processing unit 202. The parallel processing unit includes an I/O unit 204 that enables communication with other devices, including other instances of the parallel processing unit 202. The I/O unit 204 may be directly connected to other devices. In one embodiment the I/O unit 204 connects with other devices via the use of a hub or switch interface, such as memory hub 105. The connections between the memory hub 105 and the I/O unit 204 form a communication link 113. Within the parallel processing unit 202, the I/O unit 204 connects with a host interface 206 and a memory crossbar 216, where the host interface 206 receives commands directed to performing processing operations and the memory crossbar 216 receives commands directed to performing memory operations.

When the host interface 206 receives a command buffer via the I/O unit 204, the host interface 206 can direct work operations to perform those commands to a front end 208. In one embodiment the front end 208 couples with a scheduler 210, which is configured to distribute commands or other work items to a processing cluster array 212. In one embodiment the scheduler 210 ensures that the processing cluster array 212 is properly configured and in a valid state before tasks are distributed to the processing clusters of the processing cluster array 212. In one embodiment the scheduler 210 is implemented via firmware logic executing on a microcontroller. The microcontroller implemented scheduler 210 is configurable to perform complex scheduling and work distribution operations at coarse and fine granularity, enabling rapid preemption and context switching of threads executing on the processing array 212. In one embodiment, the host software can prove workloads for scheduling on the processing array 212 via one of multiple graphics processing doorbells. The workloads can then be automatically distributed across the processing array 212 by the scheduler 210 logic within the scheduler microcontroller.

The processing cluster array 212 can include up to "N" processing clusters (e.g., cluster 214A, cluster 214B, through cluster 214N). Each cluster 214A-214N of the processing cluster array 212 can execute a large number of concurrent threads. The scheduler 210 can allocate work to the clusters 214A-214N of the processing cluster array 212 using various scheduling and/or work distribution algorithms, which may vary depending on the workload arising for each type of program or computation. The scheduling can be handled dynamically by the scheduler 210, or can be assisted in part by compiler logic configured for execution by the processing cluster array 212. In one embodiment, different clusters 214A-214N of the processing cluster array 212 can be allocated for processing different types of programs or for performing different types of computations.

The processing cluster array 212 can be configured to perform various types of parallel processing operations. In one embodiment the processing cluster array 212 is configured to perform general-purpose parallel compute operations. For example, the processing cluster array 212 can include logic to execute processing tasks including filtering of video and/or audio data, performing modeling operations, including physics operations, and performing data transformations.

In one embodiment the processing cluster array 212 is configured to perform parallel graphics processing operations. In embodiments in which the parallel processor 200 is configured to perform graphics processing operations, the processing cluster array 212 can include additional logic to support the execution of such graphics processing operations, including, but not limited to texture sampling logic to perform texture operations, as well as tessellation logic and other vertex processing logic. Additionally, the processing cluster array 212 can be configured to execute graphics processing related shader programs such as, but not limited to vertex shaders, tessellation shaders, geometry shaders, and pixel shaders. The parallel processing unit 202 can transfer data from system memory via the I/O unit 204 for processing. During processing the transferred data can be stored to on-chip memory (e.g., parallel processor memory 222) during processing, then written back to system memory.

In one embodiment, when the parallel processing unit 202 is used to perform graphics processing, the scheduler 210 can be configured to divide the processing workload into approximately equal sized tasks, to better enable distribution of the graphics processing operations to multiple clusters 214A-214N of the processing cluster array 212. In some embodiments, portions of the processing cluster array 212 can be configured to perform different types of processing. For example a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 214A-214N may be stored in buffers to allow the intermediate data to be transmitted between clusters 214A-214N for further processing.

During operation, the processing cluster array 212 can receive processing tasks to be executed via the scheduler 210, which receives commands defining processing tasks from front end 208. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 210 may be configured to fetch the indices corresponding to the tasks or may receive the indices from the front end 208. The front end 208 can be configured to ensure the processing cluster array 212 is configured to a valid state before the workload specified by incoming command buffers (e.g., batch-buffers, push buffers, etc.) is initiated.

Each of the one or more instances of the parallel processing unit 202 can couple with parallel processor memory 222. The parallel processor memory 222 can be accessed via the memory crossbar 216, which can receive memory requests from the processing cluster array 212 as well as the I/O unit 204. The memory crossbar 216 can access the parallel processor memory 222 via a memory interface 218. The memory interface 218 can include multiple partition units (e.g., partition unit 220A, partition unit 220B, through partition unit 220N) that can each couple to a portion (e.g., memory unit) of parallel processor memory 222. In one implementation the number of partition units 220A-220N is configured to be equal to the number of memory units, such that a first partition unit 220A has a corresponding first memory unit 224A, a second partition unit 220B has a corresponding memory unit 224B, and an Nth partition unit 220N has a corresponding Nth memory unit 224N. In other embodiments, the number of partition units 220A-220N may not be equal to the number of memory devices.

In various embodiments, the memory units 224A-224N can include various types of memory devices, including dynamic random access memory (DRAM) or graphics random access memory, such as synchronous graphics random access memory (SGRAM), including graphics double data rate (GDDR) memory. In one embodiment, the memory units 224A-224N may also include 3D stacked memory, including but not limited to high bandwidth memory (HBM). Persons skilled in the art will appreciate that the specific implementation of the memory units 224A-224N can vary, and can be selected from one of various conventional designs. Render targets, such as frame buffers or texture maps may be stored across the memory units 224A-224N, allowing partition units 220A-220N to write portions of each render target in parallel to efficiently use the available bandwidth of parallel processor memory 222. In some embodiments, a local instance of the parallel processor memory 222 may be excluded in favor of a unified memory design that utilizes system memory in conjunction with local cache memory.

In one embodiment, any one of the clusters 214A-214N of the processing cluster array 212 can process data that will be written to any of the memory units 224A-224N within parallel processor memory 222. The memory crossbar 216 can be configured to transfer the output of each cluster 214A-214N to any partition unit 220A-220N or to another cluster 214A-214N, which can perform additional processing operations on the output. Each cluster 214A-214N can communicate with the memory interface 218 through the memory crossbar 216 to read from or write to various external memory devices. In one embodiment the memory crossbar 216 has a connection to the memory interface 218 to communicate with the I/O unit 204, as well as a connection to a local instance of the parallel processor memory 222, enabling the processing units within the different processing clusters 214A-214N to communicate with system memory or other memory that is not local to the parallel processing unit 202. In one embodiment the memory crossbar 216 can use virtual channels to separate traffic streams between the clusters 214A-214N and the partition units 220A-220N.

While a single instance of the parallel processing unit 202 is illustrated within the parallel processor 200, any number of instances of the parallel processing unit 202 can be included. For example, multiple instances of the parallel processing unit 202 can be provided on a single add-in card, or multiple add-in cards can be interconnected. The different instances of the parallel processing unit 202 can be configured to inter-operate even if the different instances have different numbers of processing cores, different amounts of local parallel processor memory, and/or other configuration differences. For example and in one embodiment, some instances of the parallel processing unit 202 can include higher precision floating point units relative to other instances. Systems incorporating one or more instances of the parallel processing unit 202 or the parallel processor 200 can be implemented in a variety of configurations and form factors, including but not limited to desktop, laptop, or handheld personal computers, servers, workstations, game consoles, and/or embedded systems.

FIG. 2B is a block diagram of a partition unit 220, according to an embodiment. In one embodiment the partition unit 220 is an instance of one of the partition units 220A-220N of FIG. 2A. As illustrated, the partition unit 220 includes an L2 cache 221, a frame buffer interface 225, and a ROP 226 (raster operations unit). The L2 cache 221 is a read/write cache that is configured to perform load and store operations received from the memory crossbar 216 and ROP 226. Read misses and urgent write-back requests are output by L2 cache 221 to frame buffer interface 225 for processing. Updates can also be sent to the frame buffer via the frame buffer interface 225 for processing. In one embodiment the frame buffer interface 225 interfaces with one of the memory units in parallel processor memory, such as the memory units 224A-224N of FIG. 2 (e.g., within parallel processor memory 222).

In graphics applications, the ROP 226 is a processing unit that performs raster operations such as stencil, z test, blending, and the like. The ROP 226 then outputs processed graphics data that is stored in graphics memory. In some embodiments the ROP 226 includes compression logic to compress depth or color data that is written to memory and decompress depth or color data that is read from memory. The compression logic can be lossless compression logic that makes use of one or more of multiple compression algorithms. The type of compression that is performed by the ROP 226 can vary based on the statistical characteristics of the data to be compressed. For example, in one embodiment, delta color compression is performed on depth and color data on a per-tile basis.

In some embodiments, the ROP 226 is included within each processing cluster (e.g., cluster 214A-214N of FIG. 2) instead of within the partition unit 220. In such embodiment, read and write requests for pixel data are transmitted over the memory crossbar 216 instead of pixel fragment data. The processed graphics data may be displayed on a display device, such as one of the one or more display device(s) 110 of FIG. 1, routed for further processing by the processor(s) 102, or routed for further processing by one of the processing entities within the parallel processor 200 of FIG. 2A.

FIG. 2C is a block diagram of a processing cluster 214 within a parallel processing unit, according to an embodiment. In one embodiment the processing cluster is an instance of one of the processing clusters 214A-214N of FIG. 2. The processing cluster 214 can be configured to execute many threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 214 can be controlled via a pipeline manager 232 that distributes processing tasks to SIMT parallel processors. The pipeline manager 232 receives instructions from the scheduler 210 of FIG. 2 and manages execution of those instructions via a graphics multiprocessor 234 and/or a texture unit 236. The illustrated graphics multiprocessor 234 is an exemplary instance of a SIMT parallel processor. However, various types of SIMT parallel processors of differing architectures may be included within the processing cluster 214. One or more instances of the graphics multiprocessor 234 can be included within a processing cluster 214. The graphics multiprocessor 234 can process data and a data crossbar 240 can be used to distribute the processed data to one of multiple possible destinations, including other shader units. The pipeline manager 232 can facilitate the distribution of processed data by specifying destinations for processed data to be distributed vis the data crossbar 240.

Each graphics multiprocessor 234 within the processing cluster 214 can include an identical set of functional execution logic (e.g., arithmetic logic units, load-store units, etc.). The functional execution logic can be configured in a pipelined manner in which new instructions can be issued before previous instructions are complete. The functional execution logic supports a variety of operations including integer and floating point arithmetic, comparison operations, Boolean operations, bit-shifting, and computation of various algebraic functions. In one embodiment the same functional-unit hardware can be leveraged to perform different operations and any combination of functional units may be present.

The instructions transmitted to the processing cluster 214 constitutes a thread. A set of threads executing across the set of parallel processing engines is a thread group. A thread group executes the same program on different input data. Each thread within a thread group can be assigned to a different processing engine within a graphics multiprocessor 234. A thread group may include fewer threads than the number of processing engines within the graphics multiprocessor 234. When a thread group includes fewer threads than the number of processing engines, one or more of the processing engines may be idle during cycles in which that thread group is being processed. A thread group may also include more threads than the number of processing engines within the graphics multiprocessor 234. When the thread group includes more threads than the number of processing engines within the graphics multiprocessor 234, processing can be performed over consecutive clock cycles. In one embodiment multiple thread groups can be executed concurrently on a graphics multiprocessor 234.

In one embodiment the graphics multiprocessor 234 includes an internal cache memory to perform load and store operations. In one embodiment, the graphics multiprocessor 234 can forego an internal cache and use a cache memory (e.g., L1 cache 308) within the processing cluster 214. Each graphics multiprocessor 234 also has access to L2 caches within the partition units (e.g., partition units 220A-220N of FIG. 2) that are shared among all processing clusters 214 and may be used to transfer data between threads. The graphics multiprocessor 234 may also access off-chip global memory, which can include one or more of local parallel processor memory and/or system memory. Any memory external to the parallel processing unit 202 may be used as global memory. Embodiments in which the processing cluster 214 includes multiple instances of the graphics multiprocessor 234 can share common instructions and data, which may be stored in the L1 cache 308.

Each processing cluster 214 may include an MMU 245 (memory management unit) that is configured to map virtual addresses into physical addresses. In other embodiments, one or more instances of the MMU 245 may reside within the memory interface 218 of FIG. 2. The MMU 245 includes a set of page table entries (PTEs) used to map a virtual address to a physical address of a tile (talk more about tiling) and optionally a cache line index. The MMU 245 may include address translation lookaside buffers (TLB) or caches that may reside within the graphics multiprocessor 234 or the L1 cache or processing cluster 214. The physical address is processed to distribute surface data access locality to allow efficient request interleaving among partition units. The cache line index may be used to determine whether a request for a cache line is a hit or miss.

In graphics and computing applications, a processing cluster 214 may be configured such that each graphics multiprocessor 234 is coupled to a texture unit 236 for performing texture mapping operations, e.g., determining texture sample positions, reading texture data, and filtering the texture data. Texture data is read from an internal texture L1 cache (not shown) or in some embodiments from the L1 cache within graphics multiprocessor 234 and is fetched from an L2 cache, local parallel processor memory, or system memory, as needed. Each graphics multiprocessor 234 outputs processed tasks to the data crossbar 240 to provide the processed task to another processing cluster 214 for further processing or to store the processed task in an L2 cache, local parallel processor memory, or system memory via the memory crossbar 216. A preROP 242 (pre-raster operations unit) is configured to receive data from graphics multiprocessor 234, direct data to ROP units, which may be located with partition units as described herein (e.g., partition units 220A-220N of FIG. 2). The preROP 242 unit can perform optimizations for color blending, organize pixel color data, and perform address translations.

It will be appreciated that the core architecture described herein is illustrative and that variations and modifications are possible. Any number of processing units, e.g., graphics multiprocessor 234, texture units 236, preROPs 242, etc., may be included within a processing cluster 214. Further, while only one processing cluster 214 is shown, a parallel processing unit as described herein may include any number of instances of the processing cluster 214. In one embodiment, each processing cluster 214 can be configured to operate independently of other processing clusters 214 using separate and distinct processing units, L1 caches, etc.

FIG. 2D shows a graphics multiprocessor 234, according to one embodiment. In such embodiment the graphics multiprocessor 234 couples with the pipeline manager 232 of the processing cluster 214. The graphics multiprocessor 234 has an execution pipeline including but not limited to an instruction cache 252, an instruction unit 254, an address mapping unit 256, a register file 258, one or more general purpose graphics processing unit (GPGPU) cores 262, and one or more load/store units 266. The GPGPU cores 262 and load/store units 266 are coupled with cache memory 272 and shared memory 270 via a memory and cache interconnect 268.

In one embodiment, the instruction cache 252 receives a stream of instructions to execute from the pipeline manager 232. The instructions are cached in the instruction cache 252 and dispatched for execution by the instruction unit 254. The instruction unit 254 can dispatch instructions as thread groups (e.g., warps), with each thread of the thread group assigned to a different execution unit within GPGPU core 262. An instruction can access any of a local, shared, or global address space by specifying an address within a unified address space. The address mapping unit 256 can be used to translate addresses in the unified address space into a distinct memory address that can be accessed by the load/store units 266.

The register file 258 provides a set of registers for the functional units of the graphics multiprocessor 324. The register file 258 provides temporary storage for operands connected to the data paths of the functional units (e.g., GPGPU cores 262, load/store units 266) of the graphics multiprocessor 324. In one embodiment, the register file 258 is divided between each of the functional units such that each functional unit is allocated a dedicated portion of the register file 258. In one embodiment, the register file 258 is divided between the different warps being executed by the graphics multiprocessor 324.

The GPGPU cores 262 can each include floating point units (FPUs) and/or integer arithmetic logic units (ALUs) that are used to execute instructions of the graphics multiprocessor 324. The GPGPU cores 262 can be similar in architecture or can differ in architecture, according to embodiments. For example and in one embodiment, a first portion of the GPGPU cores 262 include a single precision FPU and an integer ALU while a second portion of the GPGPU cores include a double precision FPU. In one embodiment the FPUs can implement the IEEE 754-2008 standard for floating point arithmetic or enable variable precision floating point arithmetic. The graphics multiprocessor 324 can additionally include one or more fixed function or special function units to perform specific functions such as copy rectangle or pixel blending operations. In one embodiment one or more of the GPGPU cores can also include fixed or special function logic.

In one embodiment the GPGPU cores 262 include SIMD logic capable of performing a single instruction on multiple sets of data. In one embodiment GPGPU cores 262 can physically execute SIMD4, SIMD8, and SIMD16 instructions and logically execute SIMD1, SIMD2, and SIMD32 instructions. The SIMD instructions for the GPGPU cores can be generated at compile time by a shader compiler or automatically generated when executing programs written and compiled for single program multiple data (SPMD) or SIMT architectures. Multiple threads of a program configured for the SIMT execution model can executed via a single SIMD instruction. For example and in one embodiment, eight SIMT threads that perform the same or similar operations can be executed in parallel via a single SIMD8 logic unit.

The memory and cache interconnect 268 is an interconnect network that connects each of the functional units of the graphics multiprocessor 324 to the register file 258 and to the shared memory 270. In one embodiment, the memory and cache interconnect 268 is a crossbar interconnect that allows the load/store unit 266 to implement load and store operations between the shared memory 270 and the register file 258. The register file 258 can operate at the same frequency as the GPGPU cores 262, thus data transfer between the GPGPU cores 262 and the register file 258 is very low latency. The shared memory 270 can be used to enable communication between threads that execute on the functional units within the graphics multiprocessor 234. The cache memory 272 can be used as a data cache for example, to cache texture data communicated between the functional units and the texture unit 236. The shared memory 270 can also be used as a program managed cached. Threads executing on the GPGPU cores 262 can programmatically store data within the shared memory in addition to the automatically cached data that is stored within the cache memory 272.

FIGS. 3A-3B illustrate additional graphics multiprocessors, according to embodiments. The illustrated graphics multiprocessors 325, 350 are variants of the graphics multiprocessor 234 of FIG. 2C. The illustrated graphics multiprocessors 325, 350 can be configured as a streaming multiprocessor (SM) capable of simultaneous execution of a large number of execution threads.

FIG. 3A shows a graphics multiprocessor 325 according to an additional embodiment. The graphics multiprocessor 325 includes multiple additional instances of execution resource units relative to the graphics multiprocessor 234 of FIG. 2D. For example, the graphics multiprocessor 325 can include multiple instances of the instruction unit 332A-332B, register file 334A-334B, and texture unit(s) 344A-344B. The graphics multiprocessor 325 also includes multiple sets of graphics or compute execution units (e.g., GPGPU core 336A-336B, GPGPU core 337A-337B, GPGPU core 338A-338B) and multiple sets of load/store units 340A-340B. In one embodiment the execution resource units have a common instruction cache 330, texture and/or data cache memory 342, and shared memory 346.

The various components can communicate via an interconnect fabric 327. In one embodiment the interconnect fabric 327 includes one or more crossbar switches to enable communication between the various components of the graphics multiprocessor 325. In one embodiment the interconnect fabric 327 is a separate, high-speed network fabric layer upon which each component of the graphics multiprocessor 325 is stacked. The components of the graphics multiprocessor 325 communicate with remote components via the interconnect fabric 327. For example, the GPGPU cores 336A-336B, 337A-337B, and 3378A-338B can each communicate with shared memory 346 via the interconnect fabric 327. The interconnect fabric 327 can arbitrate communication within the graphics multiprocessor 325 to ensure a fair bandwidth allocation between components.

FIG. 3B shows a graphics multiprocessor 350 according to an additional embodiment. The graphics processor includes multiple sets of execution resources 356A-356D, where each set of execution resource includes multiple instruction units, register files, GPGPU cores, and load store units, as illustrated in FIG. 2D and FIG. 3A. The execution resources 356A-356D can work in concert with texture unit(s) 360A-360D for texture operations, while sharing an instruction cache 354, and shared memory 362. In one embodiment the execution resources 356A-356D can share an instruction cache 354 and shared memory 362, as well as multiple instances of a texture and/or data cache memory 358A-358B. The various components can communicate via an interconnect fabric 352 similar to the interconnect fabric 327 of FIG. 3A.

Persons skilled in the art will understand that the architecture described in FIGS. 1, 2A-2D, and 3A-3B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 202 of FIG. 2, as well as one or more graphics processors or special purpose processing units, without departure from the scope of the embodiments described herein.

In some embodiments a parallel processor or GPGPU as described herein is communicatively coupled to host/processor cores to accelerate graphics operations, machine-learning operations, pattern analysis operations, and various general purpose GPU (GPGPU) functions. The GPU may be communicatively coupled to the host processor/cores over a bus or other interconnect (e.g., a high speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Techniques for GPU to Host Processor Interconnection

FIG. 4A illustrates an exemplary architecture in which a plurality of GPUs 410-413 are communicatively coupled to a plurality of multi-core processors 405-406 over high-speed links 440-443 (e.g., buses, point-to-point interconnects, etc.). In one embodiment, the high-speed links 440-443 support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles of the invention are not limited to any particular communication protocol or throughput.

In addition, in one embodiment, two or more of the GPUs 410-413 are interconnected over high-speed links 444-445, which may be implemented using the same or different protocols/links than those used for high-speed links 440-443. Similarly, two or more of the multi-core processors 405-406 may be connected over high speed link 433 which may be symmetric multi-processor (SMP) buses operating at 20 GB/s, 30 GB/s, 120 GB/s or higher. Alternatively, all communication between the various system components shown in FIG. 4A may be accomplished using the same protocols/links (e.g., over a common interconnection fabric). As mentioned, however, the underlying principles of the invention are not limited to any particular type of interconnect technology.

In one embodiment, each multi-core processor 405-406 is communicatively coupled to a processor memory 401-402, via memory interconnects 430-431, respectively, and each GPU 410-413 is communicatively coupled to GPU memory 420-423 over GPU memory interconnects 450-453, respectively. The memory interconnects 430-431 and 450-453 may utilize the same or different memory access technologies. By way of example, and not limitation, the processor memories 401-402 and GPU memories 420-423 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of the memories may be volatile memory and another portion may be non-volatile memory (e.g., using a two-level memory (2LM) hierarchy).

As described below, although the various processors 405-406 and GPUs 410-413 may be physically coupled to a particular memory 401-402, 420-423, respectively, a unified memory architecture may be implemented in which the same virtual system address space (also referred to as the "effective address" space) is distributed among all of the various physical memories. For example, processor memories 401-402 may each comprise 64 GB of the system memory address space and GPU memories 420-423 may each comprise 32 GB of the system memory address space (resulting in a total of 256 GB addressable memory in this example).

FIG. 4B illustrates additional details for an interconnection between a multi-core processor 407 and a graphics acceleration module 446 in accordance with one embodiment. The graphics acceleration module 446 may include one or more GPU chips integrated on a line card which is coupled to the processor 407 via the high-speed link 440. Alternatively, the graphics acceleration module 446 may be integrated on the same package or chip as the processor 407.

The illustrated processor 407 includes a plurality of cores 460A-460D, each with a translation lookaside buffer 461A-461D and one or more caches 462A-462D. The cores may include various other components for executing instructions and processing data which are not illustrated to avoid obscuring the underlying principles of the invention (e.g., instruction fetch units, branch prediction units, decoders, execution units, reorder buffers, etc.). The caches 462A-462D may comprise level 1 (L1) and level 2 (L2) caches. In addition, one or more shared caches 426 may be included in the caching hierarchy and shared by sets of the cores 460A-460D. For example, one embodiment of the processor 407 includes 24 cores, each with its own L1 cache, twelve shared L2 caches, and twelve shared L3 caches. In this embodiment, one of the L2 and L3 caches are shared by two adjacent cores. The processor 407 and the graphics accelerator integration module 446 connect with system memory 441, which may include processor memories 401-402

Coherency is maintained for data and instructions stored in the various caches 462A-462D, 456 and system memory 441 via inter-core communication over a coherence bus 464. For example, each cache may have cache coherency logic/circuitry associated therewith to communicate to over the coherence bus 464 in response to detected reads or writes to particular cache lines. In one implementation, a cache snooping protocol is implemented over the coherence bus 464 to snoop cache accesses. Cache snooping/coherency techniques are well understood by those of skill in the art and will not be described in detail here to avoid obscuring the underlying principles of the invention.

In one embodiment, a proxy circuit 425 communicatively couples the graphics acceleration module 446 to the coherence bus 464, allowing the graphics acceleration module 446 to participate in the cache coherence protocol as a peer of the cores. In particular, an interface 435 provides connectivity to the proxy circuit 425 over high-speed link 440 (e.g., a PCIe bus, NVLink, etc.) and an interface 437 connects the graphics acceleration module 446 to the link 440.

In one implementation, an accelerator integration circuit 436 provides cache management, memory access, context management, and interrupt management services on behalf of a plurality of graphics processing engines 431, 432, N of the graphics acceleration module 446. The graphics processing engines 431, 432, N may each comprise a separate graphics processing unit (GPU). Alternatively, the graphics processing engines 431, 432, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 431-432, N or the graphics processing engines 431-432, N may be individual GPUs integrated on a common package, line card, or chip.

In one embodiment, the accelerator integration circuit 436 includes a memory management unit (MMU) 439 for performing various memory management functions such as virtual-to-physical memory translations (also referred to as effective-to-real memory translations) and memory access protocols for accessing system memory 441. The MMU 439 may also include a translation lookaside buffer (TLB) (not shown) for caching the virtual/effective to physical/real address translations. In one implementation, a cache 438 stores commands and data for efficient access by the graphics processing engines 431-432, N. In one embodiment, the data stored in cache 438 and graphics memories 433-434, N is kept coherent with the core caches 462A-462D, 456 and system memory 411. As mentioned, this may be accomplished via proxy circuit 425 which takes part in the cache coherency mechanism on behalf of cache 438 and memories 433-434, N (e.g., sending updates to the cache 438 related to modifications/accesses of cache lines on processor caches 462A-462D, 456 and receiving updates from the cache 438).

A set of registers 445 store context data for threads executed by the graphics processing engines 431-432, N and a context management circuit 448 manages the thread contexts. For example, the context management circuit 448 may perform save and restore operations to save and restore contexts of the various threads during contexts switches (e.g., where a first thread is saved and a second thread is stored so that the second thread can be execute by a graphics processing engine). For example, on a context switch, the context management circuit 448 may store current register values to a designated region in memory (e.g., identified by a context pointer). It may then restore the register values when returning to the context. In one embodiment, an interrupt management circuit 447 receives and processes interrupts received from system devices.

In one implementation, virtual/effective addresses from a graphics processing engine 431 are translated to real/physical addresses in system memory 411 by the MMU 439. One embodiment of the accelerator integration circuit 436 supports multiple (e.g., 4, 8, 16) graphics accelerator modules 446 and/or other accelerator devices. The graphics accelerator module 446 may be dedicated to a single application executed on the processor 407 or may be shared between multiple applications. In one embodiment, a virtualized graphics execution environment is presented in which the resources of the graphics processing engines 431-432, N are shared with multiple applications or virtual machines (VMs). The resources may be subdivided into "slices" which are allocated to different VMs and/or applications based on the processing requirements and priorities associated with the VMs and/or applications.

Thus, the accelerator integration circuit acts as a bridge to the system for the graphics acceleration module 446 and provides address translation and system memory cache services. In addition, the accelerator integration circuit 436 may provide virtualization facilities for the host processor to manage virtualization of the graphics processing engines, interrupts, and memory management.

Because hardware resources of the graphics processing engines 431-432, N are mapped explicitly to the real address space seen by the host processor 407, any host processor can address these resources directly using an effective address value. One function of the accelerator integration circuit 436, in one embodiment, is the physical separation of the graphics processing engines 431-432, N so that they appear to the system as independent units.

As mentioned, in the illustrated embodiment, one or more graphics memories 433-434, M are coupled to each of the graphics processing engines 431-432, N, respectively. The graphics memories 433-434, M store instructions and data being processed by each of the graphics processing engines 431-432, N. The graphics memories 433-434, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 440, biasing techniques are used to ensure that the data stored in graphics memories 433-434, M is data which will be used most frequently by the graphics processing engines 431-432, N and preferably not used by the cores 460A-460D (at least not frequently). Similarly, the biasing mechanism attempts to keep data needed by the cores (and preferably not the graphics processing engines 431-432, N) within the caches 462A-462D, 456 of the cores and system memory 411.

FIG. 4C illustrates another embodiment in which the accelerator integration circuit 436 is integrated within the processor 407. In this embodiment, the graphics processing engines 431-432, N communicate directly over the high-speed link 440 to the accelerator integration circuit 436 via interface 437 and interface 435 (which, again, may be utilize any form of bus or interface protocol). The accelerator integration circuit 436 may perform the same operations as those described with respect to FIG. 4B, but potentially at a higher throughput given its close proximity to the coherency bus 462 and caches 462A-462D, 426.

One embodiment supports different programming models including a dedicated-process programming model (no graphics acceleration module virtualization) and shared programming models (with virtualization). The latter may include programming models which are controlled by the accelerator integration circuit 436 and programming models which are controlled by the graphics acceleration module 446.

In one embodiment of the dedicated process model, graphics processing engines 431-432, N are dedicated to a single application or process under a single operating system. The single application can funnel other application requests to the graphics engines 431-432, N, providing virtualization within a VM/partition.

In the dedicated-process programming models, the graphics processing engines 431-432, N, may be shared by multiple VM/application partitions. The shared models require a system hypervisor to virtualize the graphics processing engines 431-432, N to allow access by each operating system. For single-partition systems without a hypervisor, the graphics processing engines 431-432, N are owned by the operating system. In both cases, the operating system can virtualize the graphics processing engines 431-432, N to provide access to each process or application.

For the shared programming model, the graphics acceleration module 446 or an individual graphics processing engine 431-432, N selects a process element using a process handle. In one embodiment, process elements are stored in system memory 411 and are addressable using the effective address to real address translation techniques described herein. The process handle may be an implementation-specific value provided to the host process when registering its context with the graphics processing engine 431-432, N (that is, calling system software to add the process element to the process element linked list). The lower 16-bits of the process handle may be the offset of the process element within the process element linked list.

FIG. 4D illustrates an exemplary accelerator integration slice 490. As used herein, a "slice" comprises a specified portion of the processing resources of the accelerator integration circuit 436. Application effective address space 482 within system memory 411 stores process elements 483. In one embodiment, the process elements 483 are stored in response to GPU invocations 481 from applications 480 executed on the processor 407. A process element 483 contains the process state for the corresponding application 480. A work descriptor (WD) 484 contained in the process element 483 can be a single job requested by an application or may contain a pointer to a queue of jobs. In the latter case, the WD 484 is a pointer to the job request queue in the application's address space 482.

The graphics acceleration module 446 and/or the individual graphics processing engines 431-432, N can be shared by all or a subset of the processes in the system. Embodiments of the invention include an infrastructure for setting up the process state and sending a WD 484 to a graphics acceleration module 446 to start a job in a virtualized environment.

In one implementation, the dedicated-process programming model is implementation-specific. In this model, a single process owns the graphics acceleration module 446 or an individual graphics processing engine 431. Because the graphics acceleration module 446 is owned by a single process, the hypervisor initializes the accelerator integration circuit 436 for the owning partition and the operating system initializes the accelerator integration circuit 436 for the owning process at the time when the graphics acceleration module 446 is assigned.

In operation, a WD fetch unit 491 in the accelerator integration slice 490 fetches the next WD 484 which includes an indication of the work to be done by one of the graphics processing engines of the graphics acceleration module 446. Data from the WD 484 may be stored in registers 445 and used by the MMU 439, interrupt management circuit 447 and/or context management circuit 446 as illustrated. For example, one embodiment of the MMU 439 includes segment/page walk circuitry for accessing segment/page tables 486 within the OS virtual address space 485. The interrupt management circuit 447 may process interrupt events 492 received from the graphics acceleration module 446. When performing graphics operations, an effective address 493 generated by a graphics processing engine 431-432, N is translated to a real address by the MMU 439.

In one embodiment, the same set of registers 445 are duplicated for each graphics processing engine 431-432, N and/or graphics acceleration module 446 and may be initialized by the hypervisor or operating system. Each of these duplicated registers may be included in an accelerator integration slice 490. Exemplary registers that may be initialized by the hypervisor are shown in Table 1.

TABLE 1

Hypervisor Initialized Registers

| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by the operating system are shown in Table 2.

TABLE 2

Operating System Initialized Registers

| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 484 is specific to a particular graphics acceleration module 446 and/or graphics processing engine 431-432, N. It contains all the information a graphics processing engine 431-432, N requires to do its work or it can be a pointer to a memory location where the application has set up a command queue of work to be completed.

FIG. 4E illustrates additional details for one embodiment of a shared model. This embodiment includes a hypervisor real address space 498 in which a process element list 499 is stored. The hypervisor real address space 498 is accessible via a hypervisor 496 which virtualizes the graphics acceleration module engines for the operating system 495.

The shared programming models allow for all or a subset of processes from all or a subset of partitions in the system to use a graphics acceleration module 446. There are two programming models where the graphics acceleration module 446 is shared by multiple processes and partitions: time-sliced shared and graphics directed shared.

In this model, the system hypervisor 496 owns the graphics acceleration module 446 and makes its function available to all operating systems 495. For a graphics acceleration module 446 to support virtualization by the system hypervisor 496, the graphics acceleration module 446 may adhere to the following requirements: 1) An application's job request must be autonomous (that is, the state does not need to be maintained between jobs), or the graphics acceleration module 446 must provide a context save and restore mechanism. 2) An application's job request is guaranteed by the graphics acceleration module 446 to complete in a specified amount of time, including any translation faults, or the graphics acceleration module 446 provides the ability to preempt the processing of the job. 3) The graphics acceleration module 446 must be guaranteed fairness between processes when operating in the directed shared programming model.

In one embodiment, for the shared model, the application 480 is required to make an operating system 495 system call with a graphics acceleration module 446 type, a work descriptor (WD), an authority mask register (AMR) value, and a context save/restore area pointer (CSRP). The graphics acceleration module 446 type describes the targeted acceleration function for the system call. The graphics acceleration module 446 type may be a system-specific value. The WD is formatted specifically for the graphics acceleration module 446 and can be in the form of a graphics acceleration module 446 command, an effective address pointer to a user-defined structure, an effective address pointer to a queue of commands, or any other data structure to describe the work to be done by the graphics acceleration module 446. In one embodiment, the AMR value is the AMR state to use for the current process. The value passed to the operating system is similar to an application setting the AMR. If the accelerator integration circuit 436 and graphics acceleration module 446 implementations do not support a User Authority Mask Override Register (UAMOR), the operating system may apply the current UAMOR value to the AMR value before passing the AMR in the hypervisor call. The hypervisor 496 may optionally apply the current Authority Mask Override Register (AMOR) value before placing the AMR into the process element 483. In one embodiment, the CSRP is one of the registers 445 containing the effective address of an area in the application's address space 482 for the graphics acceleration module 446 to save and restore the context state. This pointer is optional if no state is required to be saved between jobs or when a job is preempted. The context save/restore area may be pinned system memory.

Upon receiving the system call, the operating system 495 may verify that the application 480 has registered and been given the authority to use the graphics acceleration module 446. The operating system 495 then calls the hypervisor 496 with the information shown in Table 3.

TABLE 3

OS to Hypervisor Call Parameters

1 A work descriptor (WD)
2 An Authority Mask Register (AMR) value (potentially masked).
3 An effective address (EA) Context Save/Restore Area Pointer (CSRP)
4 A process ID (PID) and optional thread ID (TID)
5 A virtual address (VA) accelerator utilization record pointer (AURP)
6 The virtual address of the storage segment table pointer (SSTP)
7 A logical interrupt service number (LISN)

Upon receiving the hypervisor call, the hypervisor 496 verifies that the operating system 495 has registered and been given the authority to use the graphics acceleration module 446. The hypervisor 496 then puts the process element 483 into the process element linked list for the corresponding graphics acceleration module 446 type. The process element may include the information shown in Table 4.

TABLE 4

Process Element Information

1 A work descriptor (WD)
2 An Authority Mask Register (AMR) value (potentially masked).
3 An effective address (EA) Context Save/Restore Area Pointer (CSRP)
4 A process ID (PID) and optional thread ID (TID)
5 A virtual address (VA) accelerator utilization record pointer (AURP)
6 The virtual address of the storage segment table pointer (SSTP)
7 A logical interrupt service number (LISN)
8 Interrupt vector table, derived from the hypervisor call parameters.
9 A state register (SR) value
10 A logical partition ID (LPID)
11 A real address (RA) hypervisor accelerator utilization record pointer
12 The Storage Descriptor Register (SDR)

In one embodiment, the hypervisor initializes a plurality of accelerator integration slice 490 registers 445.

As illustrated in FIG. 4F, one embodiment of the invention employs a unified memory addressable via a common virtual memory address space used to access the physical processor memories 401-402 and GPU memories 420-423. In this implementation, operations executed on the GPUs 410-413 utilize the same virtual/effective memory address space to access the processors memories 401-402 and vice versa, thereby simplifying programmability. In one embodiment, a first portion of the virtual/effective address space is allocated to the processor memory 401, a second portion to the second processor memory 402, a third portion to the GPU memory 420, and so on. The entire virtual/effective memory space (sometimes referred to as the effective address space) is thereby distributed across each of the processor memories 401-402 and GPU memories 420-423, allowing any processor or GPU to access any physical memory with a virtual address mapped to that memory.

In one embodiment, bias/coherence management circuitry 494A-494E within one or more of the MMUs 439A-439E ensures cache coherence between the caches of the host processors (e.g., 405) and the GPUs 410-413 and implements biasing techniques indicating the physical memories in which certain types of data should be stored. While multiple instances of bias/coherence management circuitry 494A-494E are illustrated in FIG. 4F, the bias/coherence circuitry may be implemented within the MMU of one or more host processors 405 and/or within the accelerator integration circuit 436.

One embodiment allows GPU-attached memory 420-423 to be mapped as part of system memory, and accessed using shared virtual memory (SVM) technology, but without suffering the typical performance drawbacks associated with full system cache coherence. The ability to GPU-attached memory 420-423 to be accessed as system memory without onerous cache coherence overhead provides a beneficial operating environment for GPU offload. This arrangement allows the host processor 405 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 420-423 without cache coherence overheads can be critical to the execution time of an offloaded computation. In cases with substantial streaming write memory traffic, for example, cache coherence overhead can significantly reduce the effective write bandwidth seen by a GPU 410-413. The efficiency of operand setup, the efficiency of results access, and the efficiency of GPU computation all play a role in determining the effectiveness of GPU offload.

In one implementation, the selection of between GPU bias and host processor bias is driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 420-423, with or without a bias cache in the GPU 410-413 (e.g., to cache frequently/recently used entries of the bias table). Alternatively, the entire bias table may be maintained within the GPU.

In one implementation, the bias table entry associated with each access to the GPU-attached memory 420-423 is accessed prior the actual access to the GPU memory, causing the following operations. First, local requests from the GPU 410-413 that find their page in GPU bias are forwarded directly to a corresponding GPU memory 420-423. Local requests from the GPU that find their page in host bias are forwarded to the processor 405 (e.g., over a high-speed link as discussed above). In one embodiment, requests from the processor 405 that find the requested page in host processor bias complete the request like a normal memory read. Alternatively, requests directed to a GPU-biased page may be forwarded to the GPU 410-413. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g. OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 405 bias to GPU bias, but is not required for the opposite transition.

In one embodiment, cache coherency is maintained by temporarily rendering GPU-biased pages uncacheable by the host processor 405. To access these pages, the processor 405 may request access from the GPU 410 which may or may not grant access right away, depending on the implementation. Thus, to reduce communication between the processor 405 and GPU 410 it is beneficial to ensure that GPU-biased pages are those which are required by the GPU but not the host processor 405 and vice versa.

Graphics Processing Pipeline

FIG. 5 illustrates a graphics processing pipeline 500, according to an embodiment. In one embodiment a graphics processor can implement the illustrated graphics processing pipeline 500. The graphics processor can be included within the parallel processing subsystems as described herein, such as the parallel processor 200 of FIG. 2, which, in one embodiment, is a variant of the parallel processor(s) 112 of FIG. 1. The various parallel processing systems can implement the graphics processing pipeline 500 via one or more instances of the parallel processing unit (e.g., parallel processing unit 202 of FIG. 2) as described herein. For example, a shader unit (e.g., graphics multiprocessor 234 of FIG. 3) may be configured to perform the functions of one or more of a vertex processing unit 504, a tessellation control processing unit 508, a tessellation evaluation processing unit 512, a geometry processing unit 516, and a fragment/pixel processing unit 524. The functions of data assembler 502, primitive assemblers 506, 514, 518, tessellation unit 510, rasterizer 522, and raster operations unit 526 may also be performed by other processing engines within a processing cluster (e.g., processing cluster 214 of FIG. 3) and a corresponding partition unit (e.g., partition unit 220A-220N of FIG. 2). The graphics processing pipeline 500 may also be implemented using dedicated processing units for one or more functions. In one embodiment, one or more portions of the graphics processing pipeline 500 can be performed by parallel processing logic within a general purpose processor (e.g., CPU). In one embodiment, one or more portions of the graphics processing pipeline 500 can access on-chip memory (e.g., parallel processor memory 222 as in FIG. 2) via a memory interface 528, which may be an instance of the memory interface 218 of FIG. 2.

In one embodiment the data assembler 502 is a processing unit that collects vertex data for surfaces and primitives. The data assembler 502 then outputs the vertex data, including the vertex attributes, to the vertex processing unit 504. The vertex processing unit 504 is a programmable execution unit that executes vertex shader programs, lighting and transforming vertex data as specified by the vertex shader programs. The vertex processing unit 504 reads data that is stored in cache, local or system memory for use in processing the vertex data and may be programmed to transform the vertex data from an object-based coordinate representation to a world space coordinate space or a normalized device coordinate space.

A first instance of a primitive assembler 506 receives vertex attributes from the vertex processing unit 50. The primitive assembler 506 readings stored vertex attributes as needed and constructs graphics primitives for processing by tessellation control processing unit 508. The graphics primitives include triangles, line segments, points, patches, and so forth, as supported by various graphics processing application programming interfaces (APIs).

The tessellation control processing unit 508 treats the input vertices as control points for a geometric patch. The control points are transformed from an input representation from the patch (e.g., the patch's bases) to a representation that is suitable for use in surface evaluation by the tessellation evaluation processing unit 512. The tessellation control processing unit 508 can also compute tessellation factors for edges of geometric patches. A tessellation factor applies to a single edge and quantifies a view-dependent level of detail associated with the edge. A tessellation unit 510 is configured to receive the tessellation factors for edges of a patch and to tessellate the patch into multiple geometric primitives such as line, triangle, or quadrilateral primitives, which are transmitted to a tessellation evaluation processing unit 512. The tessellation evaluation processing unit 512 operates on parameterized coordinates of the subdivided patch to generate a surface representation and vertex attributes for each vertex associated with the geometric primitives.

A second instance of a primitive assembler 514 receives vertex attributes from the tessellation evaluation processing unit 512, reading stored vertex attributes as needed, and constructs graphics primitives for processing by the geometry processing unit 516. The geometry processing unit 516 is a programmable execution unit that executes geometry shader programs to transform graphics primitives received from primitive assembler 514 as specified by the geometry shader programs. In one embodiment the geometry processing unit 516 is programmed to subdivide the graphics primitives into one or more new graphics primitives and calculate parameters used to rasterize the new graphics primitives.

In some embodiments the geometry processing unit 516 can add or delete elements in the geometry stream. The geometry processing unit 516 outputs the parameters and vertices specifying new graphics primitives to primitive assembler 518. The primitive assembler 518 receives the parameters and vertices from the geometry processing unit 516 and constructs graphics primitives for processing by a viewport scale, cull, and clip unit 520. The geometry processing unit 516 reads data that is stored in parallel processor memory or system memory for use in processing the geometry data. The viewport scale, cull, and clip unit 520 performs clipping, culling, and viewport scaling and outputs processed graphics primitives to a rasterizer 522.

The rasterizer 522 can perform depth culling and other depth-based optimizations. The rasterizer 522 also performs scan conversion on the new graphics primitives to generate fragments and output those fragments and associated coverage data to the fragment/pixel processing unit 524. The fragment/pixel processing unit 524 is a programmable execution unit that is configured to execute fragment shader programs or pixel shader programs. The fragment/pixel processing unit 524 transforming fragments or pixels received from rasterizer 522, as specified by the fragment or pixel shader programs. For example, the fragment/pixel processing unit 524 may be programmed to perform operations included but not limited to texture mapping, shading, blending, texture correction and perspective correction to produce shaded fragments or pixels that are output to a raster operations unit 526. The fragment/pixel processing unit 524 can read data that is stored in either the parallel processor memory or the system memory for use when processing the fragment data. Fragment or pixel shader programs may be configured to shade at sample, pixel, tile, or other granularities depending on the sampling rate configured for the processing units.

The raster operations unit 526 is a processing unit that performs raster operations including, but not limited to stencil, z test, blending, and the like, and outputs pixel data as processed graphics data to be stored in graphics memory (e.g., parallel processor memory 222 as in FIG. 2, and/or system memory 104 as in FIG. 1, to be displayed on the one or more display device(s) 110 or for further processing by one of the one or more processor(s) 102 or parallel processor(s) 112. In some embodiments the raster operations unit 526 is configured to compress z or color data that is written to memory and decompress z or color data that is read from memory.

Figure 30:
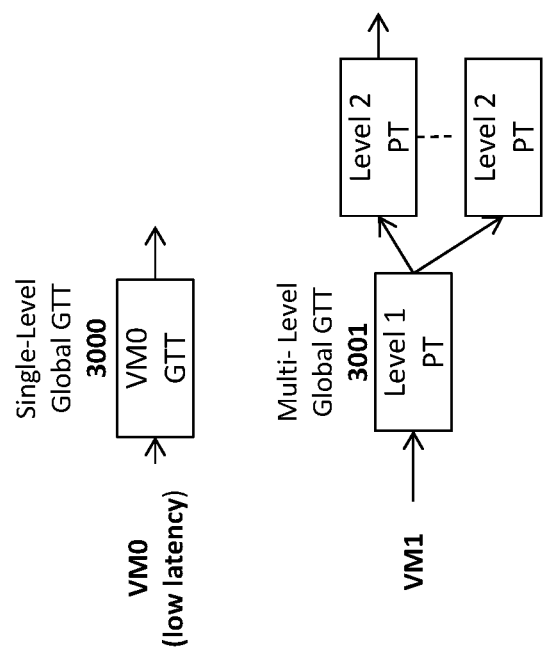
FIG. 30 illustrates one embodiment in which certain virtual machines are assigned single level graphics translation tables and other VMs are assigned multi-level translation tables.

One embodiment of the invention implements a hybrid approach in which certain VMs are assigned single-level (lower latency) page tables while other VMs are assigned multi-level (higher latency) page tables. In FIG. 30, for example, VM0 has been assigned a single level GTT 3000 while VM1 and potentially other VMs have been assigned multi-level GTTs 3001. This implementation may be used when one VM (e.g., VM0) is being used for real-time, low latency applications and the other VMs are used for latency-tolerant applications (e.g., where one VM is used to display real time automotive data such as on the instrument panel while higher latency is acceptable for the other VMs such as for the entertainment system or NAV system).

In embodiments, the term "engine" or "module" or "logic" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, an engine or a module may be implemented in firmware, hardware, software, or any combination of firmware, hardware, and software.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A graphics processor, comprising:
a plurality of graphics processing resources to execute instructions and process data;
partitioning hardware logic to indicate partitioning of the plurality of graphics processing resources into a plurality of slices, each slice of the plurality of slices including a corresponding subset of the graphics processing resources to be allocated to a corresponding virtual machine (VM);
a plurality of memory management circuits, each memory management circuit corresponding to a slice of the plurality of slices and configured to perform memory access operations including address translations, page fault operations, and page walk operations, each memory management circuit comprising:
one or more translation lookaside buffers (TLBs), each TLB to store at least some mappings of guest virtual addresses (GVAs) to host physical addresses (HPAs) maintained in page tables in a system memory, wherein each GVA is associated with a particular VM; and
an interface to couple the memory management circuit to a system-level memory management circuit, the interface to provide communication with the system-level memory management circuit to ensure coherency between mappings of GVAs to HPAs stored in the one or more TLBs and mappings of GVAs to HPAs stored in at least one TLB of the system-level memory management circuit.

2. The graphics processor of claim 1 wherein one or more slices are to be included in a first virtual graphics processing unit (vGPU) to be provided to a first VM, the first VM to execute one or more threads of a plurality of threads on the first vGPU.

3. The graphics processor of claim 2 wherein the first vGPU is uniquely identified with a first process address space identifier (PASID) value, and at least a second vGPU is uniquely identified with a second PASID value.

4. The graphics processor of claim 3 wherein the first PASID value is to be used by the address translation hardware logic to identify first page table entries and/or TLB entries associated with the first vGPU and the second PASID value is to be used by the address translation hardware logic to identify second page table entries and/or TLB entries associated with the second vGPU.

5. The graphics processor of claim 4 wherein the system memory comprises dynamic random access memory (DRAM).

6. The graphics processor of claim 5 wherein the DRAM comprises a high bandwidth memory (HBM).

7. The graphics processor of claim 1 wherein a first portion of the HPAs are to identify regions of a system memory and a second portion of the HPAs are to identify regions of a graphics processor memory.

8. The graphics processor of claim 7 wherein the graphics processor memory comprises a high bandwidth memory (HBM) and the system memory comprises a dynamic random access memory (DRAM) or an HBM.

9. A system, comprising:
a host processor;
a first memory interface to couple the host processor to a system memory;
a plurality of graphics processing resources to execute instructions and process data;
partitioning hardware logic to indicate partitioning of the plurality of graphics processing resources into a plurality of slices, each slice of the plurality of slices including a corresponding subset of the graphics processing resources to be allocated to a corresponding virtual machine (VM);
a plurality of memory management circuits, each memory management circuit corresponding to a slice of the plurality of slices and configured to perform memory access operations including address translations, page fault operations, and page walk operations, each memory management circuit comprising:
one or more translation lookaside buffers (TLBs), each TLB to store at least some mappings of guest virtual addresses (GVAs) to host physical addresses (HPAs) maintained in page tables in the system memory, wherein each GVA is associated with a particular VM; and
an interface to couple the memory management circuit to a system-level memory management circuit, the interface to provide communication with the system-level memory management circuit to ensure coherency between mappings of GVAs to HPAs stored in the one or more TLBs and mappings of GVAs to HPAs stored in at least one TLB of the system-level memory management circuit.

10. The system of claim 9 wherein one or more slices are to be included in a first virtual graphics processing unit (vGPU) to be provided to a first VM, the first VM to execute one or more threads of a plurality of threads on the first vGPU.

11. The system of claim 10 wherein the first vGPU is uniquely identified with a first process address space identifier (PASID) value, and at least a second vGPU is uniquely identified with a second PASID value.

12. The system of claim 11 wherein the first PASID value is to be used by the address translation hardware logic to identify first page table entries and/or TLB entries associated with the first vGPU and the second PASID value is to be used by the address translation hardware logic to identify second page table entries and/or TLB entries associated with the second vGPU.

13. The system of claim 12 wherein the system memory comprises dynamic random access memory (DRAM).

14. The system of claim 13 wherein the DRAM comprises a high bandwidth memory (HBM).

15. The system of claim 9 wherein a first portion of the HPAs are to identify regions of the system memory and a second portion of the HPAs are to identify regions of a graphics processor memory, the graphics processor including the plurality of graphics processing resources.

16. The system of claim 15 wherein the graphics processor memory comprises a high bandwidth memory (HBM) and the system memory comprises a dynamic random access memory (DRAM) or an HBM.

* * * * *